US010592886B2

(12) United States Patent
Sanchez-Llorens et al.

(10) Patent No.: US 10,592,886 B2
(45) Date of Patent: Mar. 17, 2020

(54) MULTI-FUNCTIONALITY CUSTOMER-FACING DEVICE

(71) Applicant: Square, Inc., San Francisco, CA (US)

(72) Inventors: Sara Sanchez-Llorens, San Francisco, CA (US); Todor Ristov, San Bruno, CA (US); Elise Hurwitz, Berkeley, CA (US); Arnaud Ponchon, Tiburon, CA (US); Evan Doyle, San Francisco, CA (US); Isreal Blagdan, San Francisco, CA (US); Christine Lin, San Francisco, CA (US); Imran Khan, San Rafael, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/942,307

(22) Filed: Mar. 30, 2018

(65) Prior Publication Data
US 2019/0303903 A1    Oct. 3, 2019

(51) Int. Cl.
*G06Q 20/20* (2012.01)
*G06F 3/0481* (2013.01)
*G06Q 20/40* (2012.01)
*G06F 3/0488* (2013.01)

(52) U.S. Cl.
CPC ......... *G06Q 20/204* (2013.01); *G06F 3/0481* (2013.01); *G06Q 20/203* (2013.01); *G06Q 20/4012* (2013.01); *G06F 3/04886* (2013.01)

(58) Field of Classification Search
CPC ........... G06Q 20/20; G06Q 20/32; H04L 9/30
USPC .......................................................... 705/21
See application file for complete search history.

(56) References Cited

U.S. PATENT DOCUMENTS

| | | | |
|---|---|---|---|
| 9,092,766 B1* | 7/2015 | Bedier | G06Q 20/204 |
| 9,946,506 B2 | 4/2018 | Ting et al. | |
| 2004/0015403 A1* | 1/2004 | Moskowitz | G06Q 30/06 705/26.61 |
| 2004/0221306 A1* | 11/2004 | Noh | H04N 5/44543 725/44 |
| 2007/0214000 A1 | 9/2007 | Shahrabi et al. | |
| 2007/0294556 A1 | 12/2007 | Wutka | |
| 2010/0058448 A1 | 3/2010 | Courtay et al. | |
| (Continued) | | | |

OTHER PUBLICATIONS

Final Office Action dated Sep. 27, 2018, for U.S. Appl. No. 15/942,273, of Sanchez-Llorens, S., et al., filed Mar. 30, 2018.

(Continued)

*Primary Examiner* — Oluseye Iwarere
(74) *Attorney, Agent, or Firm* — Lee & Hayes, P.C.

(57) ABSTRACT

Techniques associated with a multi-functionality customer-facing device are described herein. A point-of-sale system can comprise multiple devices, such as a customer-facing device and a merchant-facing device that is coupled to the customer-facing device. The customer-facing device is capable of operating in a first state or a second state. In at least one example, the customer-facing device can present a graphical user interface (GUI) on a display. The customer-facing device can transition from the first state to the second state. The second state can enable the customer-facing device to perform at least one additional functionality that is not available to the customer-facing device in the first state. The customer-facing device can receive, while in the second state, an input via the GUI and can send to the merchant-facing device, an indication of the input.

20 Claims, 43 Drawing Sheets

(56) References Cited

U.S. PATENT DOCUMENTS

| | | | |
|---|---|---|---|
| 2011/0087591 A1* | 4/2011 | Barnett | G06Q 20/40 705/44 |
| 2011/0307318 A1* | 12/2011 | LaPorte | G06Q 20/209 705/14.33 |
| 2012/0022948 A1* | 1/2012 | Jones | G06Q 30/0267 705/14.64 |
| 2012/0030043 A1* | 2/2012 | Ross | G06Q 20/20 705/16 |
| 2012/0192234 A1* | 7/2012 | Britt | H04N 5/782 725/58 |
| 2013/0080280 A1* | 3/2013 | Scipioni | G06Q 10/06 705/26.1 |
| 2013/0182845 A1* | 7/2013 | Monica | H04L 63/0869 380/270 |
| 2013/0185124 A1* | 7/2013 | Aaron | G07B 13/00 705/13 |
| 2013/0185152 A1* | 7/2013 | Aaron | G06Q 20/02 705/14.51 |
| 2013/0185208 A1* | 7/2013 | Aaron | G07B 15/02 705/44 |
| 2013/0185559 A1* | 7/2013 | Morel | H04L 63/18 713/168 |
| 2013/0214995 A1 | 8/2013 | Lewin et al. | |
| 2013/0225075 A1 | 8/2013 | Schmid et al. | |
| 2013/0262236 A1 | 10/2013 | Kwak | |
| 2013/0278122 A1* | 10/2013 | Edwards | E05B 65/461 312/237 |
| 2014/0143737 A1* | 5/2014 | Mistry | G06F 3/0488 715/854 |
| 2015/0001291 A1* | 1/2015 | Govindarajan | G06Q 90/00 235/380 |
| 2015/0032559 A1* | 1/2015 | Sonnendorfer | H04M 1/0254 705/21 |
| 2015/0199667 A1* | 7/2015 | Fernando | G06Q 20/202 705/21 |
| 2015/0221010 A1* | 8/2015 | Ming | G06Q 30/0623 705/26.61 |
| 2016/0051067 A1* | 2/2016 | Law | F16M 11/041 361/679.22 |
| 2016/0055512 A1* | 2/2016 | Godsey | G06Q 30/0222 705/80 |
| 2016/0070964 A1* | 3/2016 | Conrad | G07G 1/0018 348/150 |
| 2016/0092859 A1* | 3/2016 | Klingen | G06Q 20/027 705/44 |
| 2016/0092860 A1* | 3/2016 | Klingen | G06Q 20/322 705/35 |
| 2016/0092880 A1* | 3/2016 | Klingen | G06Q 20/42 705/16 |
| 2016/0124627 A1* | 5/2016 | Beatty | G06Q 20/20 705/16 |
| 2016/0125449 A1* | 5/2016 | Beatty | G06Q 30/0238 705/14.38 |
| 2016/0232515 A1* | 8/2016 | Jhas | G06Q 30/02 |
| 2016/0239904 A1* | 8/2016 | Washington | G06Q 30/0635 |
| 2017/0039867 A1* | 2/2017 | Fieldman | G09B 5/065 |
| 2017/0076269 A1 | 3/2017 | Saeed et al. | |
| 2017/0193488 A1 | 7/2017 | Renke et al. | |
| 2017/0228716 A1 | 8/2017 | Sugita | |
| 2017/0243560 A1* | 8/2017 | Donelli | G06T 11/20 |
| 2017/0255974 A1* | 9/2017 | Kulkarni | G06Q 30/04 |
| 2018/0032975 A1 | 2/2018 | Wolter et al. | |
| 2018/0260792 A1 | 9/2018 | Leclercq et al. | |
| 2018/0260849 A1 | 9/2018 | Leclercq et al. | |
| 2018/0260863 A1 | 9/2018 | Leclercq et al. | |
| 2018/0260864 A1 | 9/2018 | Leclercq et al. | |
| 2019/0303902 A1 | 10/2019 | Sanchez-Llorens et al. | |
| 2019/0303904 A1 | 10/2019 | Sanchez-Llorens et al. | |
| 2019/0303905 A1 | 10/2019 | Sanchez-Llorens et al. | |
| 2019/0303937 A1 | 10/2019 | Sanchez-Llorens et al. | |
| 2019/0303938 A1 | 10/2019 | Sanchez-Llorens et al. | |

OTHER PUBLICATIONS

Non Final Office Action dated Oct. 5, 2018, for U.S. Appl. No. 15/942,332, of Sanchez-Llorens, S., et al., filed Mar. 30, 2018.

Advisory Action dated Dec. 11, 2018, for U.S. Appl. No. 15/942,273, of Sanchez-Llorens, S., et al., filed Mar. 30, 2018.

Non-Final Office Action dated Jun. 7, 2018, for U.S. Appl. No. 15/942,273, of Sanchez-Llorens, S., et al., filed Mar. 30, 2018.

Non-Final Office Action dated Apr. 16, 2019, for U.S. Appl. No. 15/942,273, of Sanchez-Llorens, S., et al., filed Mar. 30, 2018.

Final Office Action dated May 3, 2019, for U.S. Appl. No. 15/942,332, of Sanchez-Llorens, S., et al., filed Mar. 30, 2018.

Advisory Action dated Aug. 8, 2019, for U.S. Appl. No. 15/942,332, of Sanchez-Llorens, S., et al., filed Mar. 30, 2018.

Final Office Action dated Aug. 12, 2019, for U.S. Appl. No. 15/942,273, of Sanchez-Llorens, S., et al., filed Mar. 30, 2018.

International Search Report and Written Opinion for International Application No. PCT/US2019/022809, dated Aug. 19, 2019.

* cited by examiner

2400

```
┌─────────────────────────────────────────────────────────────────┐
│ DETERMINE A PRESENCE OF A PERSONAL DEVICE WITHIN A RANGE OF A POS│
│ DEVICE (E.G., MERCHANT-FACING DEVICE AND/OR CUSTOMER-FACING DEVICE)│
│                              2402                               │
└─────────────────────────────────────────────────────────────────┘
                                  ↓
┌─────────────────────────────────────────────────────────────────┐
│ PROVISION FUNCTIONALITY TO THE PERSONAL DEVICE (E.G., DIRECTLY VIA│
│ NETWORK(S), INDIRECTLY VIA NETWORK(S), ACTIVATING FUNCTIONALITY THAT│
│ WAS PREVIOUSLY DOWNLOADED, VIA A WEB BROWSER, ETC.) TO CONFIGURE │
│   THE PERSONAL DEVICE TO PRESENT A UI AND/OR ENABLE THE PERSONAL│
│     DEVICE TO INTERACT WITH THE MERCHANT-FACING DEVICE AND/OR THE│
│                      CUSTOMER-FACING DEVICE                     │
│                              2404                               │
└─────────────────────────────────────────────────────────────────┘
                                  ↓
┌─────────────────────────────────────────────────────────────────┐
│              DETERMINE AN OCCURRENCE OF AN EVENT                │
│                              2406                               │
└─────────────────────────────────────────────────────────────────┘
                                  ↓
┌─────────────────────────────────────────────────────────────────┐
│        DE-PROVISION THE FUNCTIONALITY FROM THE PERSONAL DEVICE  │
│                              2408                               │
└─────────────────────────────────────────────────────────────────┘
```

FIG. 24

MULTI-FUNCTIONALITY CUSTOMER-FACING DEVICE

BACKGROUND

Customers can interact with merchants to conduct various transactions. For example, a customer can conduct a transaction with a merchant at a point-of-sale (POS) system using cash, a payment card, or other payment instrument. Many POS systems provide a merchant display, or other interface, for a merchant and a customer display or other interface for a customer. In general, the customer display is not visible to the merchant and the customers must guide themselves through the transaction utilizing the customer display or customer interface. Or, a merchant can work through a single display or other interface and must rotate, flip, or otherwise manipulate the display (e.g., via a rotatable display) to enable a customer to participate in the transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 24 illustrates an example process for temporarily provisioning functionality on a personal device of a user as described herein.

DETAILED DESCRIPTION

Figure 1:
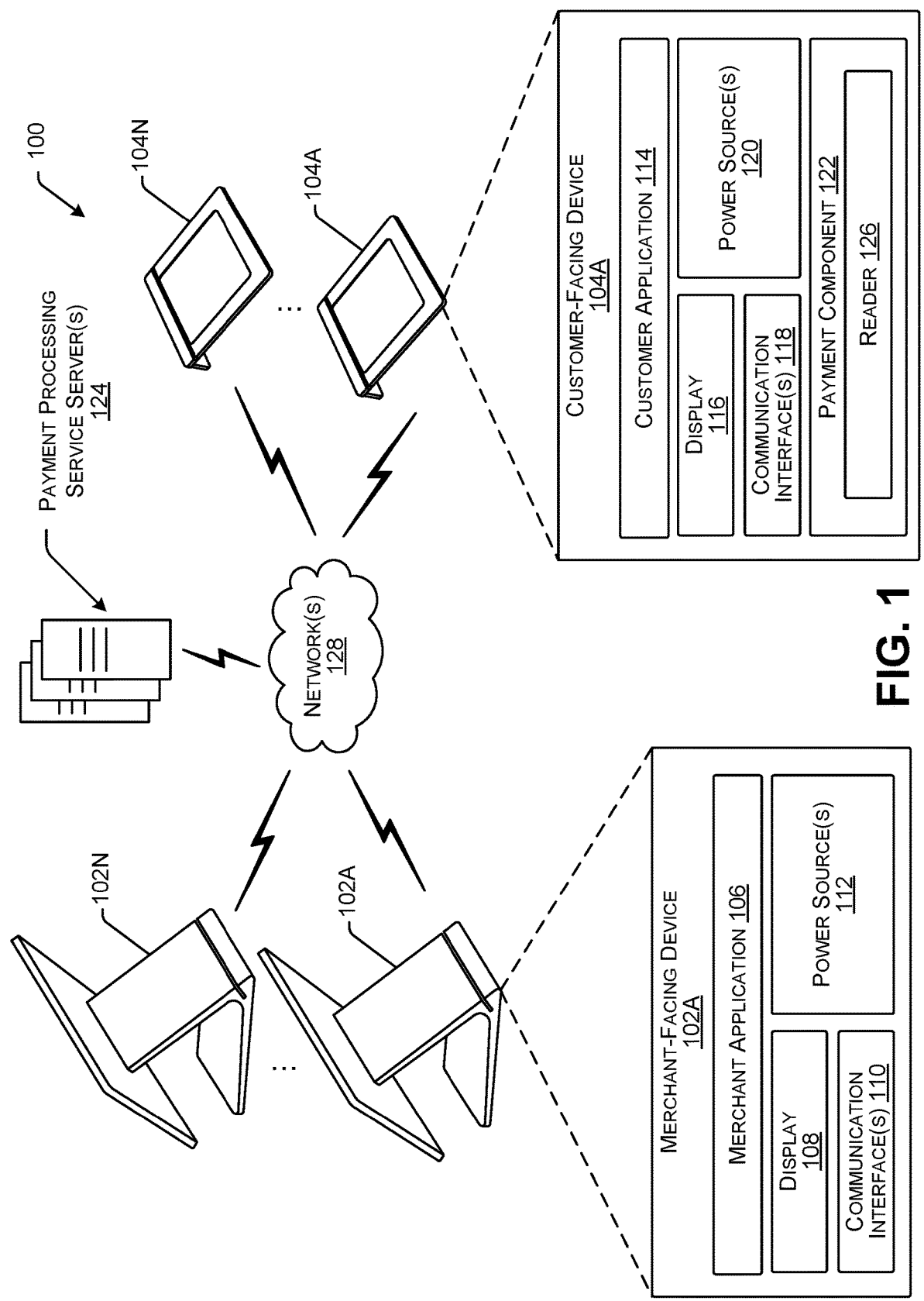
FIG. 1 illustrates an example environment, including a multi-device point-of-sale (POS) system, as described herein.

Techniques described herein are directed to a multi-device point-of-sale (POS) system and uses of the multi-device POS system in merchant environments. Customers can interact with merchants to conduct various transactions. For example, a customer can conduct a transaction with a merchant via a POS system using cash, a payment card, or other payment instrument. Many transactions require that the customer sign a physical receipt, electronically approve a transaction (e.g., by pressing an approve button on a user interface), electronically sign for the transaction (e.g., with a stylus or finger on an electronic signature capture device with a touch sensitive pad), enter an authorizing personal identification number (PIN), etc. Techniques described herein are directed to efficiently facilitating such transactions via the multi-device POS system.

The multi-device POS system described herein offers a complete POS solution for merchants. The multi-device POS system described herein enables merchants to process more transactions more efficiently than with existing POS systems. A multi-device POS system that includes a merchant-facing device and a customer-facing device is described. The merchant-facing device can be used (e.g., by a merchant or an employee or other agent working for the merchant) to perform merchant functionalities. The customer-facing device can be used (e.g., by a customer) to perform customer functionalities. As described herein, the multi-device POS system can enable a merchant-facing device to interact with multiple customer-facing devices and/or other merchant-facing devices. The flexible configurations enable efficient transaction processing via an enhanced customer experience.

"Merchant functionality," as described herein, can be associated with functionalities that are availed via the merchant application that can be executable by the at least one merchant-facing device (and/or in some examples, via the at least one customer-facing device). For instance, merchant functionality can enable a device to facilitate transactions between a merchant and a customer. In at least one example, the merchant functionality can enable a device to obtain payment data (e.g., from a customer-facing device) to settle a transaction and/or send payment data to payment processing service server(s) for payment processing. In additional or alternative examples, the merchant functionality can enable a device to generate and/or manage tickets, send and/or track invoices, manage inventory (e.g., edit inventory, customize products with photos, names, prices, etc., track inventory), send receipts via email, text, etc., apply discounts and issue refunds, access, search, and/or interact with real-time sales data and complete sales history, etc. In at least one example, the merchant functionality can be associated with a dashboard to enable an operator of a device to manage transactions, payments, and so forth, via the dashboard. In at least one example, such merchant functionalities can be presented via merchant user interfaces (UIs) that enable merchants, for example, to interact with merchant-facing devices to perform the merchant functionalities. Additional merchant functionalities are described below.

"Customer functionality," as described herein, can be associated with functionalities that are availed via a customer application executable by the customer-facing device (and/or in some examples, a merchant-facing device). For instance, customer functionality can enable a device to obtain payment data, and related information, and send the payment data, and related information, to a merchant-facing device. Additionally, the customer functionality can enable a device to present information to a customer via a UI. For instance, the customer functionality can enable a device to present, among other things, contents of a ticket (e.g., a cart, etc.), such as one or more items associated with a ticket, an amount of the ticket, and additional information (e.g., taxes, discounts (e.g., item-level or ticket-level), coupons, etc.) via a UI. In some examples, the customer functionality can enable a device to present calls to action via the UI. In at least one example, such customer functionalities can be presented via UIs that enable customers, for example, to interact with customer-facing devices to perform the customer functionalities. Additional customer functionalities are described below.

In at least one example, combinations of merchant functionalities and customer functionalities can be used to implement a payment flow associated with processing a transaction. For instance, in at least one example, a merchant (or an employee or other agent acting on behalf of the merchant) can utilize the multi-device POS system to add items (e.g., goods or services) offered for sale (or other means of acquisition) by the merchant to a ticket and present the ticket to a customer. The customer can review the ticket via a UI presented by the multi-device POS system. In at least one example, the multi-device POS system can present a call to action to a customer, requesting the customer provide payment for a cost of the items associated with the ticket. The multi-device POS system can receive payment data that is associated with a payment instrument and can send the payment data to a payment processing service for processing the payment data. In at least one example, the payment processing service can send an authorization request to a card network, or other payment service, to determine whether the payment data is authorized for a cost of the transaction. The card network, or the other payment service, can send an indication whether the payment data is authorized (e.g., approved) or not authorized (e.g., declined) to the payment processing service. The payment processing service can forward the indication to the multi-device POS system. Upon receiving an indication that the payment data was authorized, the transaction can be settled. In some examples, the multi-device POS system can be used to request feedback, gratuity, loyalty information, etc. As described herein, the merchant-facing device can be used to perform one or more of the steps of the payment flow described above. Additionally, the customer-facing device can be used to perform one or more steps of the payment flow described above. As a result, the multi-device POS system can enable merchants and customers to interact more efficiently, and in some examples, more securely, while a transaction is processed.

Various configurations of the multi-device POS system are described herein. For instance, as described herein, the multi-device POS system enables merchants to couple one or more merchant-facing devices to one or more customer-facing devices. That is, the multi-device POS system enables merchants to arrange various components (e.g., the merchant-facing device(s) and/or the customer-facing device(s)) in flexible configurations. Such flexible configurations enable merchants to process multiple transactions in parallel (or substantially in parallel) (e.g., via multiple customer-facing devices and/or multiple merchant-facing devices) and/or to process one or more steps of a transaction serially via multiple devices (e.g., via multiple merchant-facing devices or multiple customer-facing devices). The multi-device POS system eliminates the need for a rotatable display that rotates from a merchant-facing position to a customer-facing position, which enables merchants to complete transactions faster and more efficiently. Furthermore, the flexible configurations available via the multi-device POS system described herein enable customers to easily provide payment information for completing transactions, often via personalized customer experiences, in a more secure manner.

Techniques described herein are directed to temporarily provisioning merchant functionality and/or customer functionality on devices such that the devices can interact with the multi-device POS system. For instance, in some examples, techniques described herein are directed to temporarily provisioning functionality on a personal device of a customer or a merchant (e.g., an employee or other agent of a merchant). As a result, the personal device can interact with a merchant-facing device and/or a customer-facing device to participate in processing transactions, as described above. Additionally or alternatively, merchant functionality and/or customer functionality can be temporarily provisioned on merchant-facing devices and/or customer-facing devices, as described below, to enable the devices to interact with the multi-device POS system.

In some examples, components of the multi-device POS system can implement more than one functionality. For instance, in some examples, a merchant-facing device of the multi-device POS system can implement merchant functionality and customer functionality. In at least one example, the customer functionality can be associated with an instance of a customer application installed on and/or executing on the merchant-facing device. In other examples, the customer functionality can be provisioned via a model-view-controller (MVC) framework, as described below. In additional or alternative examples, a customer-facing device of the multi-device POS system can implement customer functionality and merchant functionality. In at least one example, the merchant functionality can be associated with an instance of a merchant application installed on and/or executing on the customer-facing device. In other examples, the merchant functionality can be provisioned via a MVC framework, as described below. That is, components of the multi-device POS system can toggle between different types of functionality depending on the state of the device (e.g., merchant state or customer state). Such flexibility can enable components of the multi-device POS system to offer additional or alternative functionality to merchants and/or customers to increase the efficiency in which transactions are processed and enhance the customer experience, in some examples, by providing more security.

FIG. 1 illustrates an example environment 100, including a multi-device POS system, as described herein. In at least one example, the multi-device POS system 100 can include one or more merchant-facing devices 102A-102N and one or more customer-facing devices 104A-104N. FIG. 1 includes two merchant-facing devices 102A and 102N and two customer-facing devices 104A and 104N; however, in additional or alternative examples, the multi-device POS system 100 can include any number of merchant-facing devices and any number of customer-facing devices, as illustrated in FIGS. 2-6 and 12-15.

For ease of understanding, details associated with a single merchant-facing device 102A are described below; however, each merchant-facing device 102A-102N can have substantially identical hardware and firmware configurations. Furthermore, each of the merchant-facing devices 102A-102N can have a substantially similar software configuration out of the box, but software associated with individual merchant-facing devices 102A-102N can diverge based on use. Similarly, for ease of understanding, details associated with a single customer-facing device 104A are described below; however, each customer-facing device 104A-104N can have substantially identical hardware and firmware configurations. Furthermore, each of the customer-facing devices 104A-104N can have a substantially similar software configuration out of the box, but software associated with individual customer-facing devices 104A-104N can diverge based on use.

The merchant-facing device 102A can include an instance of a merchant application 106, a display 108, communication interface(s) 110, and power source(s) 112. The merchant-facing device 102A can be coupled to at least one customer-facing device 104A. That is, as described below, the merchant-facing device 102A can store a device identifier associated with at least one customer-facing device 104A to enable the devices to transmit data (e.g., via a wired or wireless connection) between one another. The customer-facing device 104A can include an instance of a customer application 114, a display 116, communication interface(s) 118, power source(s) 120, and a payment component 122. In some examples, the customer-facing device 104A can be docked on the merchant-facing device 102A. In other examples, the customer-facing device 104A can be undocked from the merchant-facing device 102A. The customer-facing device 104A can communicate with the merchant-facing device 102A via each device's communication interface(s) 118 and 110, respectively.

The merchant-facing device 102A can include an instance of a merchant application 106 that is installed to configure the merchant-facing device 102A as a POS terminal capable of performing merchant functionality, in some examples via one or more interactions with the customer-facing device 104A. For instance, the merchant application 106 can enable a merchant to participate in transactions with one or more customers. That is, the merchant application 106 can configure the merchant-facing device 102A to handle a customer-facing device 104A. In some examples, the merchant application 106 can determine whether a customer-facing device 104A is coupled to and/or connected to the merchant-facing device 102A, and can provide an indication of such via a UI. In at least one example, the merchant application 106 can indicate that a customer-facing device 104A is not coupled to and/or connected to the merchant-facing device 102A.

In at least one example, the merchant application 106 can configure the merchant-facing device 102A to participate in transactions via one or more interactions with the customer-facing device 104A (or a customer application, or other provisioned customer functionality, executable by the merchant-facing device 102A and/or another device). For instance, in some examples, the customer-facing device 104A can obtain payment data via contact (e.g., swipe, dip, etc.) and/or contactless (e.g., tap) interactions, as described below, and can transmit the payment data to the merchant application 106 for further processing. In some examples, the customer-facing device 104A can obtain payment data via any other form of a payment instrument (e.g., unique identifier, biometric identifier, etc.). The merchant application 106 can configure the merchant-facing device 102A to interact with the customer-facing device 104A to obtain the payment data. For instance, the merchant application 106 can cause a selectable graphical element to be presented that triggers a payment request (e.g., generation of instructions for the presentation of a UI presenting such a request) to be output via a customer-facing device 104A coupled to the merchant-facing device 102A. Furthermore, the merchant application 106 can configure the merchant-facing device 102A to transmit received payment data to server(s) associated with a payment processing service (e.g., payment processing service server(s) 124) to process the transactions. In at least one example, the merchant application 106 can track a status of a payment flow between the merchant-facing device 102A and a customer-facing device 104A coupled to the merchant-facing device 102A, and can output an indication of the status via a UI (e.g., via a status bar).

Additionally, the merchant application 106 can enable a merchant to record cash, gift cards, and other forms of tender. Furthermore, in at least one example, the merchant application 106 can enable the merchant-facing device 102A to perform card-not-present (CNP) transactions. For instance, in such an example, the merchant application 106 can cause a UI to be presented that enables a merchant, employee, or other agent working on behalf of the merchant to input payment data via the UI. A merchant can utilize a CNP transaction if the payment reader 122 is not working or a payment instrument is not being read, for example. Additionally or alternatively, a merchant can utilize a CNP transaction if it is taking an order over the phone, for example.

Furthermore, in at least one example, the merchant application 106 enables the merchant-facing device 102A to operate in an offline mode. A merchant-facing device 102A can enter an offline mode when there is a loss of connectivity with the network(s) 128 (e.g., the merchant-facing device 102A cannot communicate with the payment processing service server(s) 124), for example. In such an example, the merchant application 106 can enable the merchant-facing device 102A to store data locally until a network connection is restored, and to send the stored data to the payment processing service server(s) 124 upon establishing connectivity. For instance, in at least one example, the merchant application 106 can store payment data while the merchant-facing device 102A is operating in offline mode and can forward the payment data to the payment processing service server(s) 124 for processing payments upon connectivity being restored (e.g., the merchant-facing device 102A returns to online mode).

In additional or alternative examples, the merchant application 106 can enable merchants to generate and/or manage tickets (e.g., including open ticket management and/or split ticket management), send and/or track invoices, manage inventory (e.g., edit inventory, customize items (goods or services) in the inventory with photos, names, prices, etc., track inventory, etc.), send receipts via email, text, etc., apply discounts and issue refunds, access, search, and/or interact with real-time sales data and complete sales history, etc. via the merchant-facing device 102A. For the purpose of this discussion, a "ticket" is used to describe a representation of a transaction between a merchant and a customer wherein a customer purchases, or otherwise acquires, one or more items from the merchant. A ticket can be generated by a merchant-facing device 102 (e.g., an order) or a customer-facing device (e.g., a cart), as described below. In at least one example, a data structure can represent a ticket and a representation of the data structure can be presented via a UI of the merchant-facing device 102A and/or the customer-facing device 104A to facilitate the transaction. In at least one example, the merchant application 106 can be associated with a dashboard to enable the merchant to manage transactions, payments, and so forth, via the dashboard. For the purpose of this discussion, a dashboard can be a GUI that provides an at-a-glance view of key information (e.g., associated with transactions, payments, etc.).

In addition to the payment processing functionalities described above, the merchant application 106 can further enable the merchant-facing device 102A to manage employees, manage payroll, facilitate rewards programs, etc.

Furthermore, the merchant application 106 can include functionality to control hardware settings in both the merchant-facing device 102A and the customer-facing device 104A. Additionally or alternatively, the merchant application 106 can include functionality to update and/or manage settings, applications, and/or firmware on the merchant-facing device 102A and/or the customer-facing device 104A (or other merchant-facing devices). In at least one example, the merchant application 106 can manage states of the merchant-facing device 102A and/or the customer-facing device 104A (e.g., signed in, signed out, locked, unlocked, display on, display off, tampered with, etc.). Furthermore, in at least one example, the merchant application 106 can include functionality to couple the merchant-facing device 102A with other merchant-facing device(s) 102N and/or customer-facing device(s) 104A-104N. Additional details associated with such coupling are described below with respect to FIGS. 7 and 16. In some examples, the merchant application 106 can provision merchant functionality and/or customer functionality on personal devices of merchants and/or customers, as described below. Further, the merchant application 106 can include functionality to couple the merchant-facing device 102A to other peripheral devices (e.g., cash drawer, printer(s), barcode scanner(s), keyboard, scale, kitchen display system (KDS), etc.).

In some examples, the merchant application 106 can facilitate onboarding to enable merchants to integrate the merchant-facing device 102A within the payment processing environment (e.g., with remotely located server(s) associated with the payment processing service 124 and/or with peripheral devices (e.g., cash drawer, printer(s), barcode scanner(s), keyboard, scale, kitchen display system (KDS), etc.)). In at least one example, a merchant can enter his or her log-in information via the merchant application 106 to access an account associated with the merchant. In such an example, the payment processing service server(s) 124 can receive the log-in information, authenticate the merchant using the log-in information, and send merchant-specific information to the merchant application 106. Accordingly, by logging in, the merchant can access account information associated with an existing account. In other examples, if a merchant does not have an existing account, the merchant application 106 can facilitate a device identifier process for establishing a new account with the payment processing service.

In some examples, the merchant application 106 can perform a tamper check to ensure that devices coupled to the merchant-facing device 102A have not been tampered with or otherwise compromised. In at least one example, the merchant application 106 can receive an indication of tampering and can surface such information via a UI as described herein. In addition to managing tamper checks, the merchant application 106 can provide warnings (e.g., no network connection, version mismatch, new device coupled, settings mismatches, eligibility or lack thereof, unactivated device, etc.) and enable support and/or troubleshooting functionality.

In at least one example, the merchant application 106 can be associated with a UI that enables merchants to, among other things, perform one or more of the merchant-facing functionalities described above. In at least one example, the UI can be presented via a webview or web browser that is configured to enable a merchant to access services supported by the payment processing service. In other examples, the UI can be presented via an application (e.g., the merchant application 106), which can be a mobile application or a desktop application, which is provided by the payment processing service provider or is an otherwise dedicated application. In some examples, the UI can support third-party content, which can be linked or otherwise accessible to the merchant. In at least one example, the UI can be a GUI which can present graphical elements via the UI to convey information to merchants and/or customers and/or otherwise enable the merchant to perform merchant operations.

Throughout this disclosure, reference is made to presenting a UI. It should be noted that in some examples, the merchant application 106 can generate instructions for presenting a UI and may execute such instructions for presenting the UI.

For the purpose of this discussion, a reference to the "merchant application 106" on the merchant-facing device 102A or any other merchant-facing device 102N corresponds to an instance of the merchant application 106 executable on the corresponding device. That is, the functionality described above can be performed via an instance of the merchant application 106 executable by a respective device.

The customer-facing device 104A can include an instance of a customer application 114 that is installed to configure the customer-facing device 104A as a POS terminal capable of performing customer functionality. For instance, the customer application 114 can configure the customer-facing device 104A to obtain payment data, and related information, and send the payment data, and related information, to the merchant application 106 on the merchant-facing device 102A. In at least one example, the customer application 114 can configure the customer-facing device 104A to request and/or receive authentication information (e.g., signature, PIN, biometric, etc.) to authenticate the payment data. In at least one example, the customer application 114 can receive payment data from a payment component 122 and transmit the payment data to the merchant-facing device 102A.

In at least one example, the payment component 122 can be housed in, or otherwise associated with, a secure enclave. The payment component 122 can perform functionalities to control payment interfaces (e.g., a contactless interface, a contact interface, etc.), a wireless communication interface, a wired interface, a user interface (e.g., a signal condition device (field-programmable gate array (FPGA))), etc. In at least one example, the payment component 122 can include a reader 126, which can read payment data associated with a payment instrument. In some examples, the reader 126 can be a Europay, MASTERCARD®, VISA® (EMV) payment reader, a read head for reading a magnetic strip of a payment card, etc. The payment data can include a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts can be made, etc. In at least one example, the payment component 122 can include encryption technology for encrypting the payment data upon receiving the payment data.

Additionally or alternatively, the customer application 114 can configure the customer-facing device 104A to present information to customers via a UI. In at least one example, the UI can be presented via a webview or web browser that is configured to enable a customer to view information and/or interact with the merchant-facing device 102A. In other examples, the UI can be presented via an application (e.g., the customer application 114), which can be a mobile application or a desktop application, which is provided by the payment processing service provider or is an otherwise dedicated application. In at least one example, the UI can be a GUI which can present graphical elements via the UI to convey information to customers and/or merchants.

Throughout this disclosure reference is made to presenting a UI. It should be noted that in some examples, the customer application 114 can generate instructions for presenting a UI and may execute such instructions for presenting the UI. Alternatively, in some examples, the merchant application 106 can generate the instructions and send the instructions to the customer application 114. In such examples, the customer application 114 can execute the received instructions for presenting the UI.

In at least one example, the customer application 114 can configure the customer-facing device 104A to, among other things, present contents of a ticket (e.g., a cart, etc.) to a customer via the UI. For instance, the customer application 114 can present one or more items associated with a ticket via the UI. Additionally or alternatively, the customer application 114 can configure the customer-facing device 104A to present an amount of the ticket to the customer via the UI. Additional information such as taxes, discounts (e.g., item-level or ticket-level), coupons, etc. can also be surfaced via the UI.

In some examples, the customer application 114 can configure the customer-facing device 104A to present calls to action via the UI. For instance, when a merchant indicates that transaction is complete, the customer application 114 can present, via the UI, an instruction to a customer to swipe, insert, or tap a payment instrument to pay for the transaction. Or, the customer application 114 can present, via the UI, a request for authentication information (e.g., PIN, biometric input, signature, etc.) from a customer, gratuity, feedback, loyalty information, etc. Additionally or alternatively, the customer application 114 can configure the customer-facing device 104A to present information associated with processing of a transaction via the UI. For instance, the customer application 114 can configure the customer-facing device 104A to present a message that a customer's payment instrument is approved, is being authorized, is declined, etc. In some examples, the customer application 114 can configure the customer-facing device 104A to present a message associated with a split tender or a refund.

In at least one example, the customer application 114 can manage states of the customer-facing device 104A (e.g., signed in, signed out, locked, unlocked, display on, display off, tampered with, processing status (e.g., ready, idle, ready to read, processing, card read successfully, processing error, etc.), etc.). Furthermore, in at least one example, the customer application 114 can include functionality to couple the customer-facing device 104A to merchant-facing device(s) 102A-102N and/or other customer-facing device(s) 104N. Additional details associated with coupling a merchant-facing device and a customer-facing device are described below with reference to FIG. 7. In at least one example, the customer application 114 can be configured to provision functionality (e.g., customer functionality and/or merchant functionality) to a personal device of a merchant and/or a customer, as described below.

In some examples, the customer application 114 can configure the customer-facing device 104A to detect errors and present messages associated with such errors. For instance, customer errors can include a payment instrument not being charged, an amount charged violating transaction limitations/restrictions, payment not being able to be processed in a particular country, an improper payment method (e.g., swipe when the payment instrument is a EMV card), exceeding a PIN try limit, etc. Other errors can include merchant errors, terminal errors (e.g., connectivity, power failure, tamper error, etc.), payment instrument errors (e.g., information missing, card not supported, etc.), etc.

For the purpose of this discussion, a reference to the "customer application 114" on the customer-facing device 104A or any other customer-facing device 104N corresponds to an instance of the customer application 114 executable on the corresponding device. That is, the functionality described above can be performed via an instance of the customer application 114 executable by a respective device.

The merchant application 106 and the customer application 114 can configure the merchant-facing device 102A or the customer-facing device 104A, respectively, to perform additional or alternative functionalities as described herein. In some examples, the merchant application 106 and the customer application 114 can be stored on the merchant-facing device 102A or the customer-facing device 104A, respectively, when a merchant purchases or otherwise acquires the merchant-facing device 102A or the customer-facing device 104A (e.g., "out of the box"). In other examples, the merchant application 106 and the customer application 114 can be downloaded onto the merchant-facing device 102A or the customer-facing device 104A, respectively. In at least one example, as described herein, the merchant application 106 can be temporarily provisioned on the merchant-facing device 102A and/or the customer application 114 can be temporarily provisioned on the customer-facing device 104A. Further, in some examples, as described herein, the merchant application 106 can be temporarily provisioned (or activated) on the customer-facing device 104A and/or and the customer application 114 can be temporarily provisioned (or activated) on the merchant-facing device 102A. In such examples, the merchant-facing device 102A can perform both merchant and customer functionalities and the customer-facing device 104A can perform both customer and merchant functionalities, as described below.

The display 108 and/or the display 116 can employ any suitable display technology. For example, the display 108 and/or the display 116 can be a liquid crystal display, a plasma display, a light emitting diode display, an OLED (organic light-emitting diode) display, an electronic paper display, or any other suitable type of display able to present digital content thereon. In some examples, the display 108 and/or the display 116 can have a touch sensor associated with the display 108 and/or the display 116 to provide a touchscreen display configured to receive touch inputs for enabling interaction with a UI presented on the display 108 and/or the display 116. Accordingly, implementations herein are not limited to any particular display technology. Further, in some examples, the merchant-facing device 102A and/or the customer-facing device 104A may not have a display.

The communication interface(s) 110 and/or the communication interface(s) 118 can include one or more interfaces and hardware components for enabling communication between the merchant-facing device 102A and the customer-facing device 104A and/or various other devices, such as over one or more networks 128 or directly. In at least one example, the network(s) 128 can include long-range communication networks and/or short-range communication networks. For instance, the network(s) 128 can include the Internet, cable networks, cellular networks, wireless networks (e.g., Wi-Fi) and wired networks, Bluetooth® networks, Bluetooth® low energy (BLE) networks, Near-field Communication (NFC) (e.g., NFC signals), etc. Accordingly, in at least one example, the communication interface(s) 110 and/or the communication interface(s) 118 can enable communication through one or more of the Internet, cable networks, cellular networks, wireless networks (e.g., Wi-Fi) and wired networks, Bluetooth®, BLE, NFC, etc. Additionally or alternatively, the communication interface(s) 110 and/or the communication interface(s) 118 can include one or more Universal Serial Bus (USB) interfaces, Ethernet interfaces, etc.

The power source(s) 112 and/or the power source(s) 120 can include one or more power supplies such as a physical connection to AC power or a battery. The power source(s) 112 and/or the power source(s) 120 can include power conversion circuitry for converting AC power and generating a plurality of DC voltages for use by the merchant-facing device 102A. When the power source(s) 112 and/or the power source(s) 120 include a battery, the battery can be charged via a physical power connection, via inductive charging, or via any other suitable method. Although not depicted as physically connected to the other components of the merchant-facing device 102A in FIG. 1, the power source(s) 112 can supply a variety of voltages to the components of the merchant-facing device 102A in accordance with the requirements of those components. Similarly, the power source(s) 120 can supply a variety of voltages to the components of the customer-facing device 104A in accordance with the requirements of those components.

Multi-Device POS System Configuration: Multiple Customer-Facing Devices Coupled to a Merchant-Facing Device As described above, any number of customer-facing devices can be coupled to any number of merchant-facing devices in a multi-device POS system configuration. FIGS. 2-6 illustrate various configurations of multiple customer-facing devices coupled to a merchant-facing device.

Figure 2:
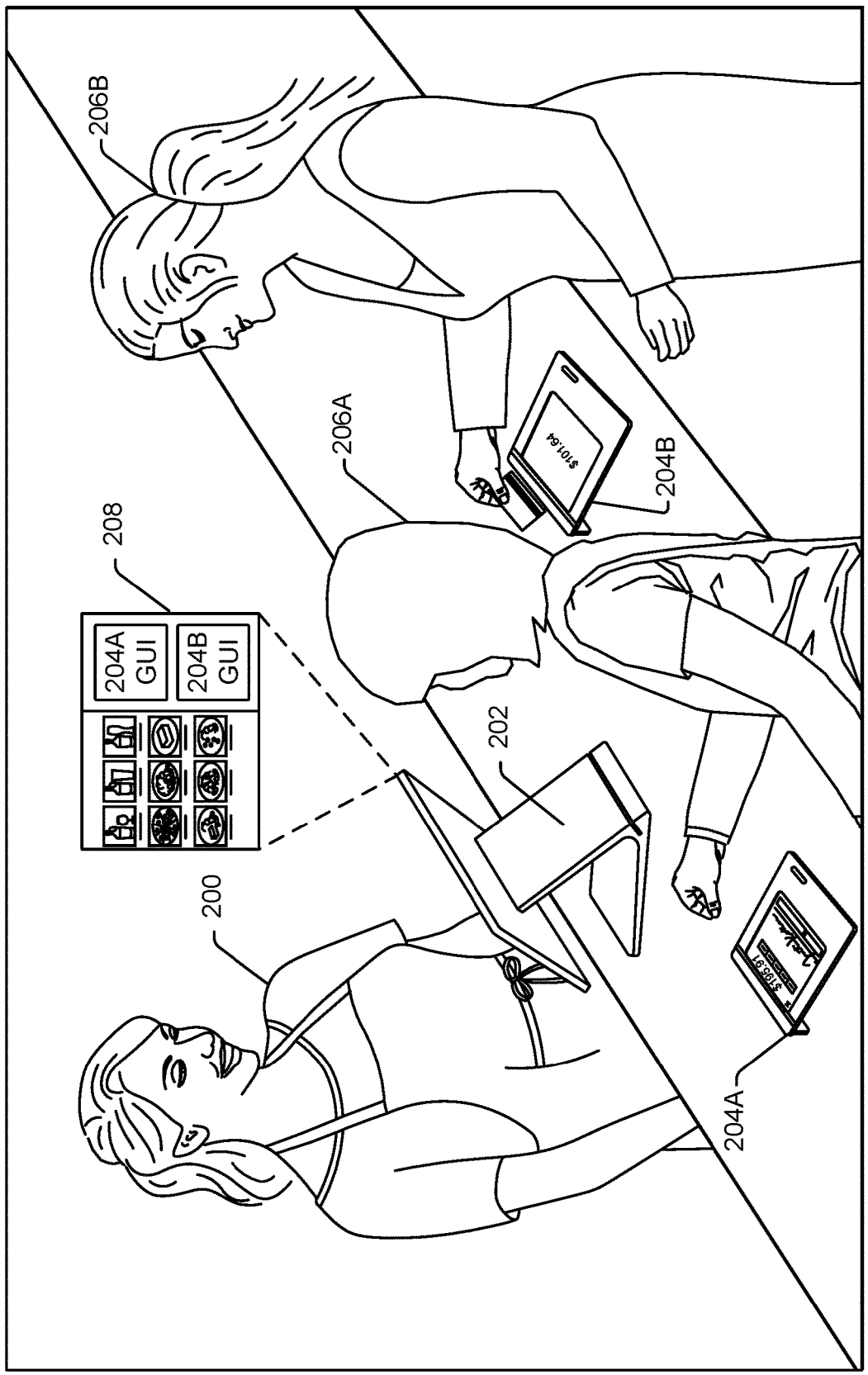
FIG. 2 illustrates a first example configuration of a multi-device POS system wherein a merchant-facing device is coupled to two or more customer-facing devices as described herein.

FIG. 2 illustrates a first example configuration of a multi-device POS system as described herein. As illustrated, a merchant (or an agent working on behalf of the merchant) 200 can interact with a merchant-facing device 202, which can correspond to the merchant-facing device 102A described above with reference to FIG. 1. The merchant-facing device 202 can be coupled to at least two customer-facing devices 204A and 204B. The customer-facing devices 204A and 204B can correspond to the customer-facing device 104A and 104N described above with reference to FIG. 1. Two customers 206A and 206B are shown interacting with the at least two customer-facing devices 204A and 204B. In FIG. 2, each of the customer-facing devices 204A and 204B are being used for processing separate transactions in parallel. That is, the first customer-facing device 204A is communicating with the merchant-facing device 202 to process a first transaction for the first customer 206A and the second customer-facing device 204B is communicating with the merchant-facing device 202 to process a second transaction for the second customer 206B.

In such an example, the merchant-facing device 202 can store a first data structure (e.g., a ticket) associated with a first transaction between the merchant 200 and the first customer 206A and, when the first customer 206A is ready to pay, for example, the merchant 200 can interact with the merchant-facing device 202 to send the first data structure (or a duplicate thereof) from the merchant-facing device 202 to the first customer-facing device 204A (e.g., from the merchant application to the customer application). The customer application executable by the first customer-facing device 204A can present a UI on the display of the first customer-facing device 204A to instruct the first customer 206A to provide payment data and complete the transaction.

Further, the merchant-facing device 202 can store a second data structure (e.g., a ticket) associated with a second transaction between the merchant 200 and the second customer 206B and, when the second customer 206B is ready to pay, for example, the merchant 200 can interact with the merchant-facing device 202 to send the second data structure (or a duplicate thereof) from the merchant-facing device 202 to the second customer-facing device 204A (e.g., from the merchant application to the customer application). The customer application executable by the second customer-facing device 204B can present a UI on the display of the second customer-facing device 204B to instruct the second customer 206B to provide payment data and complete the transaction.

In at least one example, the merchant application executable by the merchant-facing device 202 can present a UI 208 that enables the merchant 200 to perform merchant-facing interactions and also view actions of each of the customers 206A and 206B. For instance, the UI 208 can present a picture of a first UI presented via the first customer-facing device 204A and a picture of a second UI presented via the second customer-facing device 204B, for example in a picture-in-picture presentation. In at least one example, the merchant 200 can interact with a portion of the UI 208 corresponding to a particular customer-facing device to perform actions or otherwise interact with the corresponding transaction. For instance, the merchant 200 can interact with the picture of the first UI, which can be associated with a selectable control, actuation of which causes the UI presented via the first customer-facing device 204A to be presented via the UI 208 (e.g., temporarily replacing the picture-in-picture presentation, for example).

In some examples, the merchant-facing device 200 can determine an attribute associated with a customer and can direct the customer to a particular customer-facing device for completing a transaction. For instance, if a customer speaks a particular language and a customer-facing device is configured in that particular language, the merchant-facing device can direct the customer to the customer-facing device configured in the particular language. Additionally or alternatively, customer-facing devices can be associated with accommodations (e.g., Braille touchpads, high contrast displays, audible outputs, etc.) to enable customers with hearing and/or visual impairments to interact with the customer-facing devices. In such examples, responsive to determining that a customer is associated with a hearing and/or visual impairment, the merchant-facing device 200 can direct the customer to a specially-configured customer-facing device.

As an alternative example, a similar configuration of the multi-device POS system can be used to process different tickets associated with a same transaction. For instance, techniques described herein can be used for split-ticket handling. That is, the merchant 200 can interact with the merchant-facing device 202 to allocate one or more items associated with a ticket to a first ticket (e.g., and, thus, a first data structure) and one or more items associated with the ticket to a second ticket (e.g., and, thus, a second data structure), and so on. In some examples, the merchant 200 can allocate one or more items from a ticket to another ticket (without creating two new tickets and/or data structures). In at least one example, the merchant 200 can interact with a UI to send instructions for presenting a first ticket of a split ticket via the first customer-facing device 204A and a second ticket of the split ticket via the second customer-facing device 204B. As a result, the first customer 206A can provide payment data for the first split ticket via the first customer-facing device 204A and the second customer 206B can provide payment data for the second split ticket via the second customer-facing device 204B.

Additional details associated with processing multiple transactions in parallel via multiple customer-facing devices is described below with reference to FIGS. 8 and 9.

Figure 3:
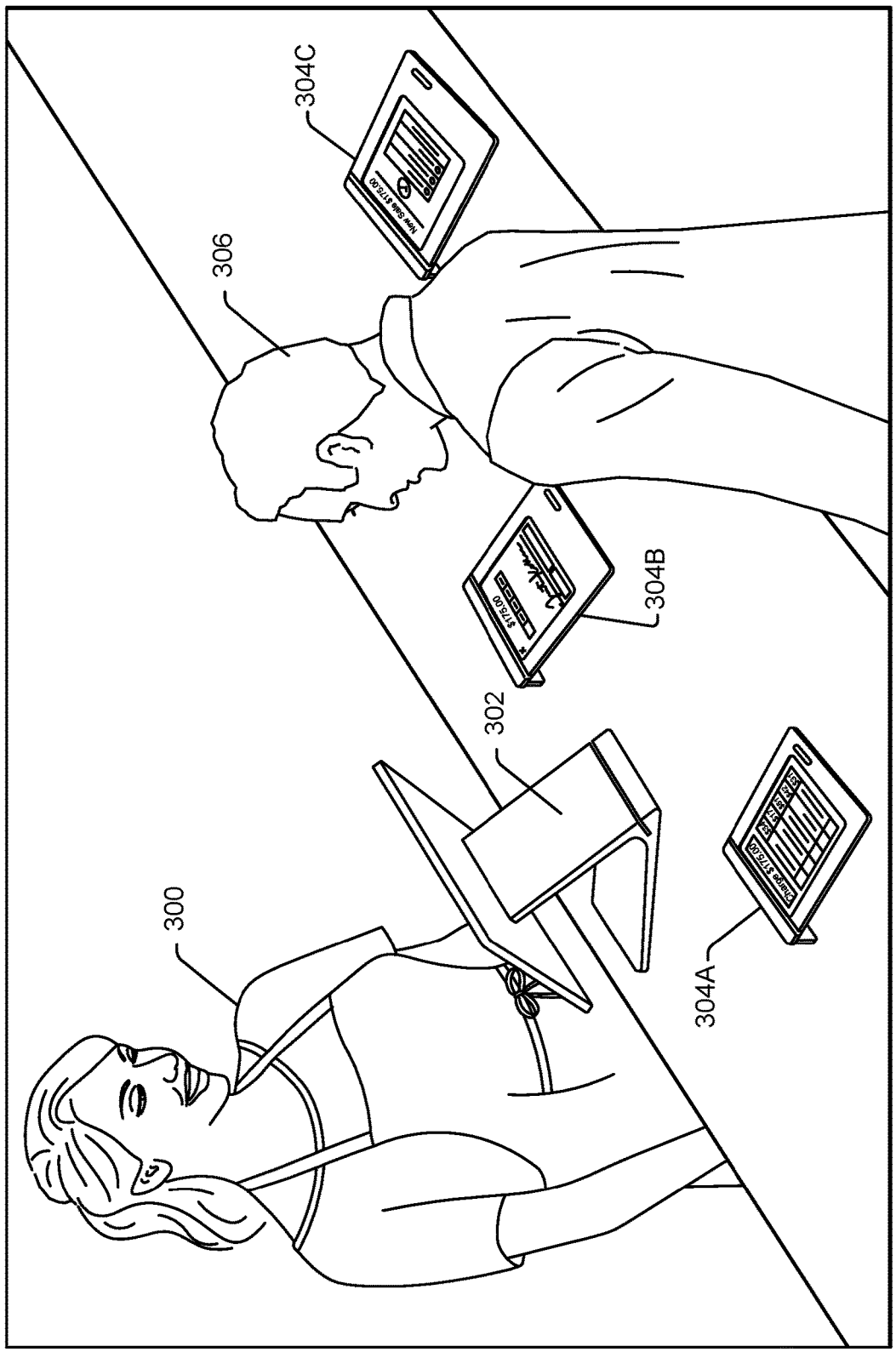
FIG. 3 illustrates a second example configuration of a multi-device POS system wherein a merchant-facing device is coupled to two or more customer-facing devices as described herein.

FIG. 3 illustrates a second example configuration of a multi-device POS system as described herein. As illustrated, a merchant (or an agent working on behalf of the merchant) 300 can interact with a merchant-facing device 302, which can correspond to the merchant-facing device 102A described above with reference to FIG. 1. As an example, the merchant-facing device 302 can be coupled to at least three customer-facing devices 304A, 304B, and 304C. Each of the customer-facing devices 304A-304C can correspond to the customer-facing devices 104A-104N described above with reference to FIG. 1. In FIG. 3, a single customer 306 is illustrated. In FIG. 3, each of the customer-facing devices 304A-304C is being used for processing separate steps in a single transaction. That is, the first customer-facing device 304A is communicating with the merchant-facing device 302 to process a first step in a transaction with the customer 306 (e.g., confirming the cost of the transaction, observing items associated with a ticket, and/or providing payment data), the second customer-facing device 304B is communicating with the merchant-facing device 302 to process another step in a transaction with the customer 306 (e.g., inputting a gratuity and providing authorization for the payment), and the third customer-facing device 304C is communicating with the merchant-facing device 302 to process yet another step in the transaction with the customer 306 (e.g., electing a receipt delivery option).

Any number of customer-facing devices can be used to process one or more steps associated with a transaction. In some examples, one or more customer-facing devices can be used to process one or more steps of a payment flow for settling a transaction. For instance, in a non-limiting example, the first customer-facing device 304A can output a UI that requests payment data from the customer 306. In such an example, the first customer-facing device 304A can send the payment data to the merchant-facing device 302. The merchant-facing device 302 can associate the payment data with the data structure corresponding to the transaction. As the customer 306 moves to another customer-facing device, such as customer-facing device 304B or 304C, the customer 306 can provide payment information (e.g., via a swipe, dip, or tap) to authenticate the customer 306 at the other customer-facing device to complete a subsequent step of the payment flow (e.g., adding gratuity, providing feedback, imputing loyalty information, etc.). Other identifiers can be used for authentication, as described in additional detail below.

In some examples, one or more steps can be grouped together and completed via a single customer-facing device. In other examples, each step can be performed on a different customer-facing device. In some examples, one or more steps can be grouped based on whether the steps are mandatory or optional. For instance, in an example, a first customer-facing device can obtain payment data and authentication information for authenticating the customer and the payment data (e.g., mandatory steps) and a second customer-facing device can enable the customer to add a gratuity, provide feedback, input loyalty information, etc. (e.g., optional steps). Additional details associated with processing a transaction via multiple customer-facing devices are described below with reference to FIG. 10.

In at least one example, different customer-facing devices can be associated with particular accommodations and the merchant-facing device 302 can direct a customer associated with a particular attribute to particular customer-facing device(s) based on the particular attribute. Additional details associated with such an example are described below with reference to FIG. 11.

It also should be noted that while FIG. 3 illustrates a single customer 306, in some examples, when a first customer is finished interacting with a first customer-facing device, the first customer-facing device can be used for processing a transaction for a second customer (while the first customer interacts with another customer-facing device), and so on.

Furthermore, while FIG. 3 is illustrated with each of the customer-facing devices 304A-304C being positioned at a counter and/or proximate to the merchant-facing device 302, in some examples, one or more of the customer-facing devices 304A-304C can be positioned throughout a merchant environment. For instance, in at least one example, the customer 306 can interact with the first customer-facing device 304A to perform a first step in a transaction and sit at a table, for example, in a restaurant. The table can be associated with a second customer-facing device, and the customer 306 can interact with the second customer-facing device to perform a subsequent step at the table. Additional or alternative scenarios are considered to be within the scope of this disclosure.

Figure 4:
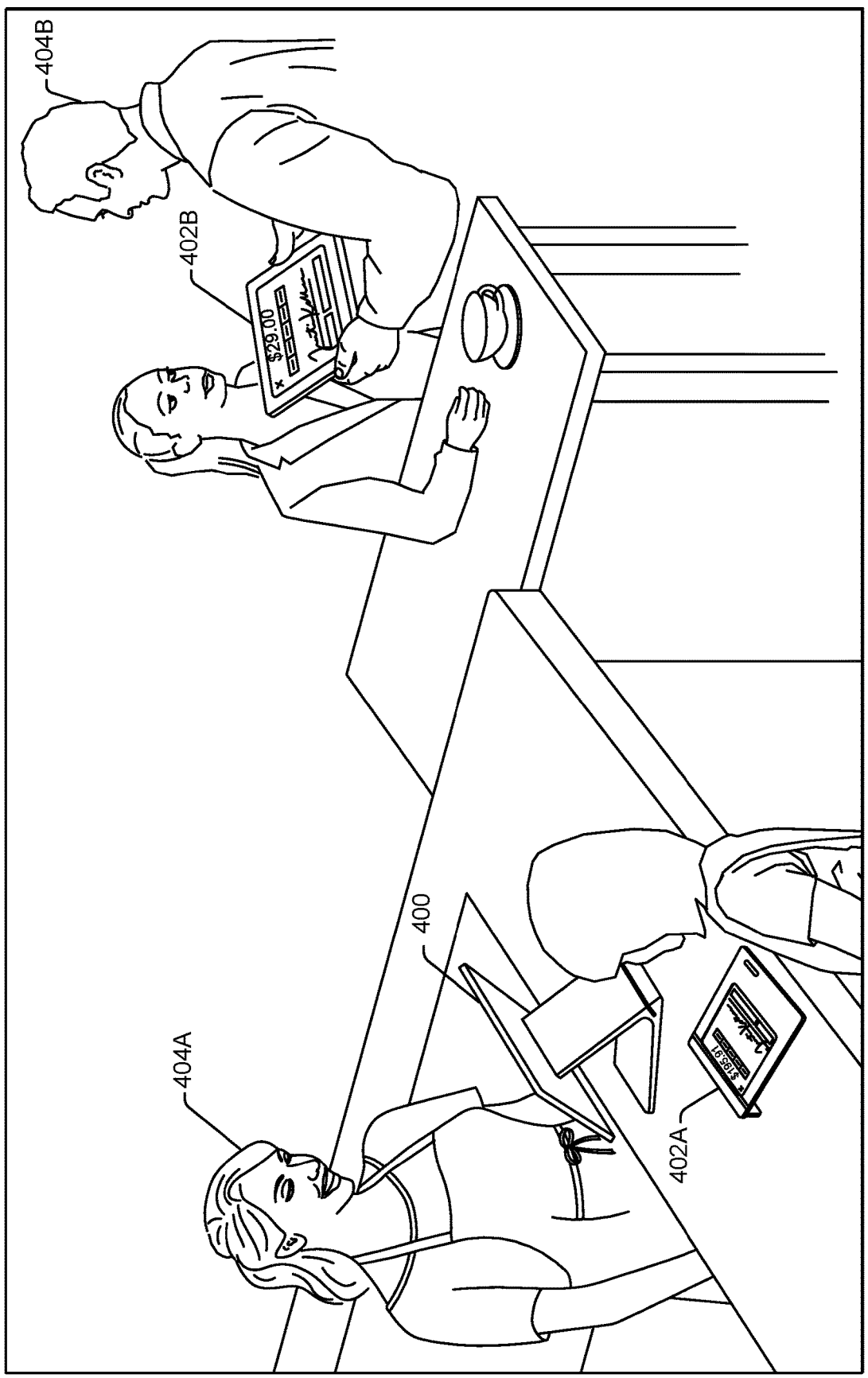
FIG. 4 illustrates a third example configuration of a multi-device POS system wherein a merchant-facing device is coupled to two or more customer-facing devices as described herein.
Figure 5:
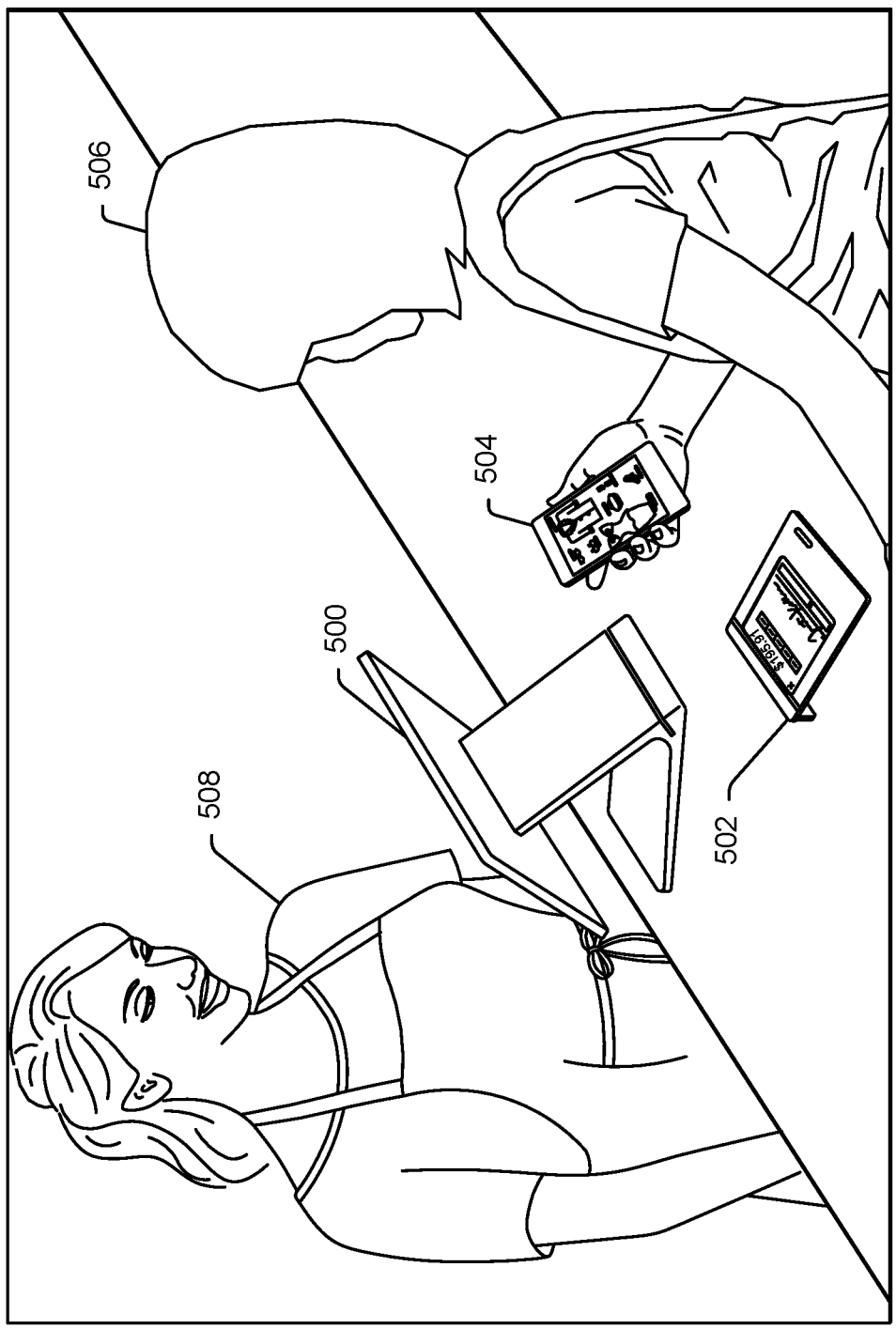
FIG. 5 illustrates a fourth example configuration of a multi-device POS system wherein a merchant-facing device is coupled to two or more customer-facing devices as described herein.
Figure 6:
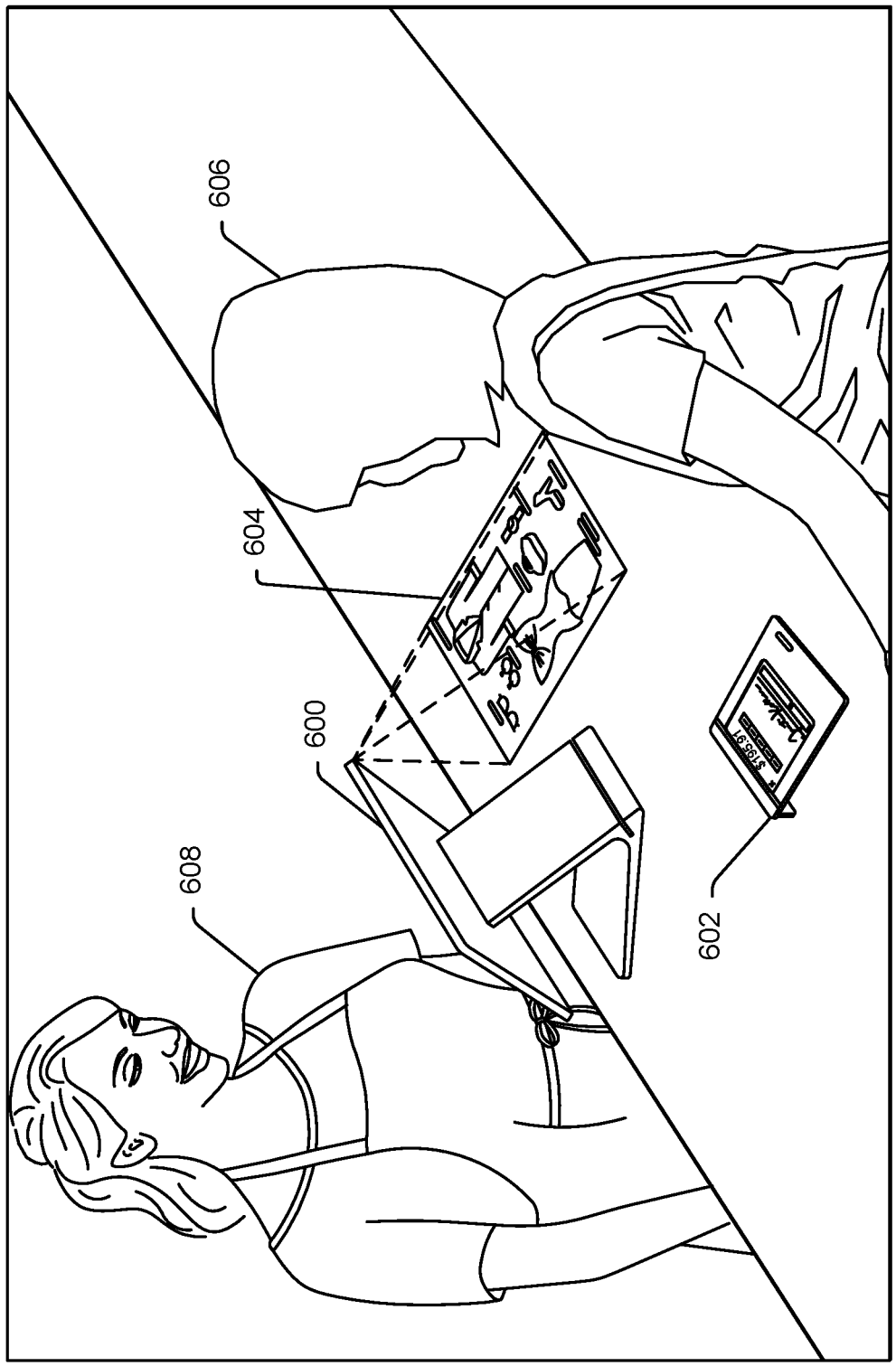
FIG. 6 illustrates a fifth example configuration of a multi-device POS system wherein a merchant-facing device is coupled to at least one customer-facing device as described herein.

FIGS. 4-6 illustrate additional or alternative example configurations of multi-device POS systems. For instance, in FIG. 4, a merchant-facing device 400, which can correspond to the merchant-facing device 102A as described above with reference to FIG. 1, can be coupled to at least two customer-facing devices 402A and 402B, which can correspond to the customer-facing devices 104A-104N as described above with reference to FIG. 1. In such an example, one customer-facing device 402A can be positioned proximate the merchant-facing device 400 and a second customer-facing device 402B can be mobile such that it can be moved throughout a merchant environment. In at least one example, customer functionality can be provisioned to a personal device of the merchant to configure the personal device, at least temporarily, as a customer-facing device. That is, in at least one example, the second customer-facing device 402B can be a personal device of the merchant (or an employee or other agent of the merchant).

As illustrated in FIG. 4, a first employee 404A (or other agent) of a merchant is operating the merchant-facing device 400 and a second employee 404B (or other agent) is operating the second customer-facing device 402B. As described below, in some examples, a customer-facing device, such as the second customer-facing device 402B, can have both merchant and customer functionality. As illustrated in FIG. 4, the second customer-facing device 402B is performing customer functionality. In some examples, the customer-facing devices 402A and 402B can interact with the merchant-facing device 400 to process independent transactions, as described above in FIG. 2, or can interact with the merchant-facing device 400 to process independent steps of a same transaction, as described above in FIG. 3. FIG. 4 illustrates the customer-facing devices 402A and 402B interacting with the merchant-facing device 400 to process independent transactions, but is not limited to such an example.

FIG. 5 illustrates an example where a merchant-facing device 500, which can correspond to the merchant-facing device 102A as described above with reference to FIG. 1, is coupled to at least a first customer-facing device 502, which can correspond to the customer-facing device 104A as described above with reference to FIG. 1. As described herein, in some examples, functionality can be temporarily provisioned to a personal device 504 of a customer 506. For instance, in at least one example, a customer application can be provisioned to the personal device 504 of the customer 506 and, as a result, the personal device 504 of the customer 506 can be configured to perform at least some customer functionalities. In such examples, the personal device 504 of the customer can act as a second customer-facing device. That is, the first customer-facing device 502 and the personal device 504 can communicate with the merchant-facing device 500 to process independent transactions, as described above in FIG. 2, or can interact with the merchant-facing device 500 to process independent steps of a same transaction, as described above in FIG. 3. FIG. 5 illustrates the customer-facing device 502 and the personal device 504 interacting with the merchant-facing device 500 to process independent steps of a same transaction between the customer 506 and the merchant 508, but is not limited to such an example. For instance, as shown in FIG. 5, the customer 506 can utilize the personal device 504 that has been temporarily provisioned with the customer application to add items to a transaction (e.g., build a virtual cart) and, upon arriving at a check-out station, can transmit a data structure (or duplicate thereof) associated with the transaction (e.g., the ticket) to the merchant-facing device 502. The merchant-facing device 502 can utilize the first customer-facing device 502 to obtain payment information and complete the transaction.

FIG. 6 illustrates an example where a merchant-facing device 600, which can correspond to the merchant-facing device 102A as described above with reference to FIG. 1, is coupled to at least one first customer-facing device 602, which can correspond to a customer-facing device 104A as described above with reference to FIG. 1. As described herein, in some examples, a UI 604 can be projected onto a surface proximate a customer 606. In such examples, a second customer-facing device can project the UI 604, the merchant-facing device 600 can project the UI 604 (e.g., as shown in FIG. 6), a personal device of the customer 606 can project the UI 604, etc. In such examples, a customer application can be executable to generate instructions for outputting the UI 604. In at least one example, the projected UI 604 can enable the customer 606 to interact with the merchant-facing device 606 in a manner consistent with how the customer interacts with a physical customer-facing device 602. For instance, in an example where the projector is a touch projector, the customer 604 can interact directly with the projection to interact with the merchant-facing device 606. Or, in an alternative example, the projection can be projected onto a touch display configured to receive customer 604 input. That is, such a customer UI can function as a virtual customer-facing device.

Accordingly, the first customer-facing device 604 and the projected UI 604 can be used to communicate with the merchant-facing device 600 to process independent transactions, as described above in FIG. 2, or with the merchant-facing device 600 to process independent steps of a same transaction, as described above in FIG. 3. FIG. 6 illustrates the first customer-facing device 602 and projected UI 604 being used to interact with the merchant-facing device 600 to process independent steps of a same transaction between the customer 604 and the merchant 608, but is not limited to such an example. For instance, as shown in FIG. 6, the customer 606 can interact with the projected UI 604 to review items associated with a transaction and the merchant-facing device 600 can utilize the first customer-facing device 602 to obtain payment information and complete the transaction.

FIGS. 7-11 illustrate example processes for utilizing a multi-device POS system with multiple customer-facing devices coupled to a merchant-facing device as described herein. FIGS. 7-11 are described with reference to environment 100 as described above with reference to FIG. 1; however, additional or alternative environments are considered to be within the scope of this disclosure.

Figure 7:
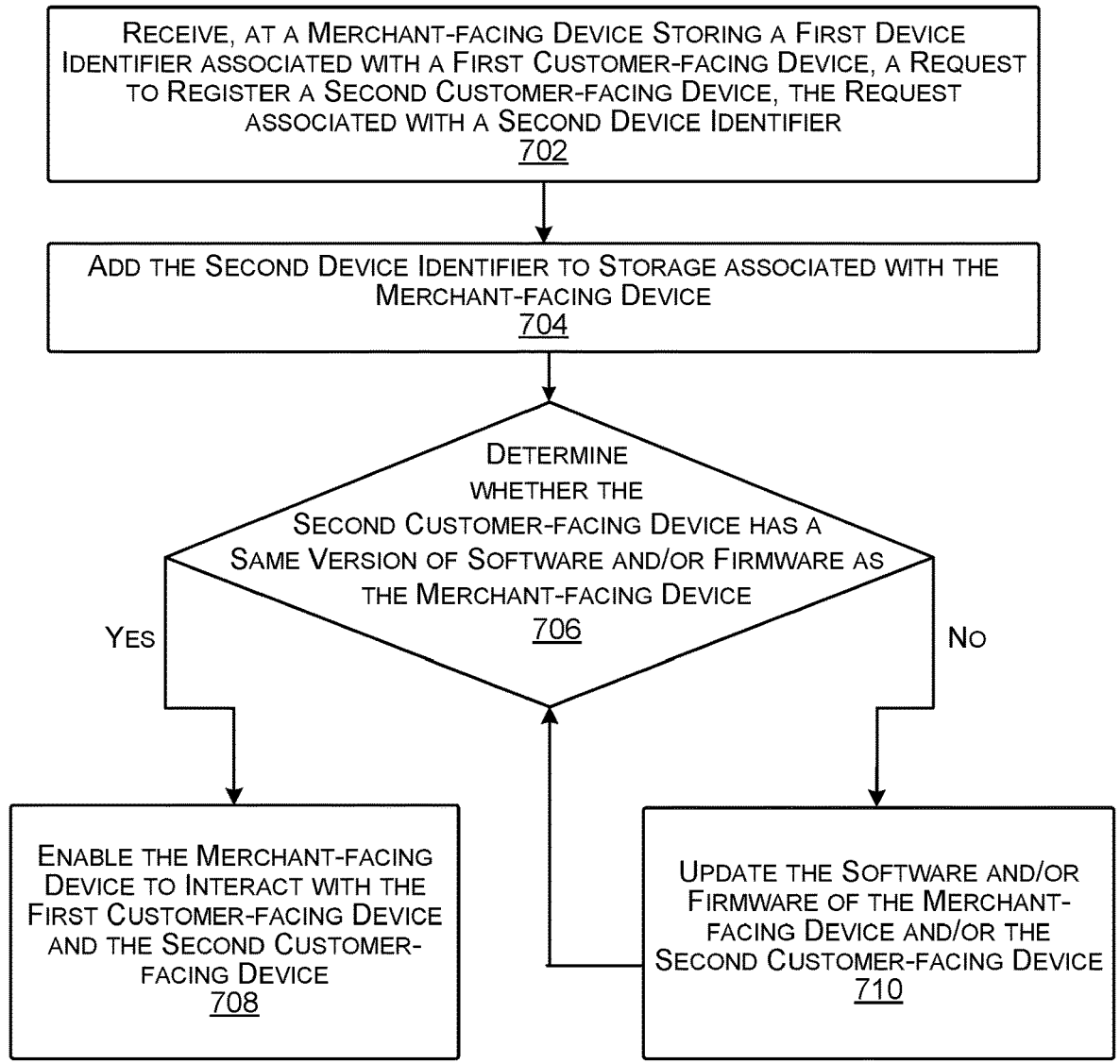
FIG. 7 illustrates an example process for coupling a customer-facing device to a merchant-facing device to enable multiple customer-facing devices to interact with the merchant-facing device as described herein.

FIG. 7 illustrates an example process 700 for coupling a customer-facing device to a merchant-facing device to enable multiple customer-facing devices to interact with the merchant-facing device as described herein.

Block 702 illustrates receiving, at a merchant-facing device storing a first device identifier associated with a first customer-facing device, a request to register a second customer-facing device 104N, the request associated with a second device identifier. In at least one example, a merchant-facing device 102A can store a first device identifier of a first customer-facing device 104A in a device identifier storage of the merchant-facing device 102A. The first device identifier can identify the first customer-facing device 104A and, by virtue of its storage in the device identifier storage, can indicate that the merchant-facing device 102A is capable of transmitting data to and/or receiving data from the first customer-facing device 104A. Additionally, the first device identifier can serve as an identifier of the first customer-facing device 104A. In at least one example, a merchant application 106 executable by the merchant-facing device 102A can receive a request from a second customer-facing device 104N. The request can include a second device identifier associated with the second customer-facing device 104N. In some examples, the merchant-facing device 102A can receive the second device identifier responsive to the second customer-facing device 104N being docked to the merchant-facing device 102A. In at least one example, the first device identifier and/or the second device identifier can be associated with a respective customer application 114 associated with the first customer-facing device 104A and second customer-facing device 104N.

Block 704 illustrates adding the second device identifier to a storage associated with the merchant-facing device. Based at least in part on receiving the request, the merchant application 106 can add the second device identifier to the device identifier storage associated with the merchant-facing device 102A. The second device identifier can identify the second customer-facing device 104N and, by virtue of its storage in the device identifier storage, can indicate that the merchant-facing device 102A is capable of transmitting data to and/or receiving data from the second customer-facing device 104N. Additionally, the device identifier can serve as an identifier of the second customer-facing device 104N.

Block 706 illustrates determining whether the second customer-facing device 104N has a same version of software and/or firmware as the merchant-facing device. Prior to exchanging data with the second customer-facing device 104N, the merchant-facing device 102A can determine whether the second customer-facing device 104N has a same version of software and/or firmware as the merchant-facing device 102A. For instance, when the second customer-facing device 104N tries to connect to the merchant-facing device 102A, the second customer-facing device 104N provides its software and/or firmware version(s) as part of the request. The merchant application 106 can analyze the software and/or firmware version(s) and compare them to the software and/or firmware version(s) associated with the merchant-facing device 102A. Based at least in part on determining that the second customer-facing device has the same version of software and/or firmware as the merchant-facing device 102A, the merchant application 106 can enable the merchant-facing device 102A to interact with the first customer-facing device 104A and the second customer-facing device 104N, as illustrated in block 708. In at least one example, the merchant application 106 can determine that the software and/or firmware of the second customer-facing device 104N is different associated with a different version than the software and/or firmware of the merchant-facing device 102A and may nevertheless enable the merchant-facing device 102A to interact with the first customer-facing device 104A and the second customer-facing device 104N, as illustrated in block 708. In such an example, the merchant application 106 can determine that the version of the software and/or firmware of the second customer-facing device 104N is compatible, albeit not the same, and can enable the merchant-facing device 102A to interact with the first customer-facing device 104A and the second customer-facing device 104N, as illustrated in block 708.

Based at least in part on determining that the second customer-facing device 104N does not have the same version of software and/or firmware as the merchant-facing device 102A (or an incompatible version of software and/or firmware), the merchant application 106 can update the software and/or firmware of the merchant-facing device 102A and/or the second customer-facing device 104N, as illustrated in block 710. In some examples, the second customer-facing device 104N can have a newer version of software and/or firmware than the merchant-facing device 102A. In such examples, the merchant application 106 can send a request to the payment processing service server(s) 124 for an update, that can be applied upon a subsequent reboot of the merchant-facing device 102A. If the second customer-facing device 104N has an older version of software and/or firmware than the merchant-facing device 102A, the merchant application 106 can push an update to the second customer-facing device 104N. In some examples, the second customer-facing device 102N can be docked to the merchant-facing device 102A to receive the update. In other examples, the merchant-facing device 102A can push the update to the second customer-facing device 104N via another communication interface (e.g., wired or wireless). Then, based at least in part on the second customer-facing device 102N having the same version of software and/or firmware as the merchant-facing device 102A, the merchant application 106 can enable the merchant-facing device 102A to interact with the first customer-facing device 104A and the second customer-facing device 104N, as illustrated in block 708.

It should be noted that the software and/or firmware update described above with reference to block 710 can occur at any time and need not only occur when a new customer-facing device is coupled to the merchant-facing device 102A. That is, in some examples, the merchant application 106 can receive an indication of a version of software and/or firmware associated with a customer-facing device coupled to the merchant-facing device 104A and can determine whether the version is a same version as that associated with the merchant-facing device 104A. In the event that the versions are different, the merchant application 106 can facilitate software and/or firmware updates to synchronize the software and/or firmware associated with the merchant-facing device 102A and any customer-facing device coupled to the merchant-facing device 102A. As described above, in some examples, the update can be provided to the customer-facing device when the customer-facing device is docked to the merchant-facing device 102A. In other examples, the update can be provided to the customer-facing device from the merchant-facing device 102A via a communication interface (e.g., wired or wireless).

Furthermore, it should be noted that in some examples, a merchant can selectively choose which customer-facing device(s) to couple to the merchant-facing device 102A. That is, in some examples, a merchant can choose to add a device identifier of a first customer-facing device to a device identifier storage and choose not to add a device identifier of a second customer-facing device to the device identifier storage. In at least one example, customer-facing devices can be coupled to a merchant-facing device at different times. For instance, a first customer-facing device can be coupled to a merchant-facing device at a factory and a second customer-facing device can be coupled to the merchant-facing device at some later time, for instance, after onboarding the first customer-facing device, after the first customer-facing device has been installed in a merchant environment and has been powered up/down to communicate with one or more servers, after completing a transaction via the first customer-facing device, etc.

Figure 8:
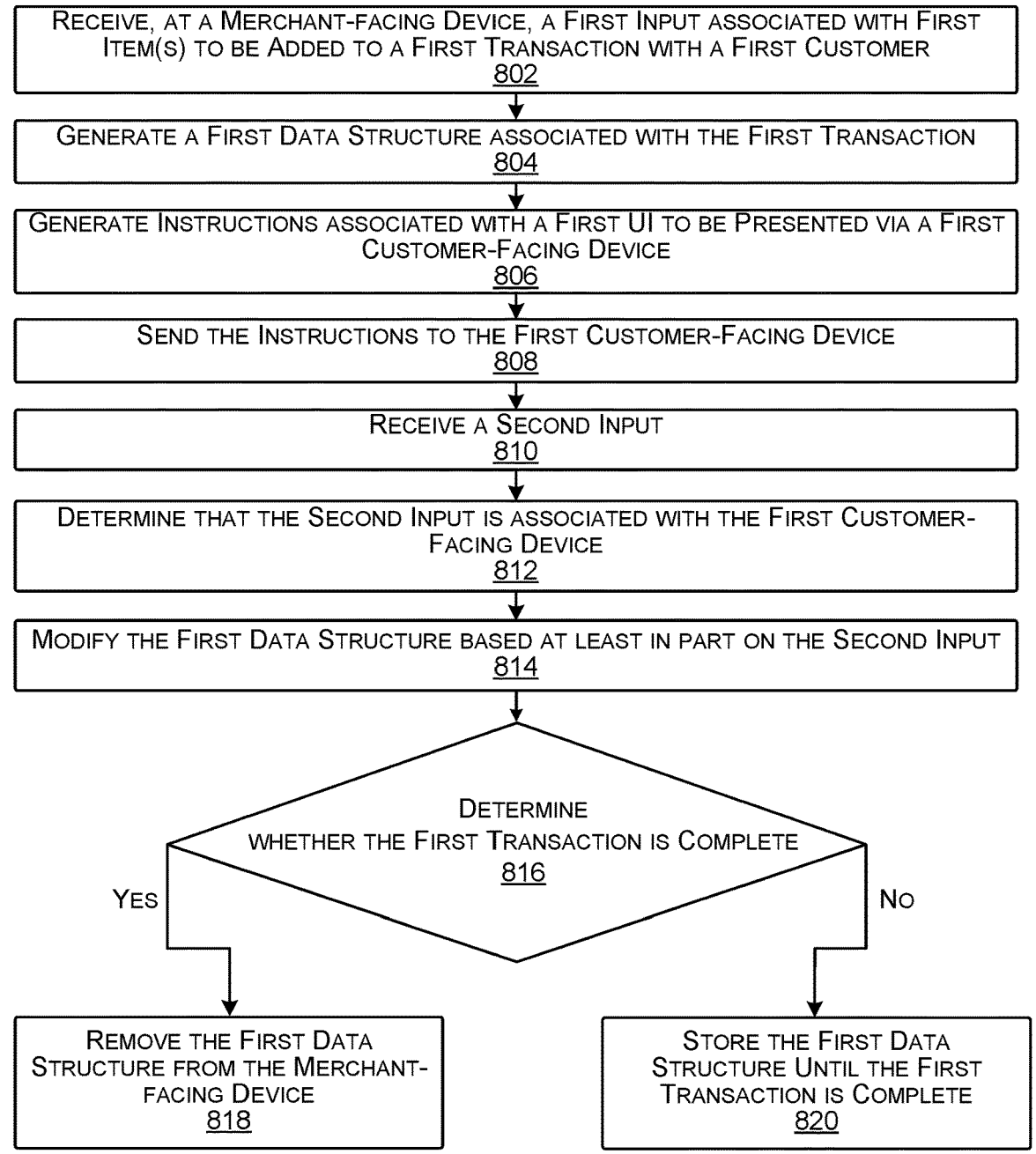
FIG. 8 illustrates an example process for processing a transaction via a customer-facing device of a multi-device POS system as described herein.
Figure 9:
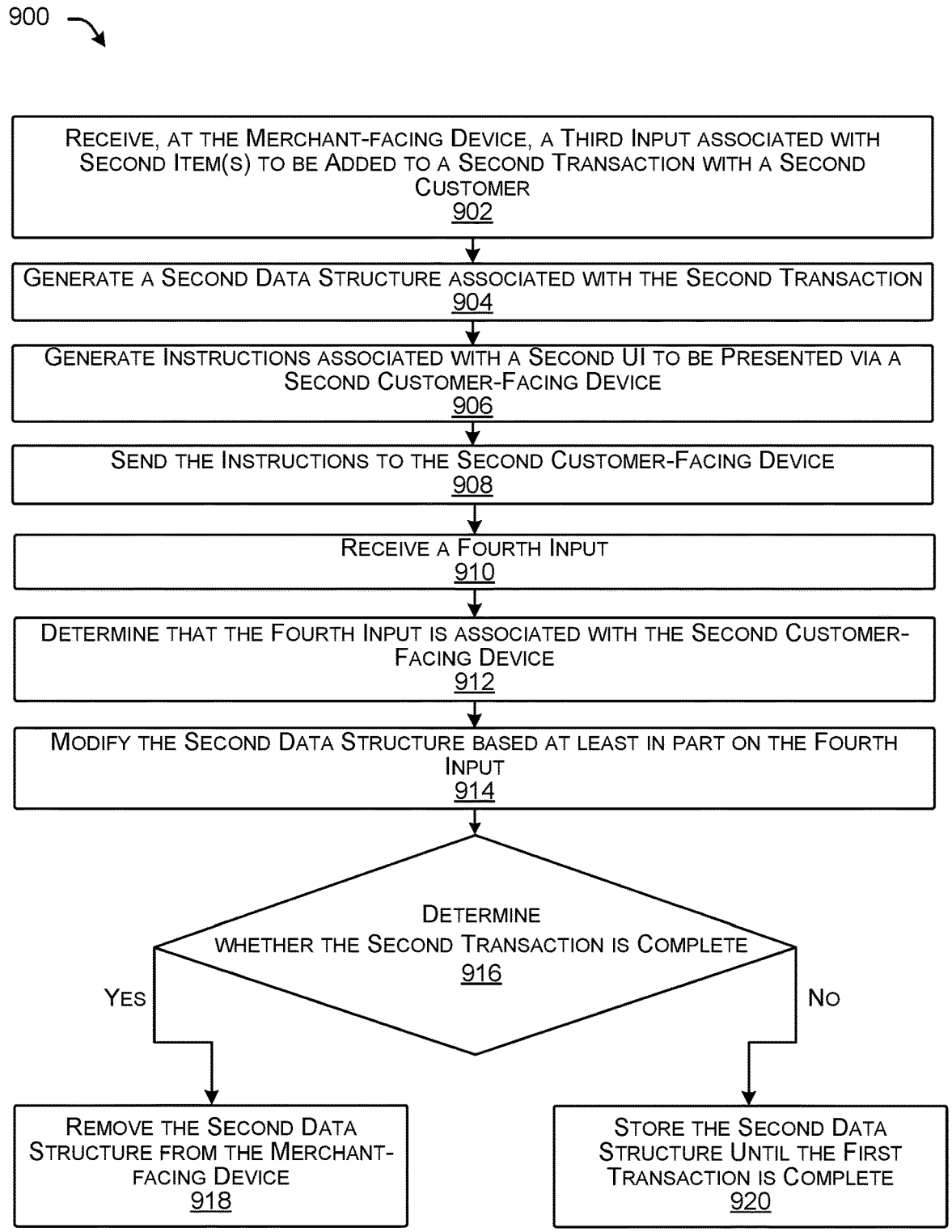
FIG. 9 illustrates an example process for processing a transaction via a customer-facing device of a multi-device POS system, which can be performed in parallel with the example process described in FIG. 8.

FIGS. 8 and 9 illustrate examples of two processes 800 and 900 for processing two different transactions via a multi-device POS system, which can be performed in parallel by the merchant application 106 of a merchant-facing device 104A.

Block 802 illustrates receiving, at a merchant-facing device, a first input associated with first item(s) to be added to a first transaction with a first customer. In at least one example, a merchant can interact with a UI (e.g., presented by the merchant application 106 associated with the merchant-facing device 102A) to add one or more first items to a first ticket. For instance, a merchant can add one or more food items to a ticket or a merchant can add one or more clothing items to a ticket. In at least one example, the merchant can add the one or more first items to the first ticket based at least in part on selecting each item of the one or more first items from an inventory of the merchant.

Block 804 illustrates generating a first data structure associated with the first transaction. Based at least in part on receiving the first input, the merchant application 106 can generate a first data structure associated with the first transaction. The first data structure can include representations of the one or more first items added to the ticket. In some examples, the data structure can include data associated with the one or more first items, such as price, quantity, fulfillment preference (e.g., carry out, delayed pick up, delivery, etc.), etc.

Block 806 illustrates generating instructions associated with a first UI to be presented via a first customer-facing device. In at least one example, the merchant application 106 can generate instructions for presenting a representation of the first data structure via a first customer-facing device, such as the customer-facing device 104A. For instance, a customer can desire to review his or her ticket and/or provide payment data for paying for the one or more first items.

Block 808 illustrates sending the instructions to the first customer-facing device. In at least one example, the merchant application 106 can send the instructions to the customer application 114, and the customer application 114 can receive the instructions and output a UI associated with the instructions. That is, the customer application 114 can output a first UI on the display 116 associated with the first customer-facing device 104A. In some examples, the first UI can be a GUI that graphically presents the one or more first items and/or the data associated with the one or more first items (e.g., price, quantity, fulfillment preference, etc.). Additionally or alternatively, the first UI can present a call to action as described above.

Block 810 illustrates receiving a second input. In at least one example, the customer can interact with the UI, for instance, to modify the ticket, to provide payment data, etc. In such an example, the customer application 114 can send an indication of a second input associated with such an interaction to the merchant application 106. In at least one example, the indication can include a device identifier associated with the first customer-facing device 104A.

Block 812 illustrates determining that the second input is associated with the first customer-facing device. In at least one example, the merchant application 106 can receive the second input and can determine that the second input is associated with the first customer-facing device 104A based at least in part on the device identifier. In at least one example, the merchant application 106 can modify the first data structure based at least in part on the second input, as illustrated in block 814.

Block 816 illustrates determining whether the first transaction is complete. In at least one example, the merchant application 106 can determine whether the first transaction is complete. For instance, the merchant application 106 can determine whether the second input was associated with a final step of a payment flow. Based at least in part on determining that the first transaction is complete (e.g., that the second input is associated with the final step of the payment flow), the merchant application 106 can remove the first data structure from the merchant-facing device 102A, as illustrated in block 818. In at least one example, the first data structure can be sent to the payment processing service server(s) 124 for longer-term storage, and a receipt can be sent to a device operated by the first customer (if so elected by the customer).

Based at least in part on determining that the first transaction is not complete (e.g., the second input was not associated with the final step of the payment flow and thus the first transaction is associated with an "open ticket"), the merchant application 106 can store the first data structure until the first transaction is complete, as illustrated in block 820. In such examples, the merchant application 106 can generate instructions associated with one or more additional UIs to be presented via the first customer-facing device to enable the first customer to perform subsequent action(s) associated with the first transaction. Furthermore, in such examples, the merchant application 106 can store the first data structure locally until the first transaction is complete. In at least one example, the merchant application 106 can send open tickets to the payment processing server(s) 124 at a particular frequency, after an occurrence of an event, etc. prior to the completion of the first transaction (e.g., for redundancy, etc.).

Block 902 illustrates receiving, at a merchant-facing device, a third input associated with second item(s) to be added to a second transaction with a second customer. In at least one example, a merchant can interact with a UI (e.g., presented by the merchant application 106 associated with the merchant-facing device 102A) to add one or more second items to a second ticket.

Block 904 illustrates generating a second data structure associated with the second transaction. Based at least in part on receiving the third input, the merchant application 106 can generate a second data structure associated with the second transaction. The second data structure can include representations of the one or more second items added to the second ticket.

Block 906 illustrates generating instructions associated with a second UI to be presented via a second customer-facing device. In at least one example, the merchant application 106 can generate instructions for presenting a representation of the second data structure via a second customer-facing device, such as customer-facing device 104N. For instance, a customer can desire to review his or her ticket and/or provide payment data for paying for the one or more second items.

Block 908 illustrates sending the instructions to the second customer-facing device 104N. In at least one example, the merchant application 106 can send the instructions to a customer application 114 that is executable by the second customer-facing device 104N, and the customer application 114 can receive the instructions and output a UI associated with the instructions. That is, the customer application can output a second UI on a display associated with the second customer-facing device 104N. In some examples, the second UI can graphically present the one or more second items and/or data associated with the one or more second items (e.g., price, quantity, fulfillment preference, etc.) as a GUI. Additionally or alternatively, the second UI can present a call to action as provided above.

Block 910 illustrates receiving a fourth input. In at least one example, the customer can interact with the UI, for instance, to modify the ticket, to provide payment data, etc. In such an example, the customer application 114 can send an indication of a fourth input associated with such an interaction to the merchant application 106. In at least one example, the indication can include a device identifier associated with the second customer-facing device 104N.

Block 912 illustrates determining that the fourth input is associated with the second customer-facing device 104N. In at least one example, the merchant application 106 can receive the fourth input and can determine that the fourth input is associated with the second customer-facing device 104N based at least in part on the device identifier. In at least one example, the merchant application 106 can modify the second data structure based at least in part on the fourth input, as illustrated in block 914.

Block 916 illustrates determining whether the second transaction is complete. In at least one example, the merchant application 106 can determine whether the second transaction is complete. For instance, the merchant application 106 can determine whether the fourth input was associated with a final step of a payment flow. Based at least in part on determining that the second transaction is complete (e.g., that the fourth input is associated with the final step of the payment flow), the merchant application 106 can remove the second data structure from the merchant-facing device 102A, as illustrated in block 918. In at least one example, the second data structure can be sent to the payment processing service server(s) 124 for longer-term storage, and a receipt can be sent to a device operated by the second customer (if the customer so elects).

Based at least in part on determining that the second transaction is not complete (e.g., the fourth input was not associated with the final step of the payment flow and thus the second transaction is associated with an "open ticket"), the merchant application 106 can store the second data structure until the second transaction is complete, as illustrated in block 920. In such examples, the merchant application 106 can generate instructions associated with one or more additional UIs to be presented via the second customer-facing device 104N to enable the second customer to perform subsequent action(s) associated with the second transaction. Furthermore, in such examples, the merchant application 106 can store the second data structure locally until the second transaction is complete. In at least one example, the merchant application 106 can send open tickets to the payment processing server(s) 124 at a particular frequency, after an occurrence of an event, etc. prior to the completion of the second transaction (e.g., for redundancy, etc.).

In at least one example, while the merchant application 106 is performing steps 802-820 associated with a first transaction between the merchant and a first customer, the merchant application 106 can additionally be performing steps 902-920 associated with a second transaction between the merchant and a second customer. That is, as illustrated above, the merchant application 106 can process multiple transactions for multiple customers via multiple customer-facing devices in parallel.

While FIGS. 8 and 9 are described with respect to a second customer-facing device 104N, in additional or alternative examples, the second customer-facing device can be a personal device of a customer (e.g., having been temporarily provisioned with a customer application 114) or the merchant-facing device 102A that is executing a customer application 114 and/or projecting the UI.

Figure 10:
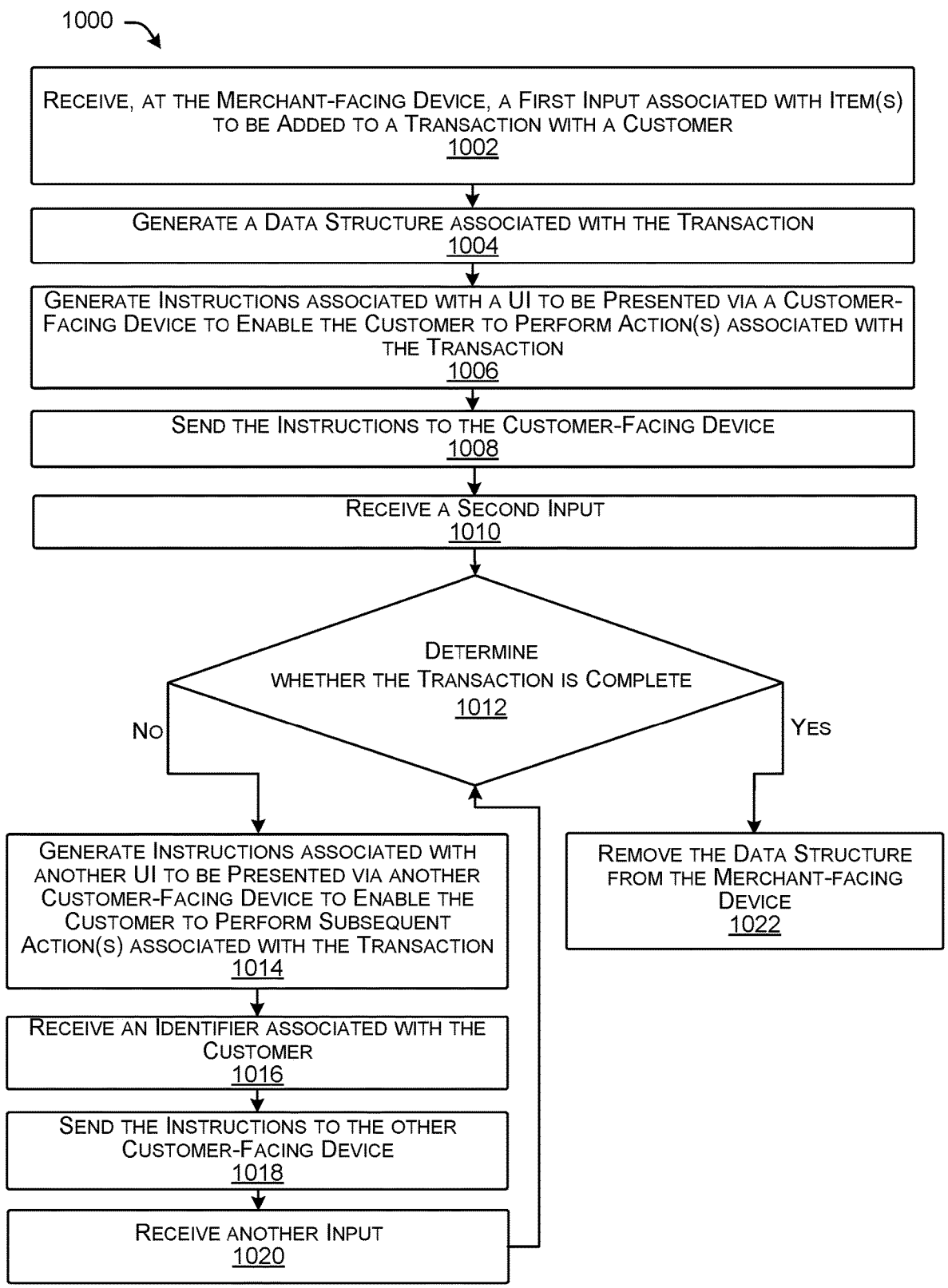
FIG. 10 illustrates an example process for processing a single transaction using multiple customer-facing devices interacting with a single merchant-facing device as described herein.

FIG. 10 illustrates an example process 1000 for processing a single transaction using multiple customer-facing devices interacting with a single merchant-facing device.

Block 1002 illustrates receiving, at a merchant-facing device, a first input associated with item(s) to be added to a transaction with a customer. In at least one example, a merchant can interact with a UI to add one or more items to a ticket. For instance, a merchant can add one or more food items to a ticket or a merchant can add one or more clothing items to a ticket. In at least one example, the merchant can add the one or more items to the ticket based at least in part on selecting each item of the one or more items from an inventory of the merchant.

Block 1004 illustrates generating a data structure associated with the transaction. Based at least in part on receiving the first input, the merchant application 106 can generate a data structure associated with the transaction. The data structure can include representations of the one or more items added to the ticket. In some examples, the data structure can include data associated with the one or more items, such as price, quantity, fulfillment preference (e.g., carry out, delayed pick up, delivery, etc.), etc.

Block 1006 illustrates generating instructions associated with a UI to be presented via a customer-facing device. In at least one example, the merchant application 106 can generate instructions for presenting a representation of the data structure via a customer-facing device, such as the customer-facing device 104A. For instance, a customer can desire to review his or her ticket and/or provide payment data for paying for the one or more items.

Block 1008 illustrates sending the instructions to the customer-facing device. In at least one example, the merchant application 106 can send the instructions to the customer application 114 associated with the customer-facing device 104A, and the customer application 114 can receive the instructions and output a UI associated with the instructions. That is, the customer application 114 can output a UI on the display 116 associated with the customer-facing device 104A. In some examples, the first UI can graphically present the one or more items and/or the data associated with the one or more items (e.g., price, quantity, fulfillment preference, etc.). Additionally or alternatively, the first UI can present a call to action as described above.

Block 1010 illustrates receiving a second input. In at least one example, the customer can interact with the UI, for instance, to modify the ticket, to provide payment data, etc. In such an example, the customer application 114 can send an indication of a second input associated with such an interaction to the merchant application 106.

Block 1012 illustrates determining whether the transaction is complete. In at least one example, the merchant application 106 can determine whether the transaction is complete. For instance, the merchant application 106 can determine whether the second input was associated with a final step of a payment flow. Based at least in part on determining that the transaction is not complete (e.g., the second input was not associated with the final step of the payment flow and thus the transaction is associated with an "open ticket"), the merchant application 106 can generate instructions associated with another UI to be presented via another customer-facing device, such as customer-facing device 104N, to enable the customer to perform subsequent action(s) associated with the transaction, as illustrated in block 1014.

In some examples, the merchant application 106 can determine a particular customer-facing device to which the customer is to proceed, and can generate additional instructions for directing the customer to the particular customer-facing device. In some examples, the merchant application 106 can determine which customer-facing device to direct the customer based on an attribute of the customer. Additional details of such examples are described below with reference to FIG. 11. In other examples, the merchant application 106 can determine which customer-facing device to direct the customer based on flow of customer traffic, etc. In such examples, the merchant application 106 can receive input from the merchant to determine how to direct the customer based on the flow of customer traffic, etc.

Block 1016 illustrates receiving an identifier associated with the customer. In at least one example, the merchant application 106 can receive an identifier associated with the customer from another customer-facing device 104N. In some examples, the identifier can be payment data associated with the customer. For instance, in at least one example, the second input can be associated with payment data. That is, the customer can interact with the customer-facing device 104A to provide payment data, which can be associated with the data structure. Then, the customer can again provide the payment data via another customer-facing device 104N to authenticate the customer at the other customer-facing device 104N. In an additional or alternative example, the customer can provide a previously provided code (e.g., provided by the customer previously and stored, provided by the merchant application 106 in association with the UI, associated with a previously provided receipt, etc.). Further, in some examples, the identifier can be associated with a biometric input (e.g., fingerprint, voice recognition, retinal scan, etc.). The identifier can be used by the merchant application 106 to authenticate the customer at the other customer-facing device 104N.

Block 1018 illustrates sending the instructions to the other customer-facing device. Based at least in part on receiving an identifier authenticating the customer at the other customer-facing device 104N, the merchant application 106 can send the instructions to a customer application 114 associated with the other customer-facing device 104N. That is, the merchant application 106 can send instructions associated with another UI that is to be presented by another customer-facing device 104N to enable the customer to perform subsequent actions(s) associated with the transaction to a customer application 114 associated with the other customer-facing device 104N.

Block 1020 illustrates receiving another input. In at least one example, the customer can interact with the other UI, for instance, to provide payment data, to add a gratuity, provide feedback, input loyalty information, etc. In such an example, the customer application 114 can send an indication of the other input associated with such an interaction to the merchant application 106 and the merchant application 106 can determine whether the transaction is complete.

Based at least in part on determining that the transaction is complete (e.g., that the second input, or any subsequent input, is associated with the final step of the payment flow), the merchant application 106 can remove the data structure from the merchant-facing device 102A, as illustrated in block 1022. In at least one example, the data structure can be sent to the payment processing service server(s) 124 for longer-term storage, and a receipt can be sent to a device operated by the customer (if the customer so elects).

While FIG. 10 is described with respect to another customer-facing device 104N, in additional or alternative examples, the other customer-facing device can be a personal device of a customer (e.g., having been temporarily provisioned with a customer application 114) or the merchant-facing device 102A that is executing a customer application 114 and/or projecting the UI.

Figure 11:
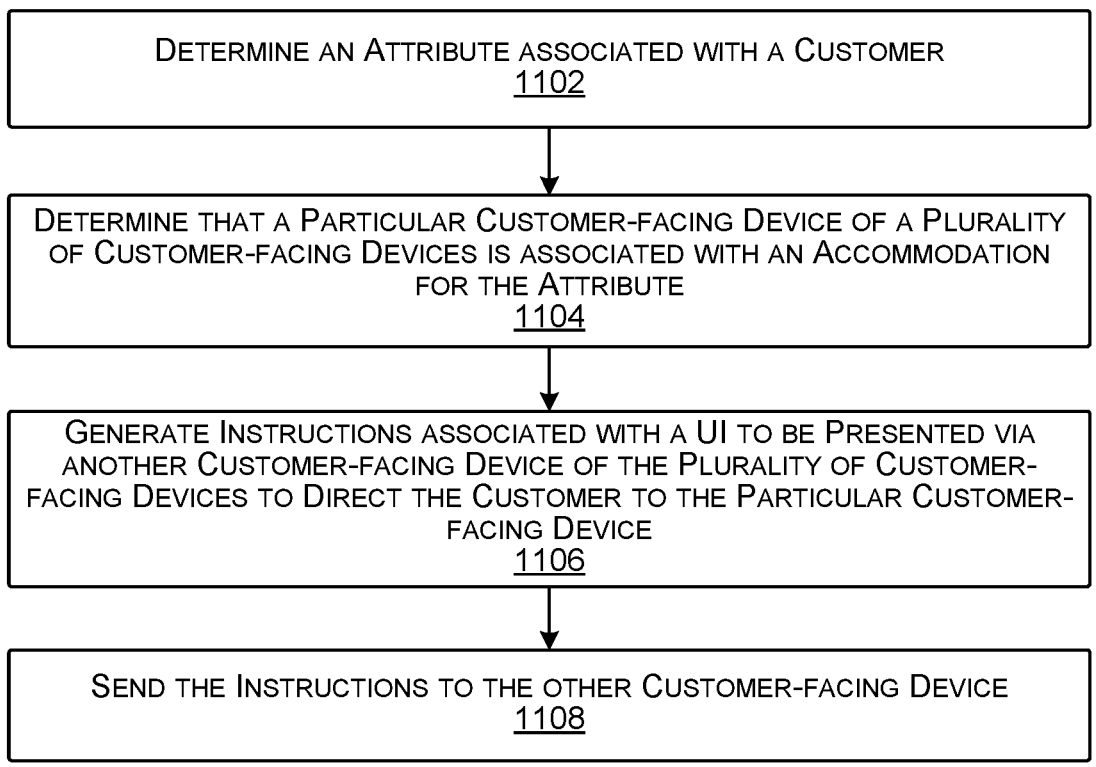
FIG. 11 illustrates an example process for directing a customer to a particular customer-facing device based on an attribute of the customer as described herein.

FIG. 11 illustrates an example process 1100 for directing a customer to a particular customer-facing device based on an attribute of the customer.

Block 1102 illustrates determining an attribute associated with a customer. In at least one example, the merchant application 106 can determine an attribute associated with a customer. For instance, in some examples, the merchant application 106 can receive an input indicating an identity of a customer. Based on the identity, the merchant application 106 can access a profile of the customer to determine one or more attributes of the customer. In some examples, an attribute can be a preference (e.g., language, etc.). In other examples, an attribute can be associated with a physical impairment (e.g., vision impairment, hearing impairment, etc.). In additional or alternative examples, the merchant application 106 can receive information from a device operated by a customer, and can determine an attribute associated with such information. For example, the merchant application 106 can determine that the device is set in a particular language or a particular feature (e.g., teletypewriter) is enabled. Furthermore, in some examples, the merchant can provide an input indicating an attribute of a customer.

Block 1104 illustrates determining that a particular customer-facing device of a plurality of customer-facing devices associated with an accommodation for the attribute. In at least one example, the merchant application 106 can determine whether the merchant-facing device 102A is coupled to a customer-facing device that can accommodate the attribute of the customer. For instance, the merchant application 106 can determine that a particular customer-facing device is configured in a particular language that corresponds to the attribute of the customer. Or, the merchant application 106 can determine that a particular customer-facing device is associated with a high contrast display to accommodate a visual impairment.

Block 1106 illustrates generating instructions associated with a UI to be presented via another customer-facing device of the plurality of customer-facing devices to direct the customer to the particular customer-facing device. Based at least in part on determining a particular customer-facing device that can accommodate the attribute of the customer, the merchant application 106 can generate instructions associated with a UI that can instruct the customer to go to the particular customer-facing device that is configured to accommodate the customer.

Block 1108 illustrates sending the instructions to the other customer-facing device. The merchant application 106 can send the instructions to a customer application 114 associated with the customer-facing device that the customer is currently interacting with, or most recently interacted, and the customer application 114 associated with the customer-facing device can output the UI to direct the customer to the particular customer-facing device.

In at least one example, process 1100 can be performed between operations associated with blocks 1014 and 1016 of process 1000.

Multi-Device POS System Configuration: Multiple Merchant-Facing Devices Coupled to a Customer-Facing Device As described above, any number of customer-facing devices can be coupled to any number of merchant-facing devices. FIGS. 12-15 illustrate various configurations of multiple merchant-facing devices coupled to a customer-facing device.

Figure 12:
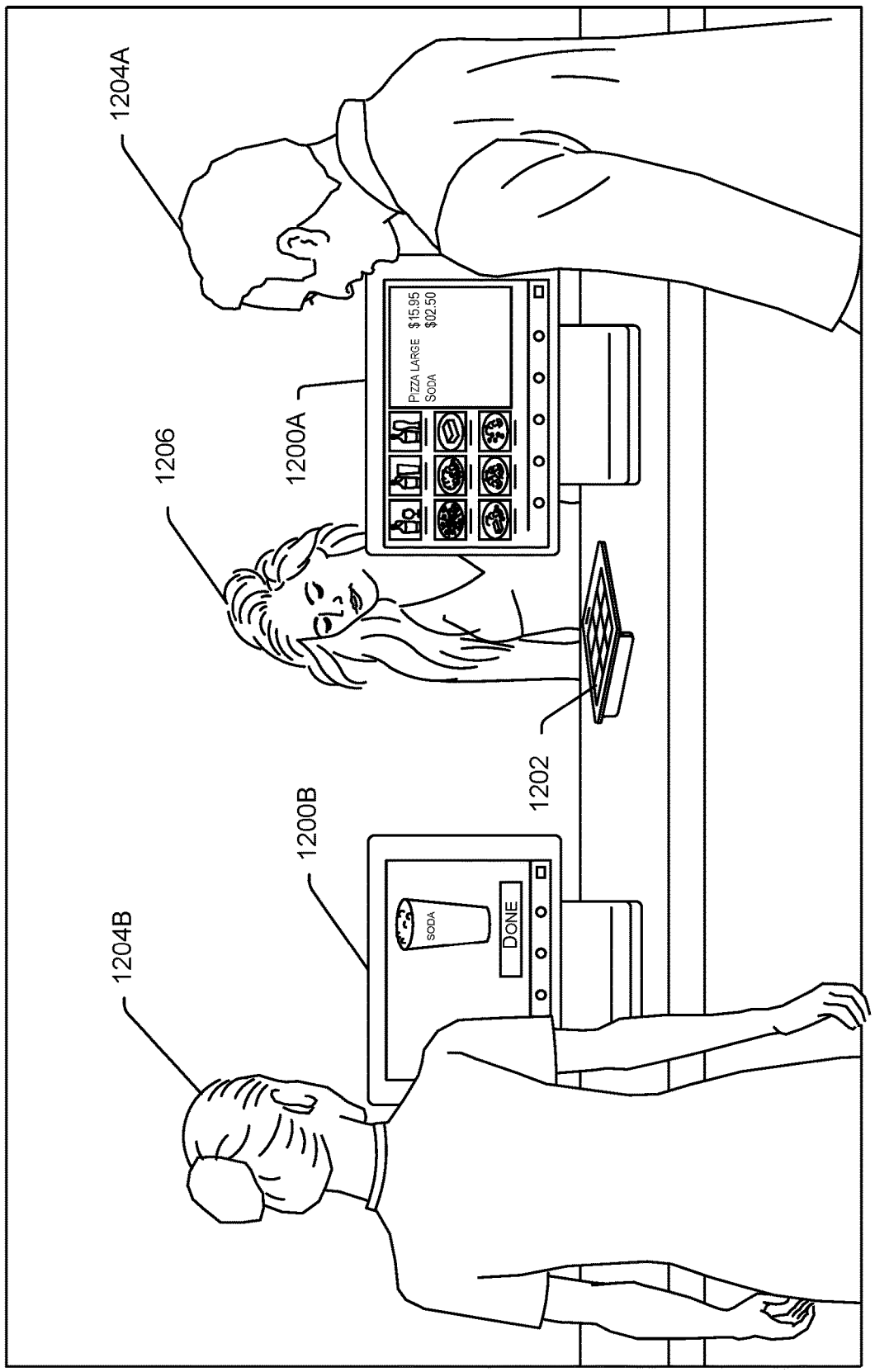
FIG. 12 illustrates a first example configuration of a multi-device POS system wherein a merchant-facing device is coupled to another merchant-facing device and at least one customer-facing device as described herein.

FIG. 12 illustrates a first example configuration of a multi-device POS system wherein a merchant-facing device 1200A is coupled to another merchant-facing device 1200B and at least one customer-facing device 1202. Merchant-facing devices 1202A and 1202B can correspond to merchant-facing devices 102A and 102N described above with reference to FIG. 1. The at least one customer-facing device 1202 can correspond to the customer-facing device 104A described above with reference to FIG. 1. Two employees 1204A and 1204B are shown as interacting with the two merchant-facing devices 1200A and 1200B. Each of the employees 1204A and 1204B can be employed by, or otherwise acting on behalf of, a merchant (e.g., agents of the merchant). In FIG. 12, each of the merchant-facing devices 1200A and 1200B is being used for processing separate steps in a single transaction. That is, the first merchant-facing device 1200A is communicating with the second merchant-facing device 1200B to process a first step in a transaction with the customer 1206 and is communicating with the customer-facing device 1202 to process a second step in a transaction.

In at least one example, the first employee 1204A interacts with a UI to add one or more items to a ticket associated with the transaction. In such an example, a merchant application can generate a data structure associated with the ticket, which includes representations of the one or more items. In at least one example, the first employee 1204A can interact with the UI to send at least a portion of the data structure to a merchant application on the second merchant-facing device 1200B. For instance, as a non-limiting example, the first employee 1204A can interact with the UI to send a portion of the data structure associated with a soda to the second merchant-facing device 1200B so that the second employee 1204B can pour the soda while the first employee 1204A completes the transaction. The second employee 1204B can view at least the second portion of the data structure via the UI presented via the second merchant-facing device 1200B and interact with the UI to complete applicable action(s). For instance, responsive to pouring the soda and delivering the soda to the customer 1206, the second employee 1204B can interact with the UI to indicate that the item has been fulfilled.

While the second employee 1204B is performing one step associated with the transaction (e.g., fulfillment), the first employee 1204A can be interacting with the UI presented via the first merchant-facing device 1200A to complete the transaction via the first merchant-facing device 1200A and the customer-facing device 1202. For instance, the first merchant-facing device 1200A can send the data structure (or a representation thereof) from the first merchant-facing device 1200A to the customer-facing device 1202 (e.g., from the merchant application to the customer application). In at least one example, the first merchant-facing device 1200A can send instructions associated with a UI to be presented via the customer-facing device 1202. The customer application executable by the customer-facing device 1202 can present the UI on a display 116 of the customer-facing device 1202, for example, to enable the customer 1206 to provide payment data and complete the transaction. Responsive to the customer 1206 providing payment data, the customer application can send the payment data to the first merchant-facing device 1200A, which can send the payment data to the payment processing service server(s) 124 for further processing and/or storage. In some examples, the first merchant-facing device 1200A can receive information from the payment processing service server(s) 124 (e.g., an indication of payment authorization, an indication of payment decline, loyalty information, etc.) and the first merchant-facing device 1200A can further communicate such information to the customer 1206 via the customer-facing device 1202.

Any number of merchant-facing devices can be used to process any number of steps of a transaction. In some examples, each step can correspond to a step in the fulfillment of a transaction. In other examples, each step can correspond to a step in a payment flow. In some examples, one or more steps can be grouped together and completed via a single merchant-facing device. In other examples, each step can be performed on a different merchant-facing device. In some examples, one or more steps can be grouped based on whether the steps are mandatory or optional, by skill level/expertise of an employee, a capability of a merchant-facing device, etc.

In some examples, merchant-facing devices can be positioned in different locations within a merchant environment. For instance, in at least one example, a first merchant-facing device can be positioned at a counter (e.g., as illustrated in FIG. 12) and one or more other merchant-facing devices can be positioned in different departments of a brick-and-mortar store of a merchant.

Figure 13:
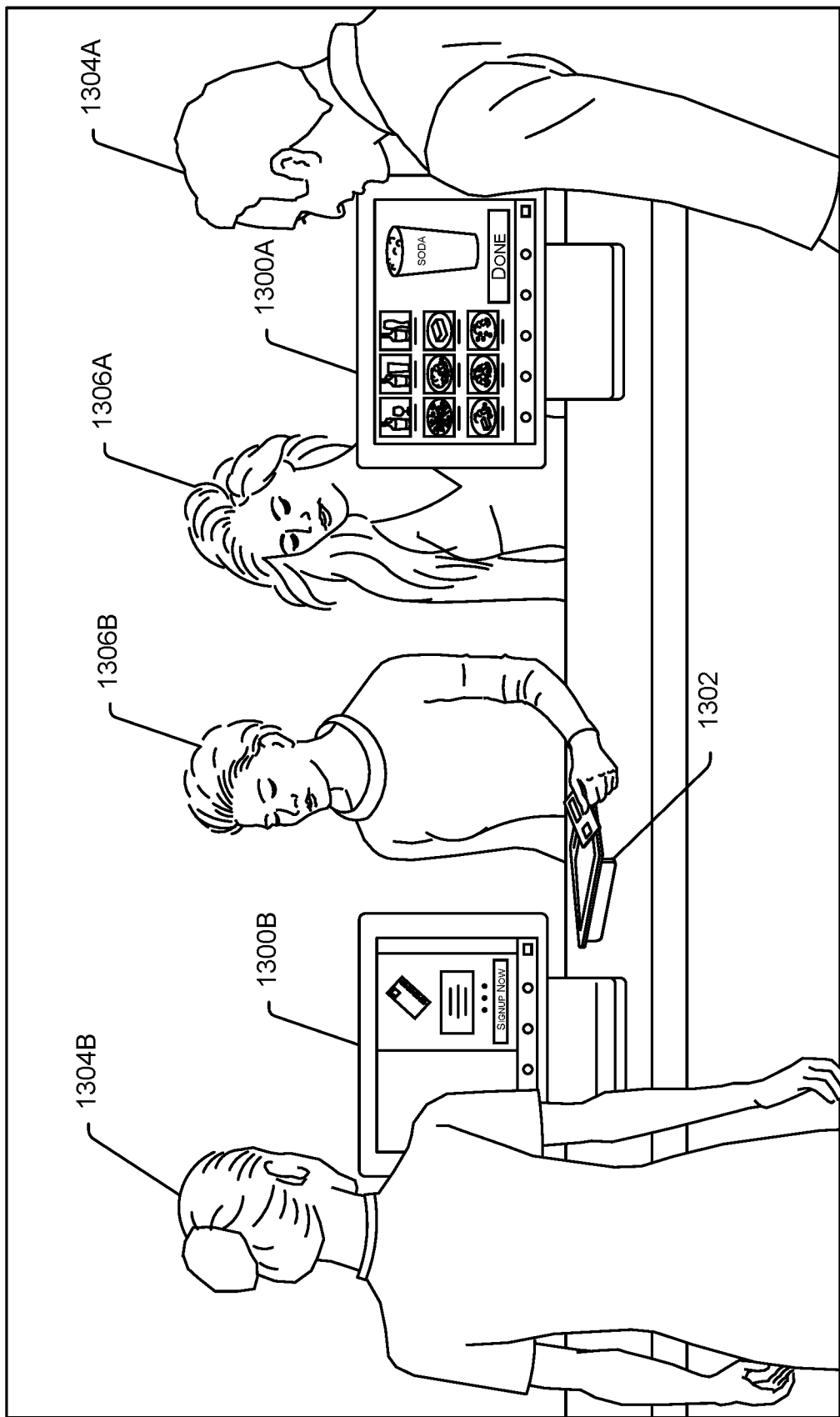
FIG. 13 illustrates a second example configuration of a multi-device POS system wherein a merchant-facing device is coupled to another merchant-facing device and at least one customer-facing device as described herein.

FIG. 13 illustrates a second example configuration of a multi-device POS system wherein a merchant-facing device 1300A is coupled to another merchant-facing device 1300B and at least one customer-facing device 1302 as described herein. Merchant-facing devices 1302A and 1302B can correspond to merchant-facing devices 102A and 102B described above with reference to FIG. 1. The at least one customer-facing device 1302 can correspond to the customer-facing device 104A described above with reference to FIG. 1. Two employees 1304A and 1304B are shown as interacting with the two merchant-facing devices 1300A and 1300B. Each of the employees 1304A and 1304B can be employed by, or otherwise acting on behalf of, a merchant (e.g., agents of the merchant). In FIG. 13, each of the merchant-facing devices 1300A and 1300B is being used for processing a separate transaction. That is, the first merchant-facing device 1300A is communicating with the customer-facing device 1302 to process a first transaction for a first customer 1306A and the second merchant-facing device 1300B is also communicating with the customer-facing device 1302 to process a second transaction for a second customer 1306B.

In at least one example, the first employee 1304A interacts with a UI to add one or more items to a ticket associated with a first transaction. In such an example, the merchant application can generate a first data structure associated with the first ticket, which includes representations of the one or more items. In at least one example, the first employee 1304A can interact with the UI to send the first data structure (or a representation thereof) to a customer application associated with the customer-facing device 1302. For instance, the first merchant-facing device 1300A can generate instructions associated with a UI to be presented via the customer-facing device 1302. The customer-facing device 1302 can present the UI to enable the first customer 1306A to complete the transaction. As described above, responsive to the first customer 1306A providing payment data, the customer application executable on the customer-facing device 1302 can send the payment data to the first merchant-facing device 1300A, which can send the payment data to the payment processing service server(s) 124 for further processing and/or storage. In some examples, the first merchant-facing device 1300A can receive information from the payment processing service server(s) 124 (e.g., an indication of payment authorization, an indication of payment decline, loyalty information, etc.) and the first merchant-facing device 1300A can further communicate such information to the first customer 1306A via the customer-facing device 1302.

At a substantially same time, the second employee 1304B can interact with a UI to process a transaction for the second customer 1306B via the second merchant-facing device 1300B. In such an example, the second employee 1304B can interact with a second data structure associated with a second transaction between the second customer 1306B and the merchant via the UI. In at least one example, the second employee 1304B can interact with the UI to send the second data structure (or a representation thereof) to the customer application associated with the customer-facing device 1302. For instance, the second merchant-facing device 1300B can generate instructions associated with a UI to be presented via the customer-facing device 1302. The customer-facing device 1302 can present the UI to enable the second customer 1306B to complete the transaction. For instance, as a non-limiting example, the second employee 1304B can interact with the UI to complete the second transaction. In some examples, the first customer 1306A may need to wait until the second customer 1306B completes the second transaction before she can complete the first transaction, or vice versa.

Figure 14:
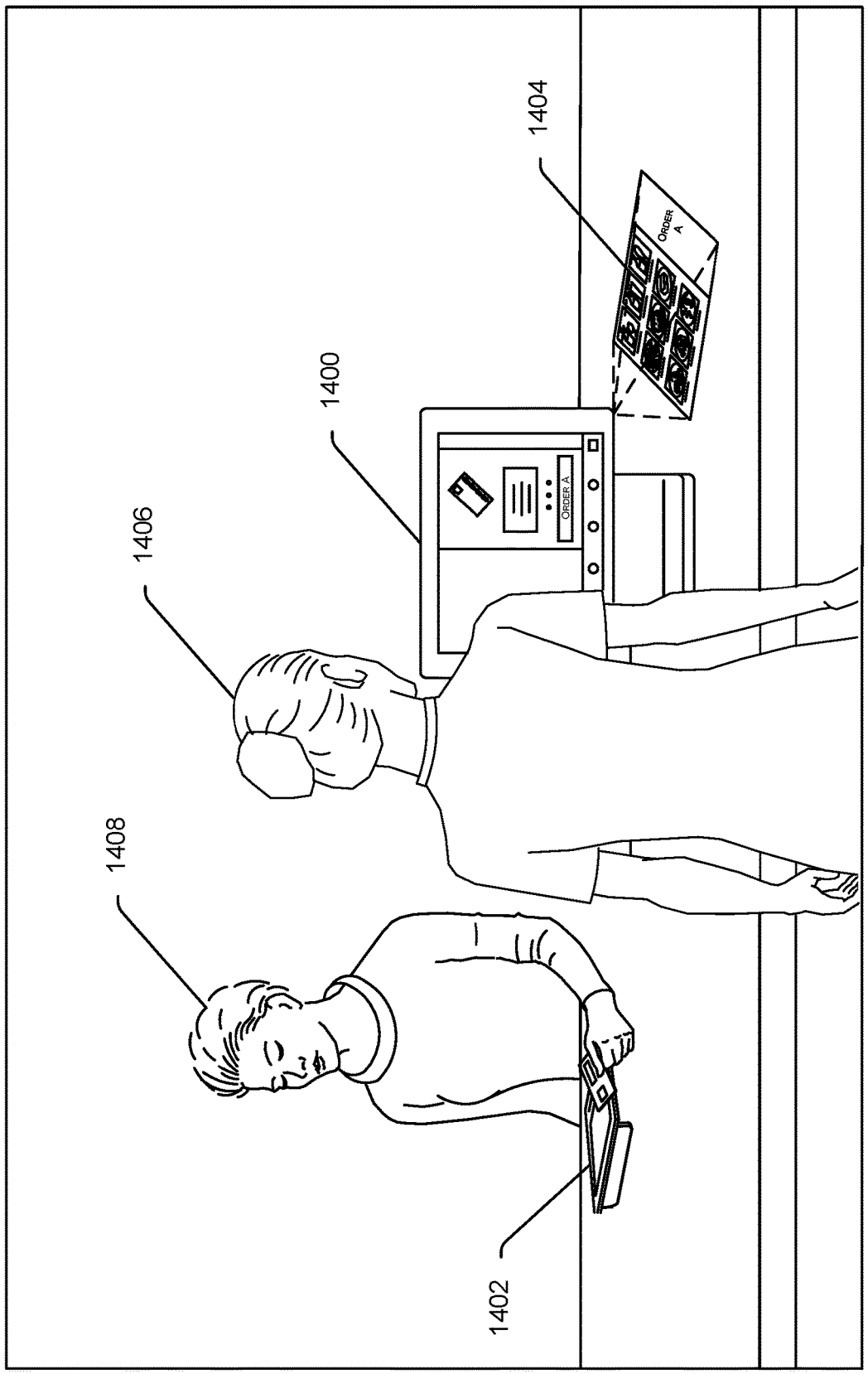
FIG. 14 illustrates a third example configuration of a multi-device POS system wherein a merchant-facing device is coupled to at least one customer-facing device as described herein.
Figure 15:
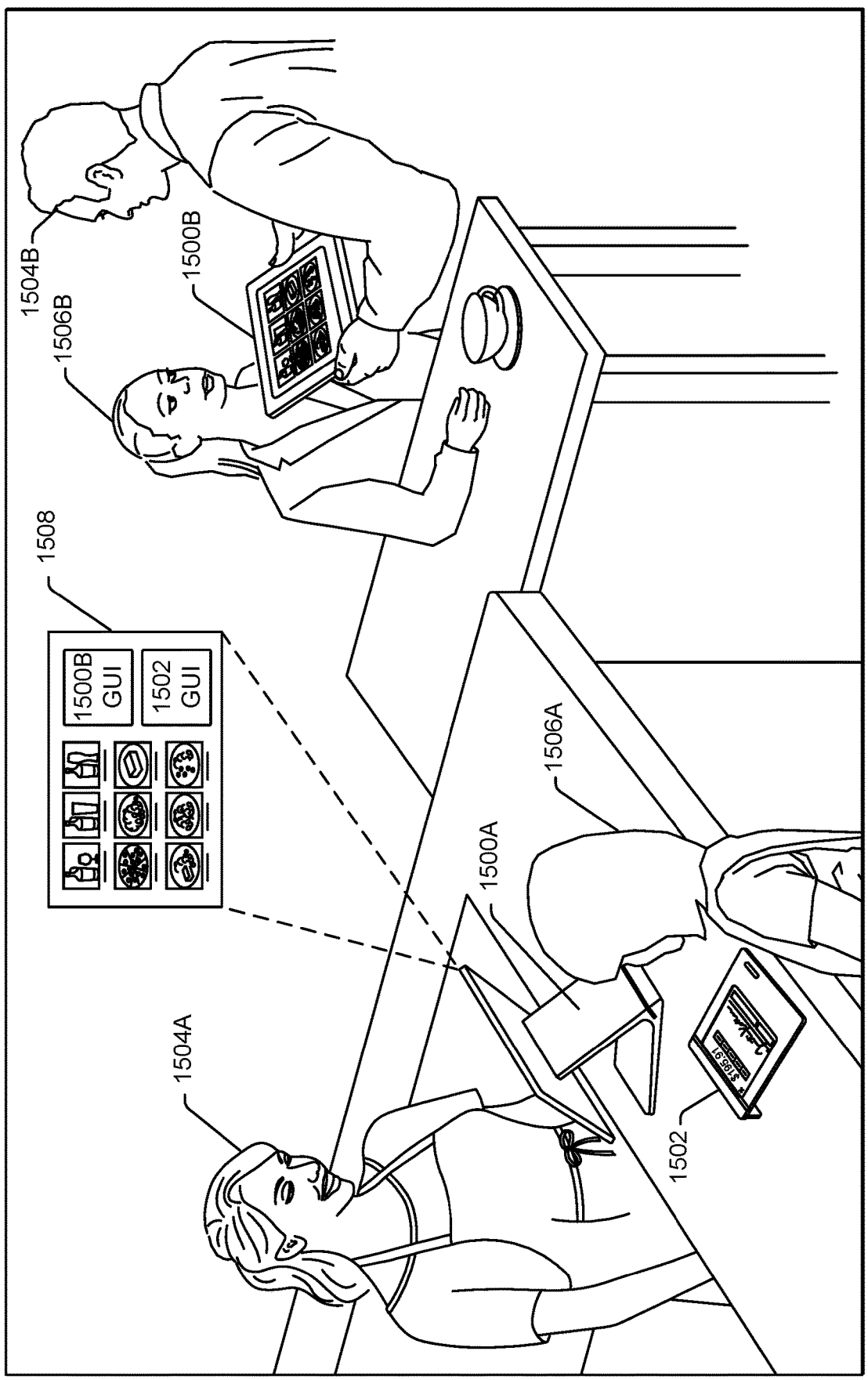
FIG. 15 illustrates a fourth example configuration of a multi-device POS system wherein a merchant-facing device is coupled to another merchant-facing device and at least one customer-facing device as described herein.

FIGS. 14-15 illustrate additional or alternative example configurations of multi-device POS systems. For instance, FIG. 14 illustrates an example where a merchant-facing device 1400, which can correspond to the merchant-facing device 102A as described above with reference to FIG. 1, is coupled to at least one customer-facing device 1402, which can correspond to the customer-facing device 104A, as described above with reference to FIG. 1. As described herein, in some examples, a UI 1404 can be projected onto a surface proximate a merchant 1406 (e.g., or an employee working on the behalf of the merchant). In such examples, the merchant-facing device 1400 can project the UI 1404 (e.g., as shown in FIG. 14), a customer-facing device 1402 can project the UI 1404, a personal device of the merchant 1406 can project the UI 1404, etc. In such examples, a merchant application can be executable to generate instructions for outputting the UI 1404. In at least one example, the projected UI 1404 can enable the merchant 1406 to interact with the merchant-facing device 1400 in a manner consistent with how the merchant 1406 interacts with a physical merchant-facing device 1402. For instance, in an example where the projector is a touch projector, the merchant 1404 can interact directly with the projection to interact with a respective merchant-facing device. A touch projector, can utilize a combination of sensors (e.g., cameras, infrared sensors, etc.) to detect users' gestures and taps such to turn a surface into a touchscreen display. Or, in an alternative example, the projection can be projected onto a touch display configured to receive merchant 1406 input.

Accordingly, the merchant-facing device 1400 and the projected UI 1404 can be used to communicate with the customer-facing device 1402 to process independent steps of a same transaction, as described above in FIG. 12, or with the customer-facing device 1402 to process independent transactions, as described above in FIG. 13. FIG. 14 illustrates the merchant-facing device 1400 and projected UI 1404 being used to interact with the customer-facing device 1402 to process independent steps of a same transaction between the merchant 1406 and a customer 1408, but is not limited to such an example. For instance, as shown in FIG. 14, the merchant 1406 can interact with the projected UI 1404 to add and/or review items associated with the transaction and the merchant-facing device 1400 can interact with the customer-facing device 1402 to obtain payment information and complete the transaction. That is, in such examples, the projected UI 1404 can function as a virtual merchant-facing device.

FIG. 15 illustrates another example configuration of a multi-device POS system. In FIG. 15, a merchant-facing device 1500A, which can correspond to the merchant-facing device 102A as described above with reference to FIG. 1, can be coupled to at least one customer-facing device 1502, which can correspond to the customer-facing device 104A, as described above with reference to FIG. 1. Additionally, the merchant-facing device 1500A can be coupled to another merchant-facing device 1500B. In such an example, one merchant-facing device 1500A can be positioned at a checkout location and a first employee 1506A (or other agent of the merchant) can interact with the first merchant-facing device 1500A. The other merchant-facing device 1500B can be mobile such that a second employee 1506B (or other agent of the merchant) can move the other merchant-facing device 1500B throughout a merchant environment. As illustrated in FIG. 15, the first employee 1504A of a merchant is operating the merchant-facing device 1500A and the second employee 1504B is operating the second customer-facing device 1502B. As described below, in some examples, a merchant-facing device, such as the second merchant-facing device 1500B, can have both merchant and customer functionality. As illustrated in FIG. 15, the second merchant-facing device 1500B is performing merchant functionality.

In some examples, the merchant-facing devices 1500A and 1500B can communicate with the customer-facing device 1502 to process independent steps of a same transaction, as described above in FIG. 12, or with the customer-facing device 1502 to process independent transactions, as described above in FIG. 13. FIG. 15 illustrates the merchant-facing devices 1500A and 1500B interacting with the customer-facing device 1502 to process independent transactions, but is not limited to such an example. In such an example, however, the first merchant-facing device 1500A can store a first data structure associated with a first transaction between a first customer 1506A and the first employee 1504A and a second data structure (or duplicate thereof) associated with a second transaction between a second customer 1506B and the second employee 1504B. In at least one example, the second merchant-facing device 1500B can store a second data structure associated with the second transaction (e.g., locally). In at least one example, the second employee 1504B can interact with a merchant application on the second merchant-facing device 1500B, via a UI, to modify the second transaction. In such an example, the merchant application can modify the second data structure on the second merchant-facing device 1500B and can send an indication of the modification to the first merchant-facing device 1500A. In such an example, a merchant application on the first merchant-facing device 1500A can update the second data structure (or duplicate thereof) based on the modification.

In some examples, the merchant application can present representations of each of the UIs in a merchant environment via the first merchant-facing device 1500A, for example. For instance, the merchant application can generate and present a UI 1508 that includes a representation of a UI presented via the customer-facing device 1502 to which the first merchant-facing device 1500A is coupled and a representation of the UI presented via the second merchant-facing device 1500B to which the first merchant-facing device 1500A is coupled. In some examples, such representations can be presented as a picture-in-picture presentation. In at least one example, the first employee 1504A can interact with the UI 1508 to access a data structure corresponding to each of the transactions represented on the UI 1508.

In some examples, the second merchant-facing device 1500B can be a personal device of the second employee 1504B and/or a merchant for which the first employees 1504A and 1504B work, and a merchant application can be temporarily provisioned to the personal device to enable the second employee 1504B to use the personal device as the second merchant-facing device 1500B. Additional details of such provisioning are provided below.

Figure 16:
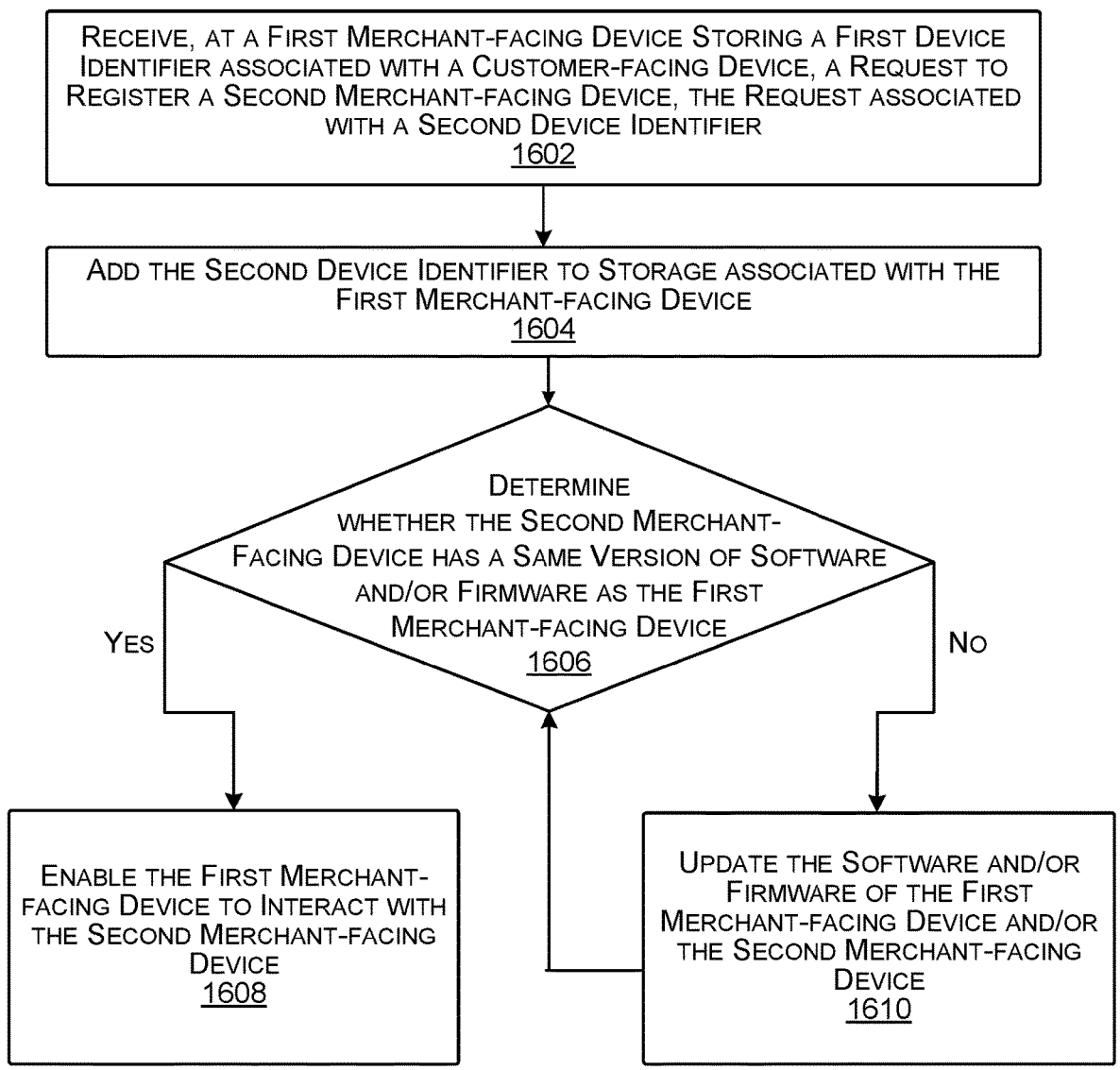
FIG. 16 illustrates an example process for coupling a merchant-facing device to another merchant-facing device to enable multiple merchant-facing devices to interact as described herein.
Figure 17:
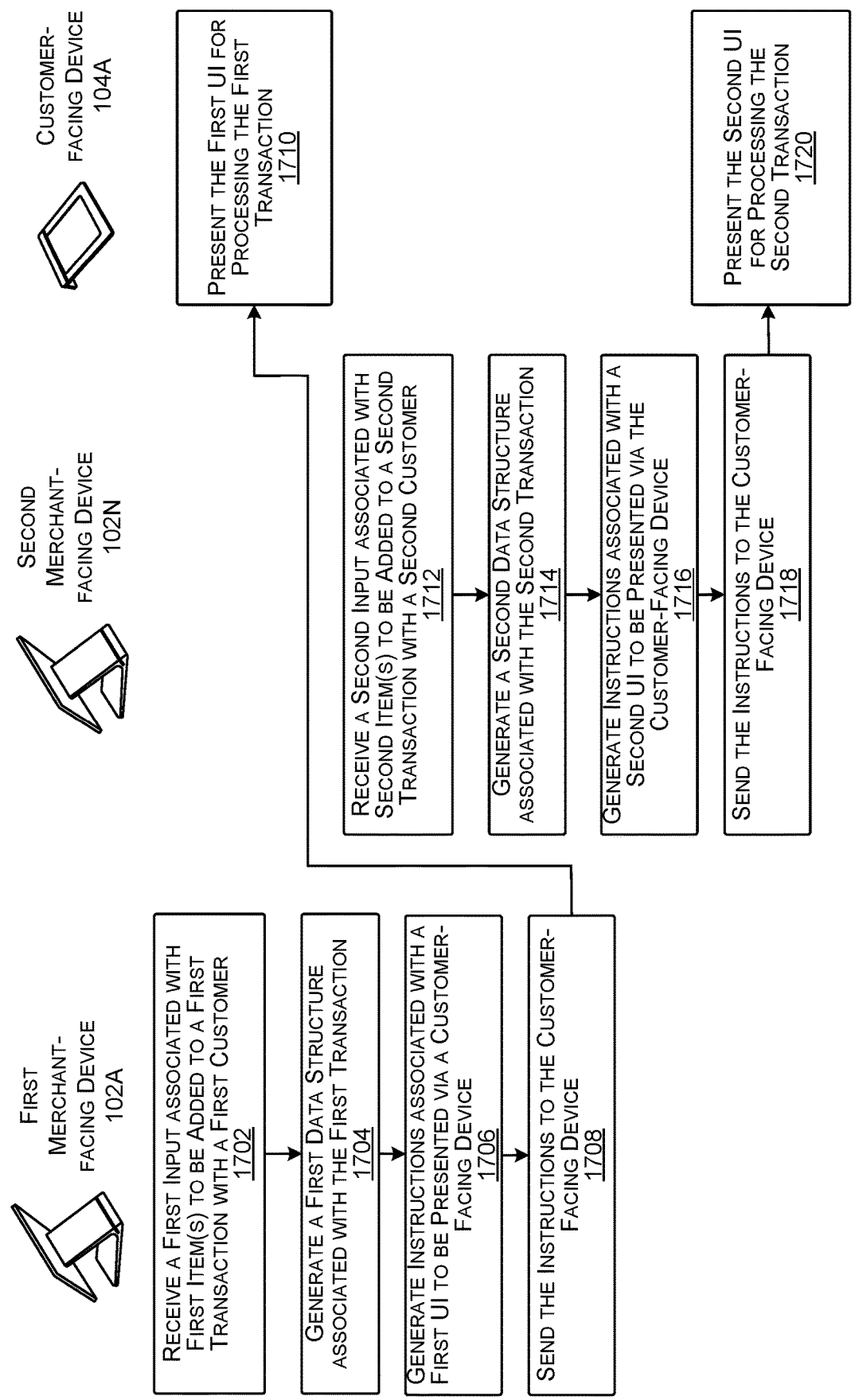
FIG. 17 illustrates an example process for processing two transactions via two merchant-facing devices of a multi-device POS system as described herein.
Figure 18:
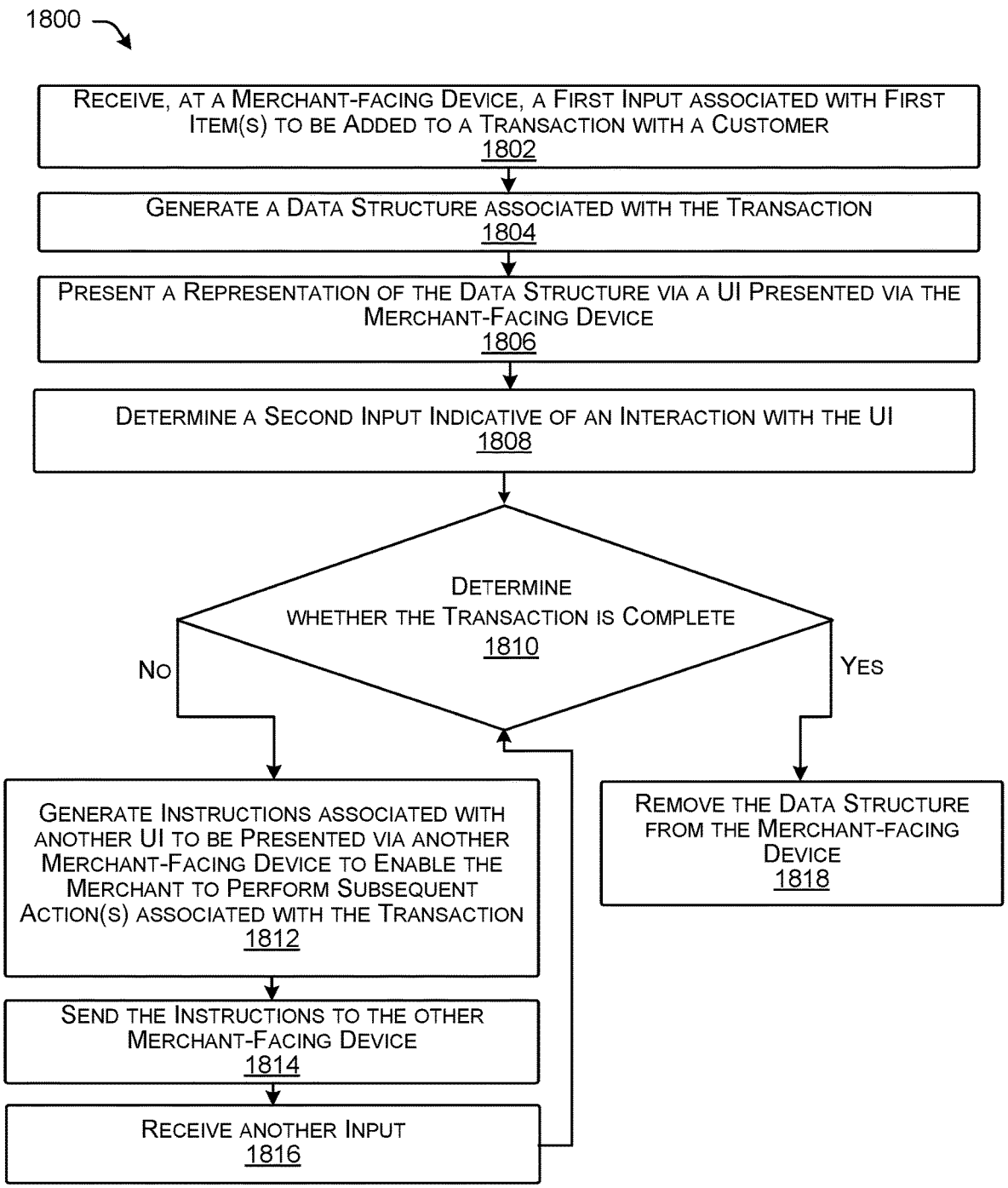
FIG. 18 illustrates an example process for processing a single transaction using multiple merchant-facing devices as described herein.

FIGS. 16-18 illustrate example processes for utilizing a multi-device POS system with multiple merchant-facing devices. FIGS. 16-18 are described with reference to environment 100 as described above with reference to FIG. 1; however, additional or alternative environments are considered to be within the scope of this disclosure.

FIG. 16 illustrates an example process 1600 for coupling a merchant-facing device to another merchant-facing device to enable multiple merchant-facing devices to interact.

Block 1602 illustrates receiving, at a first merchant-facing device storing a first device identifier associated with a customer-facing device, a request to register a second merchant-facing device, the request associated with a second device identifier. In at least one example, a first merchant-facing device 102A can store a first device identifier of a customer-facing device 104A in a device identifier storage of the first merchant-facing device 102A. The first device identifier can identify the customer-facing device 104A and, by virtue of its storage in the device identifier storage, can indicate that the first merchant-facing device 102A is capable of transmitting data to and/or receiving data from the customer-facing device 104A. Additionally, the first device identifier can serve as an identifier of the customer-facing device 104A. In at least one example, a merchant application 106 executable by the first merchant-facing device 102A can receive a request from a second merchant-facing device 102N. The request can include a second device identifier associated with the second merchant-facing device 102N. In at least one example, the first device identifier and/or the second device identifier can be associated with a respective merchant application 106 associated with the first merchant-facing device 102A and second merchant-facing device 102N.

Block 1604 illustrates adding the second device identifier to a storage associated with the merchant-facing device. Based at least in part on receiving the request, the merchant application 106 can add the second device identifier to the device identifier storage associated with the first merchant-facing device 102A. The second device identifier can identify the second merchant-facing device 102N and, by virtue of its storage in the device identifier storage, can indicate that the first merchant-facing device 102A is capable of transmitting data to and/or receiving data from the second merchant-facing device 102N. Additionally, the device identifier can serve as an identifier of the second merchant-facing device 102N.

Block 1606 illustrates determining whether the second merchant-facing device has a same version of software and/or firmware as the first merchant-facing device. Prior to exchanging data with the second merchant-facing device 102N, the first merchant-facing device 102A can determine whether the second merchant-facing device 102N has a same version of software and/or firmware as the first merchant-facing device 102A. For instance, when the second merchant-facing device 102N sends a request to couple to the first merchant-facing device 102A, the second merchant-facing device 102N provides its software and/or firmware version(s) as part of the request. The merchant application 106 can analyze the software and/or firmware version(s) and compare them to the software and/or firmware version(s) associated with the first merchant-facing device 102A. Based at least in part on determining that the second merchant-facing device 102N has the same version of software and/or firmware as the first merchant-facing device 102A, the merchant application 106 can enable the first merchant-facing device 102A to interact with the second merchant-facing device 102N, as illustrated in block 1608. In at least one example, the merchant application 106 can determine that the software and/or firmware of the second merchant-facing device 102N is different associated with a different version than the software and/or firmware of the first merchant-facing device 102A and may nevertheless enable the first merchant-facing device 102A to interact with the second merchant-facing device 102N, as illustrated in block 1608. In such an example, the merchant application 106 can determine that the version of the software and/or firmware of the second merchant-facing device 102N is compatible, albeit not the same, as the version of the software and/or the firmware of the first merchant-facing device 102A, and can enable the first merchant-facing device 102A to interact with the second merchant-facing device 102N, as illustrated in block 1608.

Based at least in part on determining that the second merchant-facing device 102N does not have the same version of software and/or firmware as the first merchant-facing device 102A, the merchant application 106 can update the software and/or firmware of the first merchant-facing device 102A and/or the second merchant-facing device 102N, as illustrated in block 1610. In some examples, the second merchant-facing device 102N can have a newer version of software and/or firmware than the first merchant-facing device 102A. In such examples, the merchant application 106 can send a request to the payment processing service server(s) 124 for an update, that can be applied upon a subsequent reboot of the first merchant-facing device 102A. Or, the second merchant-facing device 102N can push the software and/or firmware update to the first merchant-facing device 102A. If the second merchant-facing device 102N has an older version of software and/or firmware than the first merchant-facing device 102A, the merchant application 106 can facilitate an update for the second merchant-facing device 102N. In some examples, the first merchant-facing device 102A can push the update to the second merchant-facing device 102N. In other examples, the first merchant-facing device 102A can send a notification to the second merchant-facing device 102N instructing the second merchant-facing device 102N to request an update from the payment processing service server(s) 124. Then, based at least in part on the second merchant-facing device 102N having the same version of software and/or firmware as the first merchant-facing device 102A, the merchant application 106 can enable the first merchant-facing device 102A to interact with the second merchant-facing device 102N, as illustrated in block 1608.

In at least one example, new merchant-facing devices can be coupled to a merchant-facing device at different times. For instance, a merchant-facing device can be coupled to a customer-facing device at a factory and another merchant-facing device can be coupled to the merchant-facing device (and/or customer-facing device) at a later time, for instance, after onboarding the merchant-facing device, after the merchant-facing device has been installed in a merchant environment and has been powered up/down to communicate with one or more servers, after completing a transaction via the first merchant-facing device, etc.

In at least one example, after the second merchant-facing device 102N is coupled to the first merchant-facing device 102A, the second merchant-facing device 102N can interact with the customer-facing device 104A so the customer-facing device 104A is coupled to the second merchant-facing device 102N. For instance, in at least one example, the customer-facing device 104A can be docked to the second merchant-facing device 102N to couple the customer-facing device 104A to the second merchant-facing device 102N. By docking the customer-facing device 104A with the second merchant-facing device 102N, the second merchant-facing device 102N can obtain a device identifier associated with the customer-facing device 104A. Or, in an additional or alternative example, the customer-facing device 104A can transmit a device identifier associated with the customer-facing device 104A, for instance via a request, to the second merchant-facing device 102N, as described above with reference to FIG. 7. In at least one example, the second merchant-facing device 102N can be coupled with its own customer-facing device (not shown in FIGS. 12-15).

FIG. 17 illustrates an example process 1700 for processing two transactions via two merchant-facing devices of a multi-device POS system as described herein. FIG. 17 illustrates two merchant-facing devices, such as merchant-facing device 102A and merchant-facing device 102N, described above with reference to FIG. 1, and a customer-facing device, such as customer-facing device 104A, described above with reference to FIG. 1. The merchant-facing device 102A, the second merchant-facing device 102N, and the customer-facing device 104A can be coupled to one another per processes described above. Operations performed by a first merchant-facing device 102A (e.g., the merchant application 106) are illustrated under the first merchant-facing device 102A, operations performed by a second merchant-facing device 102N (e.g., an instance of the merchant application 106 executable on the second merchant-facing device 102N) are illustrated under the second merchant-facing device 102N, and operations performed by a customer-facing device 104A coupled to the first merchant-facing device 102A and/or the second merchant-facing device 102N (e.g., the customer application 114) are illustrated under the customer-facing device 104A.

Block 1702 illustrates receiving, at a first merchant-facing device, a first input associated with first item(s) to be added to a first transaction with a first customer. In at least one example, a merchant can interact with a UI (e.g., presented by the merchant application 106 associated with the merchant-facing device 102A) to add one or more first items to a first ticket. For instance, a merchant can add one or more food items to a ticket or a merchant can add one or more clothing items to a ticket. In at least one example, the merchant can add the one or more first items to the first ticket based at least in part on selecting each item of the one or more first items from an inventory of the merchant.

Block 1704 illustrates generating a first data structure associated with the first transaction. Based at least in part on receiving the first input, the merchant application 106 can generate a first data structure associated with the first transaction. The first data structure can include representations of the one or more first items added to the ticket. In some examples, the data structure can include data associated with the one or more first items, such as price, quantity, fulfillment preference (e.g., carry out, delayed pick up, delivery, etc.), etc.

Block 1706 illustrates generating instructions associated with a first UI to be presented via a customer-facing device. In at least one example, the merchant application 106 can generate instructions for presenting a representation of the first data structure via a first UI presented via the customer-facing device 104A. For instance, a customer can desire to review his or her ticket and/or provide payment data for paying for the one or more first items and the first UI can facilitate such review and/or payment.

Block 1708 illustrates sending the instructions to the customer-facing device. In at least one example, the merchant application 106 can send the instructions to the customer application 114, and the customer application 114 can receive the instructions and present the first UI associated with the instructions for processing the first transaction, as illustrated in block 1710. That is, the customer application 114 can present a first UI on the display 116 associated with the customer-facing device 104A. In some examples, the first UI can graphically present the one or more first items and/or the data associated with the one or more first items (e.g., price, quantity, fulfillment preference, etc.), for instance via a GUI. Additionally or alternatively, the first UI can present a call to action as described above.

Block 1712 illustrates receiving, at a second merchant-facing device, a second input associated with second item(s) to be added to a second transaction with a second customer. In at least one example, a merchant can interact with a UI (e.g., presented by the merchant application 106 associated with the merchant-facing device 102A) to add one or more second items to a second ticket. For instance, a merchant can add one or more food items to a ticket or a merchant can add one or more clothing items to a ticket. In at least one example, the merchant can add the one or more second items to the second ticket based at least in part on selecting each item of the one or more second items from an inventory of the merchant.

Block 1714 illustrates generating a second data structure associated with the second transaction. Based at least in part on receiving the second input, the merchant application 106 can generate a second data structure associated with the second transaction. The second data structure can include representations of the one or more second items added to the ticket. In some examples, the data structure can include data associated with the one or more second items, such as price, quantity, fulfillment preference (e.g., carry out, delayed pick up, delivery, etc.), etc.

Block 1716 illustrates generating instructions associated with a second UI to be presented via the customer-facing device. In at least one example, the merchant application 106 can generate instructions for presenting a representation of the second data structure via the customer-facing device 104A. For instance, a customer can desire to review his or her ticket and/or provide payment data for paying for the one or more second items and the second UI can facilitate such review and/or payment.

Block 1718 illustrates sending the instructions to the customer-facing device. In at least one example, the merchant application 106 can send the instructions to the customer application 114, and the customer application 114 can receive the instructions and present the second UI associated with the instructions for processing the second transaction, as illustrated in block 1710. That is, the customer application 114 can present a second UI on the display 116 associated with the customer-facing device 104A. In some examples, the second UI can graphically present the one or more second items and/or the data associated with the one or more second items (e.g., price, quantity, fulfillment preference, etc.), via a GUI for instance. Additionally or alternatively, the second UI can present a call to action as described above.

As described above, in at least one example, while a merchant application 106 associated with the first merchant-facing device 102A is performing steps 1702-1708 associated with a first transaction between the merchant and a first customer, another merchant application 106 associated with the second merchant-facing device 102N can be performing steps 1712-1718 associated with a second transaction between the merchant and a second customer. That is, as illustrated above, the multiple merchant-facing devices 102A-102N can process multiple transactions for multiple customers in parallel. Further, while FIG. 17 is described with respect to a second merchant-facing device 102N, in additional or alternative examples, the second merchant-facing device can be a personal device of a merchant (e.g., having been temporarily provisioned with a merchant application 106) or the customer-facing device 104A that is executing a merchant application 106 and/or projecting the UI.

FIG. 18 illustrates an example process 1800 for processing a single transaction using multiple merchant-facing devices as described herein.

Block 1802 illustrates receiving, at a merchant-facing device, a first input associated with item(s) to be added to a transaction with a customer. In at least one example, a merchant can interact with a UI to add one or more items to a ticket. For instance, a merchant can add one or more food items to a ticket or a merchant can add one or more clothing items to a ticket. In at least one example, the merchant can add the one or more items to the ticket based at least in part on selecting each item of the one or more items from an inventory of the merchant.

Block 1804 illustrates generating a data structure associated with the transaction. Based at least in part on receiving the first input, the merchant application 106 can generate a data structure associated with the transaction. The data structure can include representations of the one or more items added to the ticket. In some examples, the data structure can include data associated with the one or more items, such as price, quantity, fulfillment preference (e.g., carry out, delayed pick up, delivery, etc.), etc.

Block 1806 illustrates presenting a representation of the data structure via the merchant-facing device. In at least one example, the merchant application 106 can generate instructions for presenting a representation of the data structure via the merchant-facing device 102A. For instance, the merchant application 106 can generate instructions for presenting a representation of the data structure via a UI that enables the merchant to add additional items to the ticket or initiate fulfillment or a payment flow for processing the transaction.

Block 1808 illustrates determining a second input. In at least one example, the merchant can interact with the UI to add additional items to the ticket or initiate fulfillment or a payment flow for processing the transaction. In such an example, the merchant application 106 can determine a second input associated with such an interaction.

Block 1810 illustrates determining whether the transaction is complete. In at least one example, the merchant application 106 can determine whether the transaction is complete. For instance, the merchant application 106 can determine whether the second input was associated with a final step of fulfilling the ticket, a final step of a payment flow, etc. Based at least in part on determining that the transaction is not complete (e.g., the second input was not associated with the final step of ticket fulfillment and/or the payment flow and thus the transaction is associated with an "open ticket"), the merchant application 106 can generate instructions associated with another UI to be presented via another merchant-facing device, such as merchant-facing device 102N, to enable the merchant (e.g., via another employee, etc.) to perform subsequent action(s) associated with the transaction, as illustrated in block 1812. Additionally or alternatively, based at least in part on determining that the transaction is not complete (e.g., the second input was not associated with the final step of ticket fulfillment and/or the payment flow and thus the transaction is associated with an "open ticket"), the merchant application 106 can generate instructions associated with another UI to be presented via a customer-facing device to enable the customer to perform subsequent action(s) associated with the transaction.

Block 1814 illustrates sending the instructions to the other merchant-facing device. In at least one example, the merchant application 106 can send the instructions to a merchant application 106 associated with the other merchant-facing device 102N. That is, the merchant application 106 can send instructions associated with another UI that is to be presented by another merchant-facing device 102N to enable the merchant to perform subsequent actions(s) associated with the transaction to a merchant application 106 associated with the other merchant-facing device 102N.

Block 1816 illustrates receiving another input. In at least one example, the merchant can interact with the other UI, for instance, to perform a subsequent step in a ticket fulfillment process, a payment flow, etc. In such an example, the merchant application 106 associated with the other merchant-facing device 102N can send an indication of the other input associated with such an interaction to the merchant application 106 associated with the merchant-facing device 102A, and the merchant application 106 can determine whether the transaction is complete. In at least one example, the indication of the other input can be associated with a transaction identifier so that the merchant application 106 associated with the merchant-facing device 102A can determine the transaction with which the other input is associated. In at least one example, the merchant application 106 associated with the merchant-facing device 102A can update the data structure based on the other input.

Based at least in part on determining that the transaction is complete (e.g., that the second input, or any subsequent input, is associated with the final step of the ticket fulfillment, payment flow, etc.), the merchant application 106 can remove the data structure from the merchant-facing device 102A, as illustrated in block 1818. In at least one example, the data structure can be sent to the payment processing service server(s) 124 for longer-term storage, and a receipt can be sent to a device operated by the customer (if the customer so elects).

While FIG. 18 is described with respect to a second merchant-facing device 102N, in additional or alternative examples, the second merchant-facing device can be a personal device of a merchant (e.g., having been temporarily provisioned with a merchant application 106) or the customer-facing device 104A that is executing a merchant application 106 and/or projecting the UI.

Figure 19:
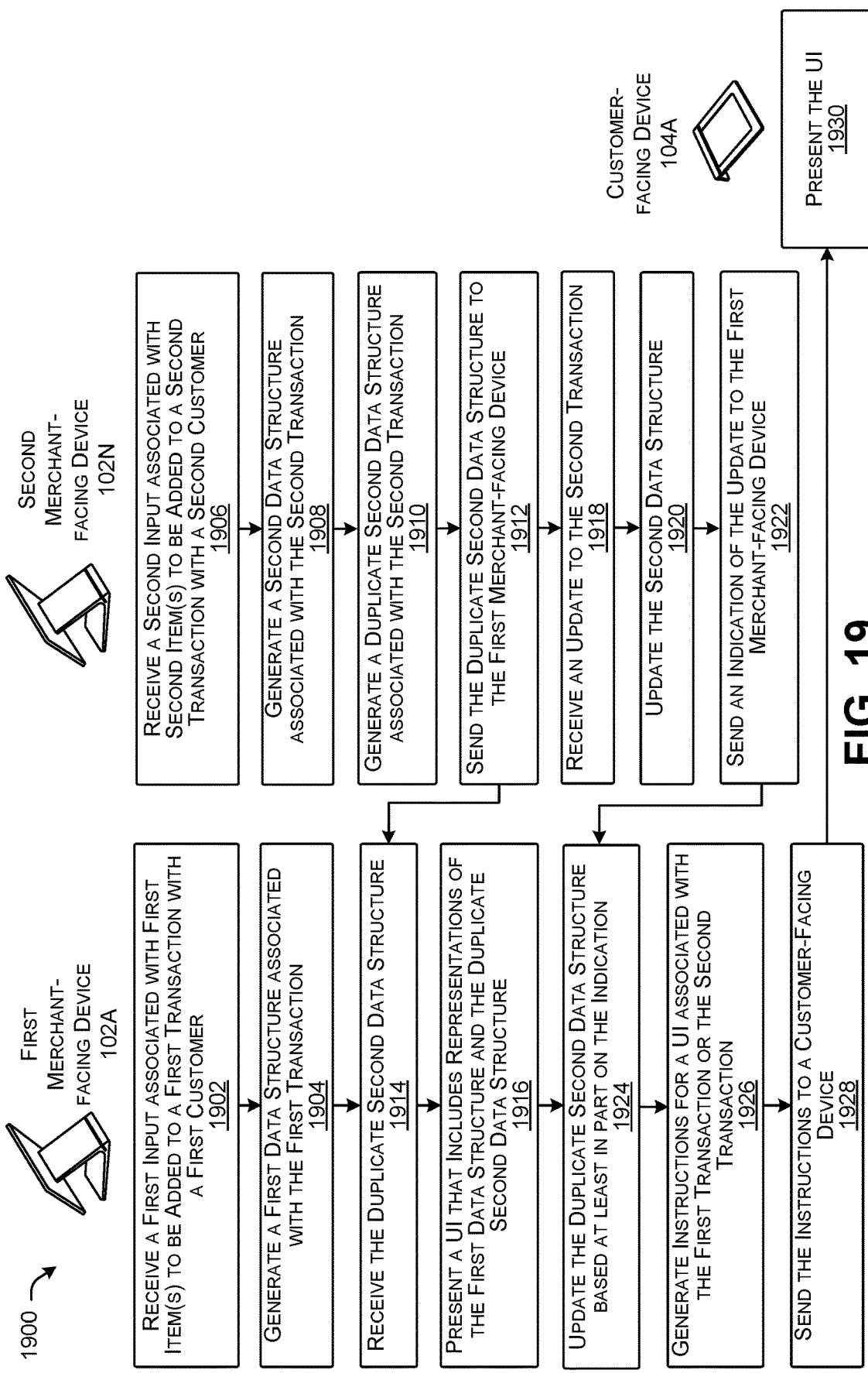
FIG. 19 illustrates an example process for processing transactions via multiple merchant-facing devices of a multi-device POS system as described herein.

FIG. 19 illustrates an example process 1900 for processing transactions via multiple merchant-facing devices of a multi-device POS system as described herein. FIG. 19 illustrates two merchant-facing devices, such as merchant-facing device 102A and merchant-facing device 102N, described above with reference to FIG. 1, and a customer-facing device, such as customer-facing device 104A, described above with reference to FIG. 1. The merchant-facing device 102A, the second merchant-facing device 102N, and the customer-facing device 104A can be coupled to one another per processes described above. Operations performed by a first merchant-facing device 102A (e.g., the merchant application 106) are illustrated under the first merchant-facing device 102A, operations performed by a second merchant-facing device 102N (e.g., an instance of the merchant application 106 executable on the second merchant-facing device 102N) are illustrated under the second merchant-facing device 102N, and operations performed by a customer-facing device 104A coupled to the first merchant-facing device 102A and/or the second merchant-facing device 102N (e.g., the customer application 114) are illustrated under the customer-facing device 104A.

Block 1902 illustrates receiving a first input associated with first item(s) to be added to a first transaction with a first customer. In at least one example, a merchant can interact with a UI presented via the first merchant-facing device 102A to add one or more items to a ticket. For instance, a merchant can add one or more food items to a ticket or a merchant can add one or more clothing items to a ticket. In at least one example, the merchant can add the one or more items to the ticket based at least in part on selecting each item of the one or more items from an inventory of the merchant. In at least one example, the merchant can add one or more first items to a first ticket associated with a first customer.

Block 1904 illustrates generating a first data structure associated with the first transaction. Based at least in part on receiving the first input, the merchant application 106 associated with the first merchant-facing device 102A can generate a first data structure associated with the first transaction. The first data structure can include representations of the one or more first items added to the first ticket. In some examples, the first data structure can include data associated with the one or more first items, such as price, quantity, fulfillment preference (e.g., carry out, delayed pick up, delivery, etc.), etc.

Block 1906 illustrates receiving a second input associated with second item(s) to be added to a second transaction with a second customer. In at least one example, a merchant can interact with a UI presented via the second merchant-facing device 102N to add one or more items to a ticket. For instance, a merchant can add one or more food items to a ticket or a merchant can add one or more clothing items to a ticket. In at least one example, the merchant can add the one or more items to the ticket based at least in part on selecting each item of the one or more items from an inventory of the merchant. In at least one example, the merchant can add one or more second items to a second ticket associated with a second customer. In an example where two separate merchant-facing devices 102 are being used, as described in FIG. 19, different employees (or other agents) of the merchant can be operating each of the merchant-facing devices 102A, 102N.

Block 1908 illustrates generating a second data structure associated with the second transaction. Based at least in part on receiving the second input, the merchant application 106 associated with the second merchant-facing device 102N can generate a second data structure associated with the second transaction. The second data structure can include representations of the one or more second items added to the second ticket. In some examples, the second data structure can include data associated with the one or more second items, such as price, quantity, fulfillment preference (e.g., carry out, delayed pick up, delivery, etc.), etc.

Block 1910 illustrates generating a duplicate second data structure associated with the second transaction. In at least one example, the merchant application 106 associated with the second merchant-facing device 102N can generate a duplicate second data structure, which can be sent to the first merchant-facing device 102A, as illustrated in block 1912. In such an example, the first merchant-facing device 102A and the second merchant-facing device 102N can each have a copy of the second data structure.

Block 1914 illustrates receiving the duplicate second data structure. In at least one example, the merchant application 106 associated with the first merchant-facing device 102A can receive the duplicate second data structure and can present the duplicate second data structure via a GUI that includes representations of the first data structure and the duplicate second data structure, as illustrated in block 1916. That is, in at least one example the merchant application 106 associated with the first merchant-facing device 102A can generate instructions for presenting a representation of the first data structure and the duplicate second data structure via the GUI. In some examples, the representations can be pictures (or other images) and the representations can be presented in a picture-in-picture presentation. In other examples, the representations can be presented in a split screen presentation or another configuration.

Block 1918 illustrates receiving an update to the second transaction. In at least one example, the merchant can interact with the second merchant-facing device 102N to update the second transaction. For instance, the merchant can add or remove a second item from the one or more second items. Or, the merchant can modify a second item of the one or more second items.

Block 1920 illustrates updating the second data structure. In at least one example, the merchant application 106 associated with the second merchant-facing device 102N can update the second data structure based on the update to the second transaction, and can send an indication of the update to the first merchant-facing device 102A, as illustrated in block 1922.

Block 1924 illustrates updating the duplicate second data structure based at least in part on the indication. Based at least in part on receiving the indication of the update, the merchant application 106 associated with the first merchant-facing device 102A can update the duplicate second data structure.

Block 1926 illustrates generating instructions for a UI associated with the first transaction or the second transaction. In at least one example, the merchant application 106 associated with the first merchant-facing device 102A can generate instructions associated with a UI that is to be presented via a customer-facing device 104A coupled to the first merchant-facing device 102A. The instructions can be associated with presenting the first transaction or the second transaction (e.g., depending on which customer is interacting with and/or otherwise proximate to the customer-facing device 104A). The UI can enable the first customer to review the one or more first items associated with the first transaction or the second customer to review the one or more second items associated with the second transaction. Additionally, the UI can enable the first customer or the second customer to input payment data (e.g., via a payment reader) to settle the first transaction or the second transaction, respectively.

Block 1928 illustrates sending the instructions to a customer-facing device. In at least one example, the merchant application 106 can send the instructions to the customer-facing device 104A and the customer-facing device 104A can present the UI via the customer-facing device 104A, as illustrated in block 1930. In at least one example, the UI can be a GUI with graphical elements to facilitate the functionality described above.

As described above, the multi-device POS system described herein offers a complete POS solution for merchants that enables merchants to process more transactions more efficiently than with existing POS systems. As described above, the multi-device POS system enables flexible configurations of at least one merchant-facing device and at least one customer-facing device, which provide efficiencies in payment processing as described above.

As described below, techniques described herein are directed to provisioning functionality on personal devices to enable personal devices to integrate into the multi-device POS system. Techniques described below, therefore, enable devices provisioned with functionality on further enhance the multi-device POS system described herein.

Provisioning Functionality on Personal Devices

As described above, in some examples, functionality can be provisioned from a POS device to a personal device of a user. In some examples, the "user" can be an employee, or other individual working on behalf of, a merchant. In other examples, the "user" can be a customer.

In some examples, the functionality provisioned can be associated with functionalities that are availed via the merchant application 106 described above with reference to FIG. 1. For instance, the functionality can enable the personal device to facilitate transactions between a merchant and a customer. In at least one example, the functionality can configure the personal device to provide instructions for obtaining and/or directly obtain payment data to settle a transaction and/or send payment data to the payment processing service server(s) 124. In some examples, the functionality can enable the personal device to communicate with the merchant-facing device 102A and/or the customer-facing device 104A to provide payment data and/or settle a transaction. In additional or alternative examples, the functionality can configure the personal device to generate and/or manage tickets, send and/or track invoices, manage inventory (e.g., edit inventory, customize products with photos, names, prices, etc., track inventory), send receipts via email, text, etc., apply discounts and issue refunds, access, search, and/or interact with real-time sales data and complete sales history, etc. via the personal device. In at least one example, the functionality can be associated with a dashboard to enable the operator to manage transactions, payments, and so forth, via the dashboard that is presented on the personal device.

In additional or alternative examples, the functionality provisioned can be associated with functionalities that are availed via the customer application 114 described above with reference to FIG. 1. For instance, the functionality can configure the personal device to obtain payment data, and related information, and send the payment data, and related information, to the merchant-facing device 102A. Additionally, the functionality can configure the personal device to present information to a customer via a UI. For instance, the functionality can configure the personal device to present, among other things, contents of a ticket (e.g., a cart, etc.), such as one or more items associated with a ticket, an amount of the ticket, and additional information (e.g., taxes, discounts (e.g., item-level or ticket-level), coupons, etc.) via a UI. In some examples, the functionality can configure the personal device to present calls to action via the UI.

In some examples, the functionality provisioned can be provisioned as part of a MVC framework. Traditionally, MVC is an architectural pattern that can be used for developing user interfaces that divides an application into three interconnected components: a model component, a view component, and a controller component. The three components separate internal representations of information from the ways information is presented to and accepted from a user of a device. In at least one example, the model component is the central component of the framework. The model component can express the behavior of an application, such as the merchant application 106, independent of the user interface. The model component can directly manage data, logic, and/or rules associated with the merchant application 106. The view component can output representations of information, such as a via a GUI. The controller component can be configured to accept input and convert the input into commands for the model component and/or the view component.

In such examples, one or more components of a MVC framework can be provisioned to a personal device to effectuate the functionality. In such examples, a view component can be provisioned to the personal device and the functionality can be provisioned via a model component and/or controller component associated with the merchant-facing device 102A and/or customer-facing device 104A.

FIGS. 20-24 illustrate example environments wherein a POS device can provision functionality on a personal device as described herein. FIGS. 20-24 are described in the environment 100, described above with reference to FIG. 1, but are not limited to such an environment.

Figure 20:
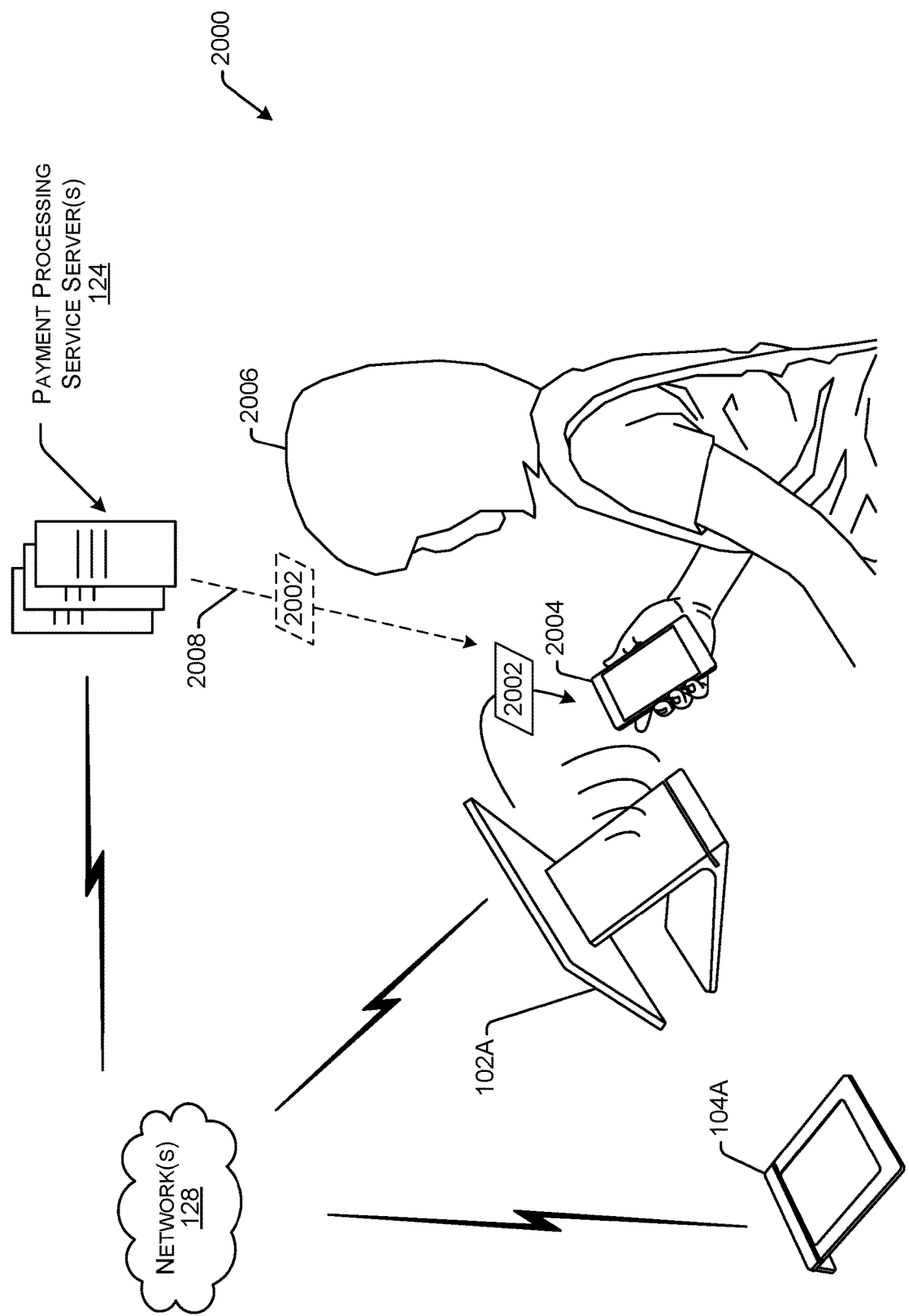
FIG. 20 illustrates an example environment where a device of a multi-device POS system is provisioning functionality on a personal device of a customer as described herein.

FIG. 20 illustrates an example environment 2000 where the merchant-facing device 102A is provisioning functionality 2002 to a personal device 2004 of a customer 2006. In some examples, the functionality 2002 can be associated with one or more functionalities that are availed via the merchant application 106 and/or the customer application 114, as described above.

As described below in additional detail, in at least one example, a device of the multi-device POS system (e.g., merchant-facing device 102A and/or customer-facing device 104A) can determine a presence of a personal device 2004 within a range of the multi-device POS system. In at least one example, the device of the multi-device POS system can determine that personal device 2004 is within a range of the device based at least in part on an interaction between the personal device and the device (e.g., a tap). In some examples, the device of the multi-device POS system can determine that personal device 2004 is within a range of the device based at least in part on determining that the personal device is within a threshold distance of the device. In at least one example, such a determination can be based on location data (e.g., GPS data) received from the personal device 2004. In an additional or alternative example, the device of the multi-device POS system can determine that the personal device 2004 is within a range of the device based at least in part on determining that a signal associated with the personal device 2004 satisfies a threshold. Further, the device of the multi-device POS system can determine that the personal device 2004 is within a range of the device based at least in part on determining how the personal device 2004 responds to a signal emitted by the device of the multi-device POS system. Moreover, in at least one example, the device of the multi-device POS system can determine that the personal device 2004 is within a range of the device based at least in part on determining that the personal device 2004 has joined a same network as the device of the multi-device POS system (e.g., joined a Wi-Fi network associated with the merchant). Furthermore, in at least one example, the device of the multi-device POS system can determine that the personal device 2004 is within a range of the device based at least in part on sensor data identifying a presence of the personal device 2004.

In some examples, the payment processing service server(s) 124 can determine a presence of the personal device 2004 within a range of the multi-device POS system. In such examples, the payment processing service server(s) 124 can send an indication to the merchant-facing device 102A and/or the customer-facing device 104A indicating that the personal device 2004 is within a range of the multi-device POS system. While various examples of determining a presence of the personal device 2004 are listed above, any combination of the aforementioned examples could additionally be utilized for determining the presence of the personal device 2004 as described herein.

In at least one example, based at least in part on determining that the personal device 2004 is within a range of the multi-device POS system, a device of the multi-device POS system can provision the functionality 2002 to the personal device 2004. While FIG. 20 illustrates the merchant-facing device 102A provisioning the functionality 2002, in additional or alternative examples, the customer-facing device 104A and/or the payment processing service server(s) 124 can provision the functionality 2002. In some examples, the merchant-facing device 102A can provision the functionality 2002 to the personal device 2004 directly, for instance, via the network(s) 128. In other examples, the device can provision the functionality 2002 to the personal device 2004 indirectly via the network(s) 128. For instance, in some examples, at least some of the functionality 2002 can be provisioned by the payment processing service server(s) 124, as illustrated by the dashed line 2008.

Figure 21:
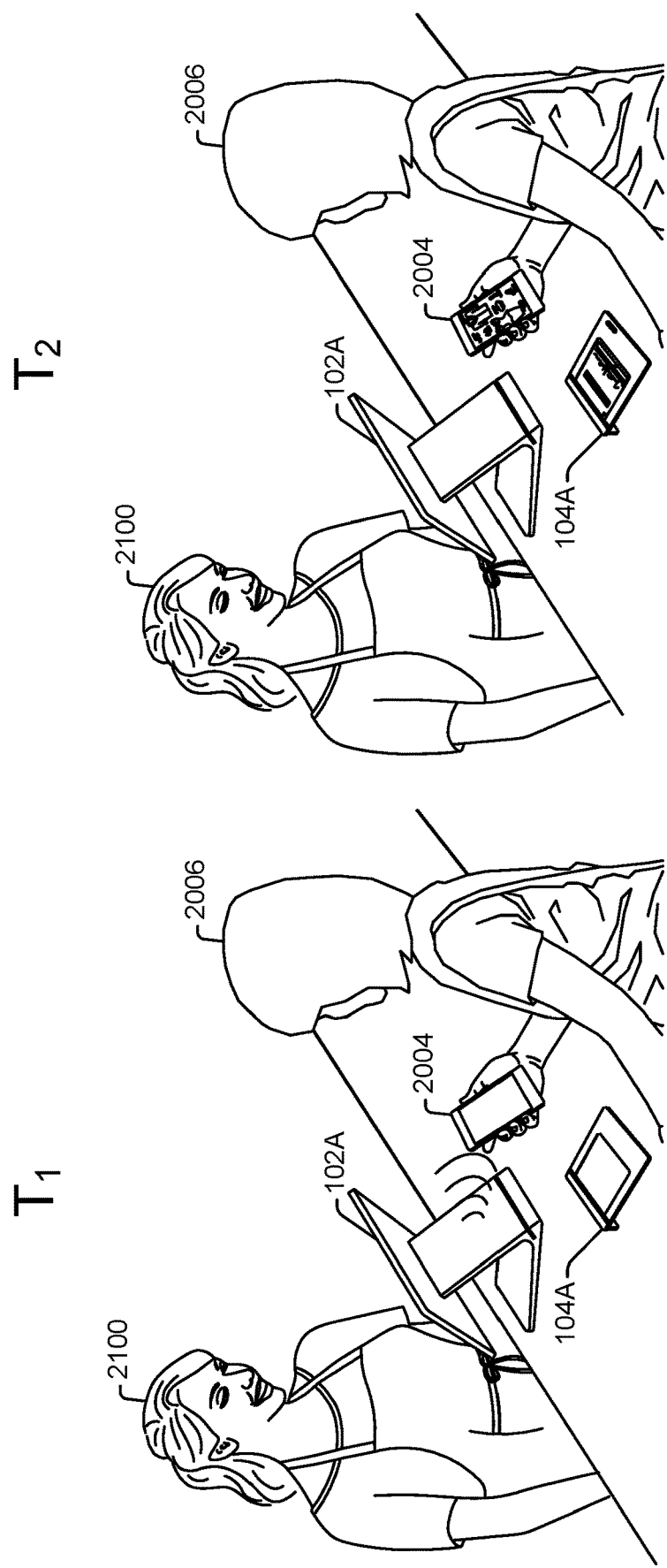
FIG. 21 illustrates additional details associated with the example environment described in FIG. 20.

FIG. 21 illustrates additional details associated with an example of environment 2000 where the merchant-facing device 102A is provisioning functionality 2002 to a personal device 2004 of a customer 2006. As illustrated in FIG. 21, the merchant-facing device 102A can provision functionality on the personal device 2004 of the customer 2006 at a first time ($T_1$). In at least one example, the functionality can enable the customer to, among other things, access inventory data associated with a merchant 2100, add one or more items to ticket (e.g., build a virtual cart), and provide information associated with a payment instrument to satisfy a cost of the ticket. As shown in FIG. 21, the customer 2006 can utilize her personal device 2004 to build a ticket (e.g., items added to the ticket are shown on the UI presented via the personal device 2004). Additional details associated with using a device to build a ticket are described in U.S. patent application Ser. No. 15/858,911, which issued as U.S. Pat. No. 10,318,569 on Jun. 11, 2019, and is incorporated in its entirety by reference herein.

When the customer 2006 is finished shopping (e.g., at a second time ($T_2$)), the customer 2006 can return to a check-out station (which can be a same or different location as where the functionality was provisioned) and can interact with the merchant-facing device 102A and/or the customer-facing device 104A to pay for the items that the customer 2006 has added to the ticket and thereby complete a transaction between the customer 2006 and the merchant 2100. For instance, in at least one example, the functionality associated with the personal device 2004 can transmit the ticket (e.g., a data structure representing the ticket) from the personal device 2004 to the merchant-facing device 102A (which can then transmit the ticket to the payment processing service server(s) 124) and the merchant-facing device 102A can interact with the customer-facing device 104A to settle the transaction. Then, the merchant-facing device 102A can send data associated with the ticket to the customer-facing device 104A and the customer-facing device 104A can present a UI prompting the customer 2006 to provide payment data (e.g., via dip, tap, swipe, etc.). In some examples, the merchant-facing device 102A can send instructions for presenting the UI to the customer-facing device 104A. In at least one example, the customer 2006 can provide payment data via the customer-facing device 104A and the customer-facing device 104A can transmit the payment data to the merchant-facing device 102A. The merchant-facing device 102A can then transmit the payment data to the payment processing service server(s) 124 for processing the transaction. The merchant-facing device 102A can receive an indication from the payment processing service server(s) 124 indicating whether the payment data is authorized for the cost of the transaction, and can provide a representation of such indication to the customer-facing device 104A. The customer-facing device 104A can present a UI that indicates whether the payment data was authorized (e.g., and thus the transaction is complete), the payment data was declined, etc. That is, the personal device 2004 can interact with the merchant-facing device 102A and/or the customer-facing device 104A to complete a payment flow to settle a transaction.

In some examples, as described below, the functionality can be de-provisioned from the customer device 2004 responsive to an occurrence of an event. In at least one example, the event can correspond to a settlement of a transaction. That is, in the example illustrated in FIG. 21, responsive to the payment data being authorized (or declined), the merchant-facing device 102A can de-provision the functionality that was provisioned to the personal device 2004. Additional or alternative examples of events causing such de-provisioning are described below.

FIG. 21 is but one example of how a customer 2006 can utilize a personal device 2004 that has been temporarily provisioned functionality 2002. Of course, other examples are considered to be within the scope of this disclosure. For instance, temporarily provisioned functionality onto a personal device of a customer can be useful in a restaurant environment where customers order at a counter. In such an example, functionality can be temporarily provisioned to a personal device of a customer based on determining that the personal device is within a range of a multi-device POS system at a restaurant. The temporary provisioning can enable the personal device to present the restaurant's inventory (e.g., menu) via the personal device. The customer can interact with his or her personal device to add one or more items to an order (e.g., ticket) for the customer and the personal device can interact with the multi-device POS system to fulfill and/or settle the associated transaction. In some examples, the provisioned functionality can be personalized for the customer, as described below. In at least one example, the provisioned functionality can present a portion of the restaurant's inventory that is particularly relevant to the customer. For instance, if the customer is vegan, the provisioned functionality can present a portion of the restaurant's inventory that is associated with vegan entrees for the customer.

Figure 22:
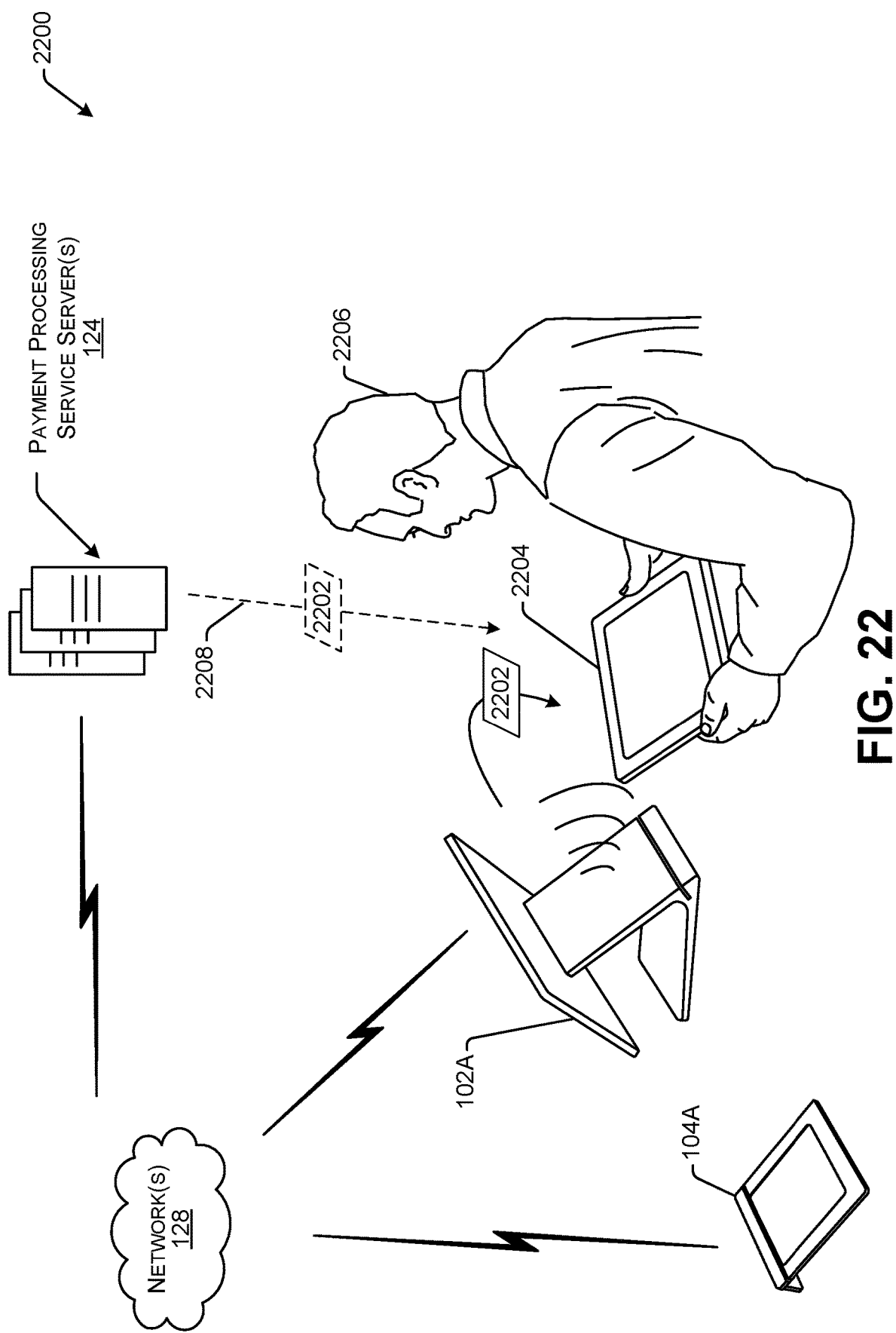
FIG. 22 illustrates an example environment where a device of a multi-device POS system is provisioning functionality on a personal device of a merchant as described herein.

FIG. 22 illustrates an example environment 2200 where the merchant-facing device 102A is provisioning functionality 2202 to a personal device 2204 of a merchant 2300. In some examples, the functionality 2202 can be associated with the merchant application 106 described above with reference to FIG. 1. In additional or alternative examples, the functionality 2202 can be associated with the customer application 114 described above with reference to FIG. 1. In at least one example, based at least in part on determining that the personal device 2004 is within a range of the multi-device POS system, a device of the multi-device POS system can provision the functionality 2202 to the personal device 2004. While FIG. 22 illustrates the merchant-facing device 102A provisioning the functionality 2002, in additional or alternative examples, the customer-facing device 104A and/or the payment processing service server(s) 124 can provision the functionality 2202. In some examples, the merchant-facing device 102A can provision the functionality 2202 to the personal device 2204 directly, for instance, via the network(s) 128. In other examples, the device can provision the functionality 2202 to the personal device 2204 indirectly via the network(s) 128. For instance, in some examples, at least some of the functionality 2202 can be provisioned by the payment processing service server(s) 124, as illustrated by the dashed line 2208.

Figure 23:
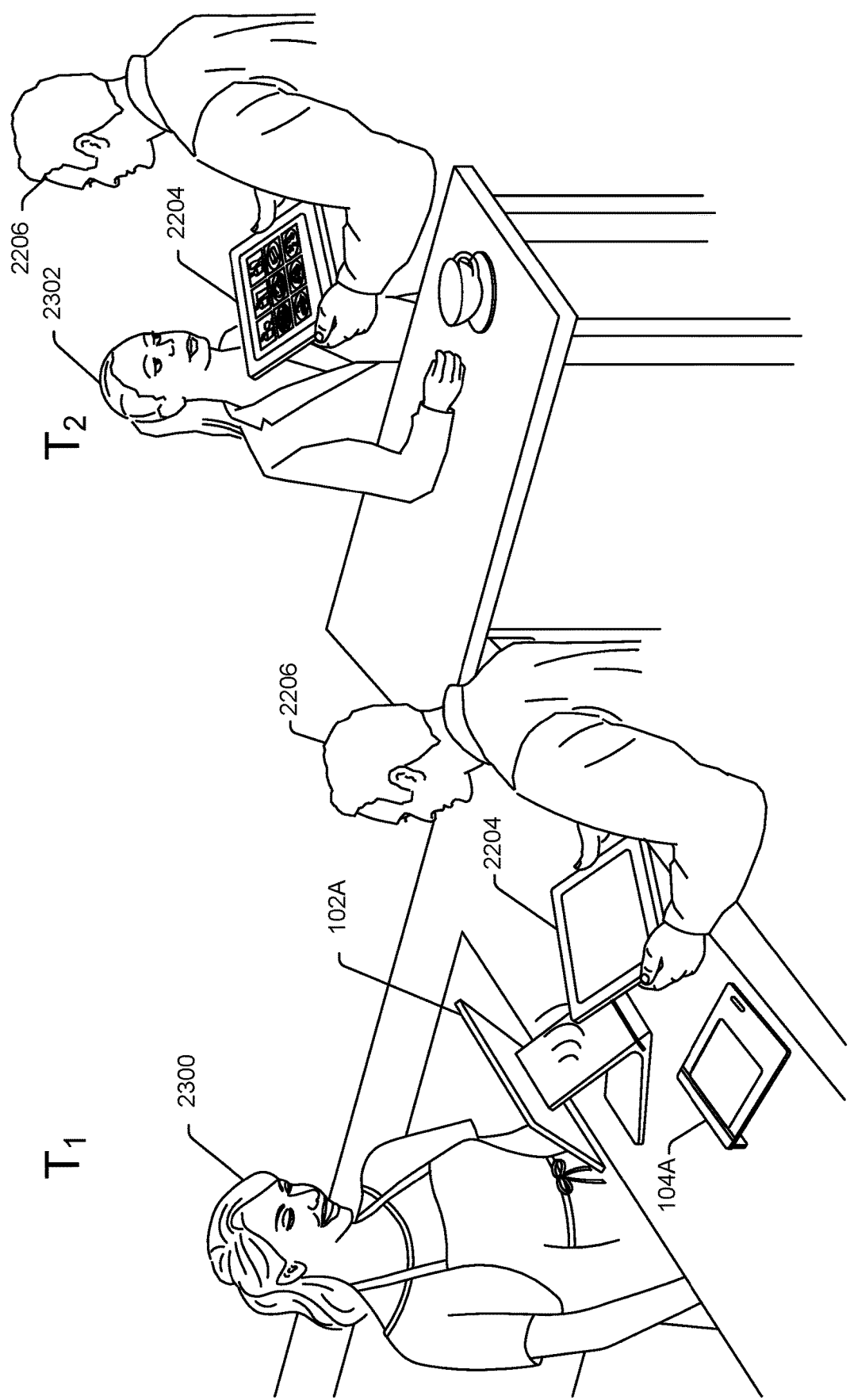
FIG. 23 illustrates additional details associated with the example environment described in FIG. 22.

FIG. 23 illustrates additional details associated with an example of environment 2200 where the merchant-facing device 102A is provisioning functionality 2202 to a personal device 2204 of an employee 2206 of (or other agent working on behalf of) a merchant. As illustrated in FIG. 23, the merchant-facing device 102A can provision functionality on the personal device 2204 of the employee 2206 at a first time ($T_1$). In at least one example, the functionality can enable a merchant 2300, or an employee 2206 of the merchant 2300, to, among other things, access inventory data associated with the merchant, generate tickets based at least in part on adding one or more items of inventory to individual tickets, and collecting information for processing payment for the individual tickets. In some examples, the functionality can enable a merchant 2300 to split a ticket into multiple tickets (e.g., split ticket handling) so that a group of customers can individually pay for the item(s) they ordered. Additional details associated with split ticket handling are described in U.S. patent application Ser. No. 14/985,528, which issued as U.S. Pat. No. 10,078,820 on Sep. 8, 2019 and is incorporated in its entirety by reference herein.

In at least one example, the employee 2206 can utilize his personal device 2204 to interact with customers, such as customer 2302. The personal device 2204 can store a local copy of the inventory of the merchant 2300, which can be accessible via a UI (as illustrated on the display of the personal device 2204). At a second time ($T_2$), the employee 2206 can interact with the UI to add one or more items from the inventory to a ticket associated with the customer 2302. In at least one example, when the customer 2302 is ready to pay for her item(s), the employee 2206 can utilize his personal device to request payment data from the customer 2302. In some examples, the personal device 2204 can be associated with a payment reader device that is integrated into the personal device 2204, insertable into the personal device 2204, or otherwise coupled to the personal device 2204. In such an example, the customer 2302 can provide payment data via the personal device 2204 and the personal device 2204 can transmit the payment data to the merchant-facing device 102A. The merchant-facing device 102A can then transmit the payment data to the payment processing service server(s) 124 for processing the transaction. The merchant-facing device 102A can receive an indication from the payment processing service server(s) 124 indicating whether the payment data is authorized for the cost of the transaction and can provide a representation of such indication to the personal device 2204. The personal device 2204 can present a UI that indicates whether the payment data was authorized (e.g., and thus the transaction is complete), the payment data was declined, etc.

In an alternative example, the personal device 2204 can send a duplicate of the ticket (e.g., a duplicate data structure) to the merchant-facing device 102A. The merchant-facing device 102A can store the duplicate ticket locally (and, in some examples, can then transmit the ticket to the payment processing service server(s) 124) and, when the customer 2302 is ready to pay, the customer 2302 can approach a check-out station where the merchant-facing device 102A and/or the customer-facing device 104A are positioned. The merchant-facing device 102A can access the duplicate ticket and the merchant-facing device 102A can interact with the customer-facing device 104A to settle the transaction. Then, the merchant-facing device 102A can send data associated with the ticket to the customer-facing device 104A and the customer-facing device 104A can present a UI prompting the customer 2302 to provide payment data (e.g., via dip, tap, swipe, etc.). In an additional or alternative example, the merchant-facing device 102A can send instructions for presenting the UI via the customer-facing device 104A. In at least one example, the customer 2302 can provide payment data via the customer-facing device 104A and the customer-facing device 104A can transmit the payment data to the merchant-facing device 102A. The merchant-facing device 102A can then transmit the payment data to the payment processing service server(s) 124 for processing the transaction. The merchant-facing device 102A can receive an indication from the payment processing service server(s) 124 indicating whether the payment data is authorized for the cost of the transaction and can provide a representation of such indication to the customer-facing device 104A. The customer-facing device 104A can present a UI that indicates whether the payment data was authorized (e.g., and thus the transaction is complete), the payment data was declined, etc.

In some examples, as described below, the functionality can be de-provisioned from the customer device 2204 responsive to an occurrence of an event. In at least one example, the event can correspond to an employee clocking out. For instance, if the employee 2206 interacts with the merchant-facing device 102A, the customer-facing device 104A, and/or the payment processing service server(s) 124 (e.g., via another device), and indicates that he is finished with his shift, the customer-facing device 104A, and/or the payment processing service server(s) 124 can de-provision the functionality that was provisioned to the personal device 2004. Additional or alternative examples of events causing such de-provisioning are described below.

FIG. 23 is but one example of how a merchant (e.g., employee 2206) can utilize a personal device 2204 that has been temporarily provisioned functionality 2202. Of course, other examples are considered to be within the scope of this disclosure. For instance, additional details associated with provisioning functionality to devices for use in merchant environments can be found in U.S. patent application Ser. No. 15/454,892, which is incorporated in its entirety by reference herein.

While FIGS. 20-23 are described above with reference to operations performed by the merchant-facing device 102A and/or the customer-facing device 104A, it should be noted, that an instance of the merchant application 106 is performing the actions attributed to the merchant-facing device 102A and an instance of the customer application 114 is performing the actions attributed to the customer-facing device 104A.

Figure 25:
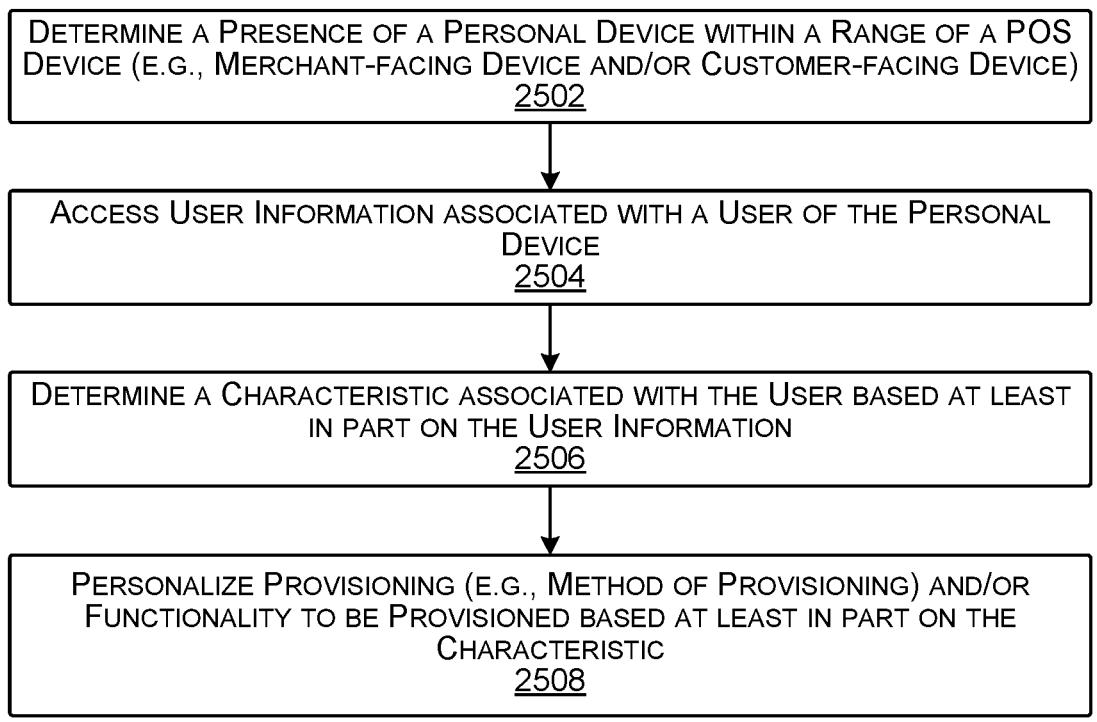
FIG. 25 illustrates an example process for personalizing provisioning based on a characteristic of a user of a personal device as described herein.
Figure 26:
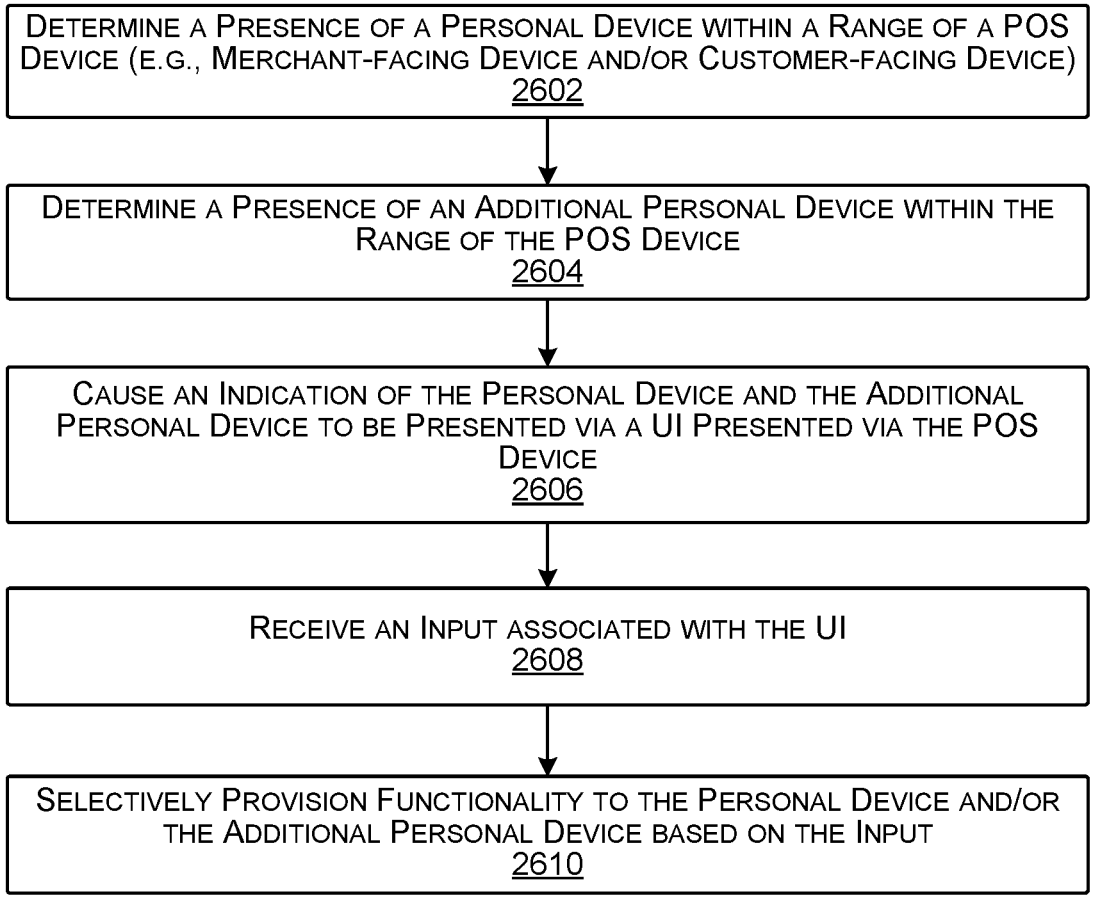
FIG. 26 illustrates an example process for selectively provisioning functionality on one or more personal devices as described herein.

FIGS. 24-26 describe various processes for provisioning functionality on a personal device of a user as described herein. FIGS. 24-26 are described with reference to environment 100 as described above with reference to FIG. 1; however, additional or alternative environments are considered to be within the scope of this disclosure. Furthermore, processes 2400-2600 are described with reference to "a device of a POS system." In some examples, the device can correspond to the merchant-facing device 102A. In such examples, an instance of the merchant application 106 on the merchant-facing device 102A can perform the operations described herein. In additional or alternative examples, the device can correspond to the customer-facing device 104A. In such examples, an instance of the customer application 114 can perform the operations described herein.

FIG. 24 illustrates an example process 2400 for temporarily provisioning functionality on a personal device of a user as described herein.

Block 2402 illustrates determining a presence of a personal device within a range of a POS device (e.g., merchant-facing device and/or customer-facing device). In at least one example, a device of the multi-device POS system can determine a presence of a personal device within a range of the multi-device POS system.

In at least one example, the device of the multi-device POS system can determine that personal device 2004 is within a range of the device based at least in part on an interaction between the personal device and the device (e.g., a tap).

Additionally or alternatively, the device of the multi-device POS system can determine that a personal device is within a range of the device based at least in part on determining that the personal device is within a threshold distance of the device of the multi-device POS system. In some examples, the threshold distance can be associated with a geofence corresponding to a merchant location. In additional or alternative examples, the device of the multi-device POS system can receive location data (e.g., GPS data) associated with the personal device to determine a location of the personal device relative to the device of the multi-device POS system.

In at least one example, the device of the multi-device POS system can determine that a personal device is within a range of the device based at least in part on determining that a signal associated with the personal device satisfies a threshold. For instance, in some examples, the device of the multi-device POS system can measure radio strength signals (e.g., decibels, signal to noise ratio, received signal strength (RSSI), etc.) emitted by the personal device. Based on determining that the signal satisfies a threshold, the device of the multi-device POS system can determine the presence of the personal device within the range of the multi-device POS system. Further, the device of the multi-device POS system can determine that the personal device 2004 is within a range of the device based at least in part on determining how the personal device 2004 responds to a signal emitted by the device of the multi-device POS system.

Moreover, in at least one example, the device of the multi-device POS system can determine that the personal device 2004 is within a range of the device based at least in part on determining that the personal device 2004 has joined a same network as the device of the multi-device POS system (e.g., joined a Wi-Fi network associated with the merchant). Furthermore, in at least one example, the device of the multi-device POS system can determine that the personal device 2004 is within a range of the device based at least in part on sensor data (e.g., cameras, etc.) identifying a presence of the personal device 2004. In such an example, the sensors can be associated with the device of the multi-device POS system and/or can be external sensors that communicate to the device of the multi-device POS system and/or the payment processing service server(s) 124.

In some examples, payment processing service server(s) 124 can determine a presence of a personal device within a range of the multi-device POS system. In such examples, the payment processing service server(s) 124 can utilize location data and/or radio strength signals to determine that a personal device is within a range of the multi-device POS system. Further, the payment processing service server(s) 124 can determine a presence of a personal device within a range of the multi-device POS system via same and/or similar methods as described above. In at least one example, the payment processing service server(s) 124 can send an indication to the merchant-facing device 102A and/or the customer-facing device 104A indicating that a personal device is within a range of the multi-device POS system.

Block 2404 illustrates provisioning functionality on the personal device to configure the personal device to present a UI and enable the personal device to interact with the merchant-facing device and/or the customer-facing device. In at least one example, based at least in part on determining that the personal device is within a range of the multi-device POS system, a device of the multi-device POS system can provision functionality on the personal device. In some examples, the device of the multi-device POS system can provision the functionality on the personal device directly via the network(s) 128. In other examples, the device of the multi-device POS system can provision the functionality on the personal device indirectly via the network(s) 128.

In at least one example, the device can provision the functionality on the personal device directly via the network(s) 128. For instance, in such an example, the merchant-facing device 102A can provision an instance of the merchant application 106 (or the customer application 114) directly to the personal device via NFC, or the customer-facing device 104A can provision an instance of the customer application 114 (or the merchant application 106) directly to the personal device via NFC. In some examples, the merchant-facing device 102A and/or the customer-facing device 104A can provision portions of the merchant application 106 and/or customer application 114 such that the personal device can perform functionalities that are typical of both of the applications, as described herein. That is, in some examples, the functionality provisioned can be a sub-set of instructions associated with the merchant application 106 and/or the customer application 114, which are executable by the personal device to perform one or more functionalities as described herein. In at least one example, as described above, the functionality can be provisioned via a MVC framework.

In an additional or alternative example, the device can provision the functionality on the personal device indirectly. For instance, the device can send an address (e.g., URL, etc.) to the personal device. The address can be associated with a remote location from which the functionality is accessible (e.g., the payment processing service server(s) 124). In some examples, the address can be sent via NFC or another short-range network of the network(s) 128. The user of the personal device can interact with the address (e.g., via a selectable control presented via a UI of the personal device) and send a request to the remote location for access to the functionality. In such an example, the functionality can be sent to the personal device from the remote location over the network(s) 128. For instance, the functionality can be downloaded onto the personal device from the payment processing service server(s) 124. In at least one example, the functionality can be transmitted to the personal device via a long-range network of the network(s) 128.

In some examples, the personal device can have previously downloaded an application that enables access to the functionality. In such examples, a device of the multi-device POS system and/or the payment processing service server(s) 124 can provision the functionality on the application responsive to determining the presence of the personal device within a range of the multi-device POS system. For instance, the device of the multi-device POS system and/or the payment processing service server(s) 124 can activate the functionality associated with the application responsive to determining the presence of the personal device within a range of the multi-device POS system. In some examples, the device of the multi-device POS system and/or the payment processing service server(s) 124 can send a request for permission to access the functionality and can provision the functionality on the application responsive to receiving permission.

Furthermore, in at least one example, the user of the personal device can interact with a web browser via the personal device to request access to the functionality. In at least one example, the personal device can send a request for the functionality on the device of the multi-device POS system and/or the payment processing service server(s) 124 via an interaction with the web browser presented via the personal device. Responsive to sending the request, the device of the multi-device POS system and/or the payment processing service server(s) 124 can provision the functionality on the personal device. In at least one example, the payment processing service server(s) 124 can send an instruction to the device of the multi-device POS system that instructs the device of the multi-device POS system to provision the functionality. In other examples, the payment processing service server(s) 124 can directly provision the functionality on the personal device.

In some examples, the device of the multi-device POS system and/or the payment processing service server(s) 124 can provision functionality on a personal device without request from the personal device (e.g., automatically). In other examples, the device of the multi-device POS system and/or the payment processing service server(s) 124 can provision functionality on a personal device responsive to receiving a request from the personal device for such functionality.

Block 2406 illustrates determining an occurrence of an event. In at least one example, the functionality can be associated with one or more limitations on its use. For instance, in some examples, the one or more limitations can be associated with events, the occurrence of which causes the functionality on be de-provisioned from the personal device.

In at least one example, such an event can correspond to a determination that the personal device is outside of the threshold distance, as described above. In such an example, the device of the multi-device POS system and/or the payment processing service server(s) 124 can utilize location data and/or signal information to determine whether the personal device is outside of the threshold distance. Additionally or alternatively, the device of the multi-device POS system and/or the payment processing service server(s) 124 can utilize signal information to determine whether a signal associated with the personal device satisfies a threshold. Responsive to determining that the personal device is outside of the threshold distance and/or does not satisfy the threshold associated with signal strength, the device associated with the multi-device POS system and/or the payment processing service server(s) 124 can de-provision the functionality from the personal device, as illustrated in block 2408.

In another example, such an event can correspond to a determination that a transaction is settled. As described above, in some examples, the functionality can enable a customer to interact with a merchant via the personal device, for instance, to conduct one or more transactions. In at least one example, responsive to determining that a transaction is settled (e.g., the customer has provided payment data in association with a transaction and the payment data has been authorized or declined), the device of the multi-device POS system and/or the payment processing service server(s) 124 can determine that access to the functionality is no longer necessary. As such, the device associated with the multi-device POS system and/or the payment processing service server(s) 124 can de-provision the functionality from the personal device, as illustrated in block 2408.

Furthermore, in at least one example, such an event can correspond to a determination that an employee (or other agent), working on behalf of the merchant, clocks-out or otherwise finishes a shift. As described above, in some examples, the functionality can enable a merchant to interact with one or more customers via the personal device, for instance, to conduct one or more transactions. In at least one example, an employee can clock-in and clock-out of an employee management system associated with the multi-device POS system and/or payment processing service server(s) 124. In such an example, the device of the multi-device POS system and/or the payment processing service server(s) 124 can determine that an employee clocked-out or otherwise finished a shift, and can determine that access to the functionality is no longer necessary. As such, the device associated with the multi-device POS system and/or the payment processing service server(s) 124 can de-provision the functionality from the personal device, as illustrated in block 2408.

In at least one example, such an event can correspond to an expiration of a predetermined period of time. In such an example, the device of the multi-device POS system and/or the payment processing service server(s) 124 can determine that a predetermined period of time associated with the provisioning of the functionality has expired. Responsive to determining that the predetermined period of time associated with the provisioning of the functionality has expired, the device associated with the multi-device POS system and/or the payment processing service server(s) 124 can de-provision the functionality from the personal device, as illustrated in block 2408.

In some examples, a user of a personal device with provisioned functionality can interact with the device of the multi-device POS system to de-provision the functionality. In such an example, the user can tap or otherwise interact with the merchant-facing device 102A or the customer-facing device 104A to indicate that the provisioned functionality is no longer needed, desired, etc. Responsive to such an indication, the device associated with the multi-device POS system and/or the payment processing service server(s) 124 can de-provision the functionality from the personal device, as illustrated in block 2408.

In some examples, the device associated with the multi-device POS system and/or the payment processing service server(s) 124 can send a signal to deactivate the functionality provisioned to the personal device. In other examples, the originally provisioned functionality can include a temporary key or other means for deactivating the functionality provisioned to the personal device.

FIG. 25 illustrates an example process 2500 for personalizing provisioning based on a characteristic of a user of a personal device as described herein.

Block 2502 illustrates determining a presence of a personal device within a range of a POS device. As described above with reference to FIG. 24, in at least one example, a device of the multi-device POS system can determine a presence of a personal device within a range of the multi-device POS system. In some examples, the device of the multi-device POS system can determine that a personal device is within a range of the device based at least in part on determining that the personal device is within a threshold distance of the device. In an additional or alternative example, the device of the multi-device POS system can determine that a personal device is within a range of the device based at least in part on determining that a signal associated with the personal device satisfies a threshold. Furthermore, in some examples, payment processing service server(s) 124 can determine a presence of a personal device within a range of the multi-device POS system. In such examples, the payment processing service server(s) 124 can send an indication to the merchant-facing device 102A and/or the customer-facing device 104A indicating that a personal device is within a range of the multi-device POS system.

Block 2504 illustrates accessing user information associated with a user of the personal device. In some examples, the device associated with the multi-device POS system and/or the payment processing service server(s) 124 can store historical data associated with customers and/or merchants. For instance, in at least one example, the device associated with the multi-device POS system and/or the payment processing service server(s) 124 can store profiles associated with individual customers and/or individual merchants. In such examples, the profiles can be associated with identifiers for identifying the corresponding customers and/or merchants. In at least one example, an identifier can correspond to a personal device (e.g., a device identifier), an account identifier, an employee identifier, a biometric identifier, etc.

In at least one example, a customer profile can include data indicating previous transactions between the customer and one or more merchants. Such data can indicate items purchased, prices of items, locations of transactions, time of transactions, payment instruments used, etc. Additionally, data associated with a customer profile can include data indicating one or more preferences of a customer, such as how a customer prefers to have functionality provisioned to his or her personal devices (e.g., directly or indirectly), which functionality(s) the customer uses when interacting with merchants (e.g. virtual cart building, etc.), etc.

In at least one example, a merchant profile can include inventory data indicating an inventory of the merchant, employment data associated with one or more employees of a merchant, payroll data associated with compensation information for the one or more employees, etc. Further, in some examples, a merchant profile can include data indicating previous transactions between the merchant and one or more customers. In at least one example, a merchant profile can include data indicating one or more preferences of the merchant, such as how a merchant prefers to have functionality provisioned to his or her personal devices (e.g., directly or indirectly), which functionality(s) the merchant uses when interacting with merchants (e.g., ticket building, checkout, inventory management, employee management, etc.), etc. In at least one example, a merchant profile can be associated with one or more employee profiles. An employee profile can be associated with an employee identifier and can store preferences of the employee as well as other information associated with a relationship between the employee and the merchant (e.g., the employer).

In at least one example, the device associated with the multi-device POS system and/or the payment processing service server(s) 124 can determine an identifier associated with the user of the personal device. For instance, in some examples, the identifier can be a device identifier associated with the personal device. In other examples, the identifier can be an employee identifier or a biometric identifier. Based at least in part on identifying the user of the personal device, the device associated with the multi-device POS system and/or the payment processing service server(s) 124 can access user information associated with the user (e.g., from a corresponding profile).

Block 2506 illustrates determining a characteristic associated with the user based at least in part on the user information. In at least one example, the device associated with the multi-device POS system and/or the payment processing service server(s) 124 can analyze the user information to identify a characteristic of the user.

Block 2508 illustrates personalizing provisioning (e.g., method) and/or functionality on be provisioned based at least in part on the characteristic. In at least one example, the device associated with the multi-device POS system and/or the payment processing service server(s) 124 can utilize the characteristic to determine how to provision the functionality on the user and/or what functionality on provision to the user.

For instance, in an example, the characteristic can indicate that a customer prefers to receive functionality via a direct connection via NFC. In such an example, the device associated with the multi-device POS system and/or the payment processing service server(s) 124 can provision the functionality via a direct connection via NFC. In another example, the characteristic can indicate that a merchant typically uses his or her personal device for inventory management. In such an example, the device associated with the multi-device POS system and/or the payment processing service server(s) 124 can determine to provision functionality to enable such inventory management. Or, the characteristic can indicate that a customer always orders a particular item from the merchant. In such an example, the device associated with the multi-device POS system and/or the payment processing service server(s) 124 can provision a functionality to enable the customer to order the particular item (e.g., via a one-click option) when the customer is within the range of the device of the POS system.

In at least one example, the device associated with the multi-device POS system and/or the payment processing service server(s) 124 can utilize a machine-learned model to determine how to personalize the provisioning and/or functionality. For instance, in such an example, the device associated with the multi-device POS system and/or the payment processing service server(s) 124 can compare user information associated with the user with user information associated with other users, and can personalize the provisioning and/or functionality based on the user information associated with the other users. That is, in some examples, behaviors of other users can be used to inform how the device associated with the multi-device POS system and/or the payment processing service server(s) 124 provisions functionality and/or what functionality the device associated with the multi-device POS system and/or the payment processing service server(s) 124 provisions. Machine-learned models can include supervised learning algorithms, unsupervised learning algorithms, deep learning algorithms, etc.

As a non-limiting example of how behaviors of other users can be used to inform how the device associated with the multi-device POS system and/or the payment processing service server(s) 124 provisions functionality and/or what functionality the device associated with the multi-device POS system and/or the payment processing service server(s) 124 provisions, the device associated with the multi-device POS system and/or the payment processing service server(s) 124 can determine that a customer frequents a same merchant or type of merchant, and tends to purchase similar items, as another customer. The items, for instance, can be bulk items which can be difficult to carry around a store. Accordingly, user information associated with the other customer can indicate that the other customer utilizes a provisioned cart building functionality when the other customer is shopping at a physical location of a merchant. As such, the device associated with the multi-device POS system and/or the payment processing service server(s) 124 can determine to provision functionality that enables the customer to build a cart responsive to determining that a device operated by the customer is within a range of the device associated with the multi-device POS system.

As another non-limiting example, the device associated with the multi-device POS system and/or the payment processing service server(s) 124 can determine that a merchant sells similar types of items as another merchant that uses a particular functionality. For instance, a merchant that owns a restaurant and sells entrees and beverages is likely to use split ticket handling like another merchant that owns a restaurant and sells entrees and beverages. Accordingly, user information associated with the other merchant can indicate that the other merchant utilizes a split ticket handling functionality. As such, the device associated with the multi-device POS system and/or the payment processing service server(s) 124 can determine to provision functionality that enables the merchant to utilize split ticket handling responsive to determining that a device operated by the merchant is within a range of the device associated with the multi-device POS system.

FIG. 26 illustrates an example process 2600 for selectively provisioning functionality on one or more personal devices as described herein.

Block 2602 illustrates determining a presence of a personal device within a range of a POS device. As described above with reference to FIG. 24, in at least one example, a device of the multi-device POS system can determine a presence of a personal device within a range of the multi-device POS system. In some examples, the device of the multi-device POS system can determine that a personal device is within a range of the device based at least in part on determining that the personal device is within a threshold distance of the device. In an additional or alternative example, the device of the multi-device POS system can determine that a personal device is within a range of the device based at least in part on determining that a signal associated with the personal device satisfies a threshold. Furthermore, in some examples, payment processing service server(s) 124 can determine a presence of a personal device within a range of the multi-device POS system. In such examples, the payment processing service server(s) 124 can send an indication to the merchant-facing device 102A and/or the customer-facing device 104A indicating that a personal device is within a range of the multi-device POS system.

Block 2604 illustrates determining a presence of another personal device within the range of the POS device. In at least one example, a device of the multi-device POS system and/or the payment processing service server(s) 124 can determine a presence of another personal device within a range of the multi-device POS system.

Block 2606 illustrates causing an indication of the personal device and the additional personal device to be presented via a UI presented via the POS device. In at least one example, the device associated with the multi-device POS system and/or the payment processing service server(s) 124 can generate instructions associated with a UI that is to be presented via the device associated with the multi-device POS system. The UI can be a GUI that includes a graphical element representative of the personal device and another graphical element representative of the other personal device. In some examples, the graphical element can be selectable (e.g., a selectable control).

Block 2608 illustrates receiving an input associated with the UI. In at least one example, the device associated with the multi-device POS system and/or the payment processing service server(s) 124 can receive an input associated with the UI. For instance, the device associated with the multi-device POS system and/or the payment processing service server(s) 124 can receive an input that a graphical element corresponding to the personal device and/or the other personal device was selected (e.g., by an operator of the device associated with the multi-device POS system). That is, the device associated with the multi-device POS system and/or the payment processing service server(s) 124 can receive an indication of which personal device(s) the operator of the device associated with the multi-device POS system selects for provisioning functionality.

Block 2610 illustrates selectively provisioning functionality on the personal device and/or the additional personal device based on the input. Responsive to receiving the input, the device associated with the multi-device POS system and/or the payment processing service server(s) 124 can determine which of the personal device(s) to provision functionality. For instance, if the input indicates that the operator of the device associated with the multi-device POS system selected the personal device, the device associated with the multi-device POS system and/or the payment processing service server(s) 124 can provision functionality on the personal device. Additionally or alternatively, if the input indicates that the operator of the device associated with the multi-device POS system selected the other personal device, the device associated with the multi-device POS system and/or the payment processing service server(s) 124 can provision functionality on the other personal device.

Process 2600 enables an operator of a device associated with a multi-device POS system to selectively provision functionality on personal devices. In other examples, an operator of a device associated with a multi-device POS system can uniformly provision functionality on personal devices. In some examples, selective provisioning can be executed without requiring input from an operator of a device associated with a multi-device POS system (e.g., automatically). For instance, in some examples, the device of the multi-device POS system and/or the payment processing service server(s) 124 can selectively provision functionality on personal device(s) based on distance, signal strength, loyalty, an order in which provisioning was requested, etc., without any input from an operator.

It should be noted that while FIGS. 20-26 are directed to provisioning functionality on a personal device, in additional or alternative examples, similar techniques can be implemented to provision functionality onto a merchant-facing device, such as merchant-facing device 102A, and/or a customer-facing device, such as customer-facing device 104A. In such an example, the provisioning device can be another merchant-facing device, a customer-facing device, and/or the payment processing service server(s) 124.

In at least one example, the provisioning techniques described above can be useful for additional and/or alternative purposes. For instance, the payment processing service server(s) 124 can access provisioning data to determine when and/or where functionality was temporarily provisioned to a personal device of a customer. Such information can be useful for validating purchases (e.g., fraud prevention) and/or validating reviews (e.g., authentication of reviews). Similarly, by enabling customers to use their personal devices to interact with merchants, merchants can gain valuable insight into customer preferences. For instance, by using location data to track the location of a customer throughout a store, merchants can learn customer habits and can further personalize the customer experience (e.g., with the merchant or other merchants that subscribe to payment processing services from the payment processing service provider). Merchants can similarly use provisioning data to determine which employees engaged in particular transactions (e.g., quality control) and/or were present at particular times (e.g., theft detection).

As described above, techniques described herein are directed to provisioning functionality on personal devices to enable personal devices to integrate into the multi-device POS system. Such integration enables devices provisioned with functionality on further enhance the multi-device POS system described herein.

Multi-Functionality Devices

As described below, techniques described herein are directed to provisioning functionality on merchant-facing devices and/or customer-facing devices to enable the merchant-facing devices and/or customer-facing devices to execute functionality different than what a typical merchant-facing device and/or customer-facing device would execute. Such additional functionalities expand the usefulness of the multi-device POS system thereby enhancing both payment processing efficiencies and/or customer experiences. For instance, additional functionalities described below improve customer experience and/or security by minimizing the time where a payment instrument is out of sight of a customer. That is, by enabling the merchant-facing devices and/or customer-facing devices to execute functionality different than what a typical merchant-facing device and/or customer-facing device would execute, transactions can be processed with more transparency. Furthermore, techniques described below enable the presentation of duplicative user interfaces. Such duplicity can improve oversight, training, consistency of customer experiences, etc.

As described above in some examples, a merchant-facing device of a multi-device POS system can perform merchant functionality and customer functionality. Additionally or alternatively, a customer-facing device of a multi-device POS system can perform customer functionality and merchant functionality. That is, merchant-facing devices and/or customer-facing devices can have multiple functionalities to enhance the multi-device POS system described herein. While described in the context of merchant-facing devices and/or customer-facing devices, in at least one example, a personal device can additionally or alternatively be provisioned with functionality that enables it to perform multiple functionalities (e.g., merchant and/or customer).

"Merchant functionality" as described herein can be associated with functionalities that are availed via the merchant application 106 described above with reference to FIG. 1. For instance, merchant functionality can enable a device to facilitate transactions between a merchant and a customer. In at least one example, the merchant functionality can configure a device to provide instructions for obtaining and/or directly obtain payment data to settle a transaction and/or send payment data to the payment processing service server(s) 124. In some examples, the merchant functionality can configure a device to generate and/or manage tickets, send and/or track invoices, manage inventory (e.g., edit inventory, customize items in the inventory with photos, names, prices, etc., track inventory), send receipts via email, text, etc., apply discounts and issue refunds, access, search, and/or interact with real-time sales data and complete sales history, etc. via the personal device. In at least one example, the merchant functionality can be associated with a dashboard to enable an operator of a device to manage transactions, payments, and so forth, via the dashboard that is presented on the personal device. Of course, other merchant functionalities are considered to be within the scope of this disclosure.

"Customer functionality" as described herein can be associated with functionalities that are availed via the customer application 114 described above with reference to FIG. 1. For instance, customer functionality can configure a device to obtain payment data, and related information, and send the payment data, and related information, to a merchant-facing device 102A. Additionally, the customer functionality can configure a device to present information to a customer via a UI. For instance, the customer functionality can configure a device to present, among other things, contents of a ticket (e.g., a cart, etc.), such as one or more items associated with a ticket, an amount of the ticket, and additional information (e.g., taxes, discounts (e.g., item-level or ticket-level), coupons, etc.) via a UI. In some examples, the customer functionality can configure a device to present calls to action via the UI. Of course, other customer functionalities are considered to be within the scope of this disclosure.

FIGS. 27-31 illustrates some example environments wherein a merchant-facing device and/or a customer-facing device are implementing multiple functionalities as described herein.

Figure 27:
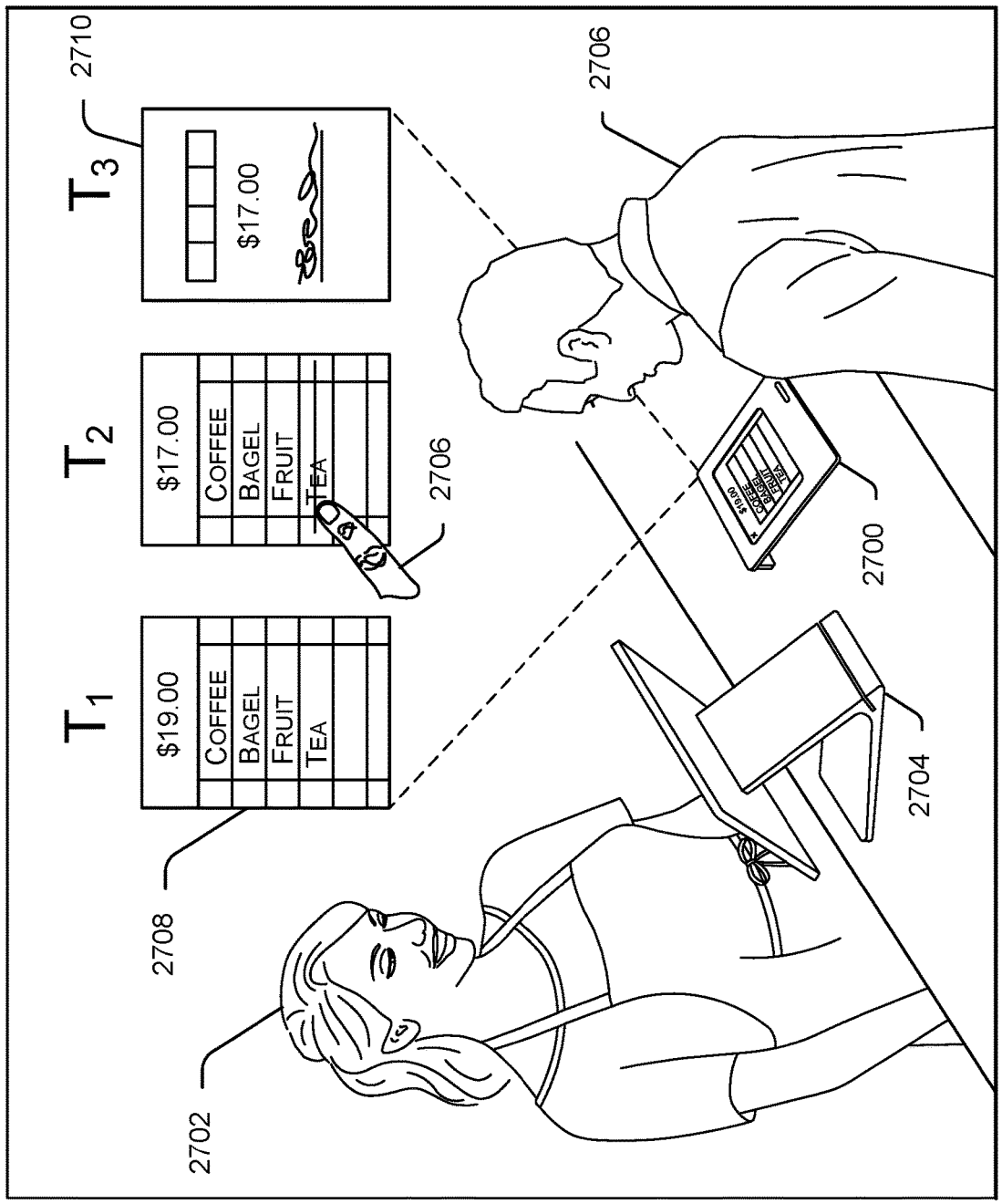
FIG. 27 illustrates an example environment where a customer-facing device of a multi-device POS system can execute merchant functionality and customer functionality as described herein.

FIG. 27 illustrates an example environment where a customer-facing device 2700 of a multi-device POS system can execute merchant functionality and customer functionality as described herein. As illustrated, a merchant (or an agent working on behalf of the merchant) 2702 can interact with a merchant-facing device 2704, which can correspond to the merchant-facing device 102A described above with reference to FIG. 1. The merchant-facing device 2704 can be coupled to at least one customer-facing device 2700, which can correspond to the customer-facing device 104A described above with reference to FIG. 1. A customer 2706 is shown interacting with the customer-facing device 2700.

In at least one example, at a first time ($T_1$) the customer-facing device 2700 can present a UI 2708, which can be a graphical representation of one or more items that the customer 2706 desires to purchase from the merchant 2702 (e.g., a graphical representation of a ticket). Such a functionality is typically associated with a customer application executable by the customer-facing device 2700 (e.g., viewing item(s) associated with a ticket).

In at least one example, at a second time (T2), the customer 2706 can review the ticket and can interact with the UI 2708 to modify the ticket. For instance, if the ticket includes an item that the customer 2706 did not order, or that the customer 2706 ordered but no longer desires, etc., the customer 2706 can interact with the UI 2708 to remove an item from the ticket. Such functionality is typically associated with a merchant application executable by the merchant-facing device 2704 (e.g., building a ticket and/or modifying item(s) on a ticket). However, in at least one example, as illustrated in FIG. 27, the customer-facing device 2700 can perform such functionality.

At a third time ($T_3$), the customer-facing device 2700 can present a new UI 2710 to instruct the customer 2706 to provide payment (and authorization for payment) via the customer-facing device 2700. Such a functionality is typically associated with a customer application executable by the customer-facing device 2700 (e.g., executing payment flow for settling a transaction). Although not pictured, in some examples, the customer 2706 can interact with a UI after having paid for the transaction (e.g., after the third time ($T_3$)) to further add and/or modify the ticket. Such functionality is typically associated with a merchant application executable by the merchant-facing device 2704 (e.g., building a ticket and/or modifying item(s) on a ticket).

That is, as illustrated in FIG. 27, the customer-facing device 2700 can toggle between customer functionality, merchant functionality, and customer functionality. In some examples, the customer-facing device 2700 can perform merchant functionality via an executable instance of a merchant application associated with the customer-facing device 2700. In other examples, the customer-facing device 2700 can perform merchant functionality via a view of a MVC framework associated with the merchant-facing device 2704 and the customer-facing device 2700. Additional details associated with both examples are provided below.

Figure 28:
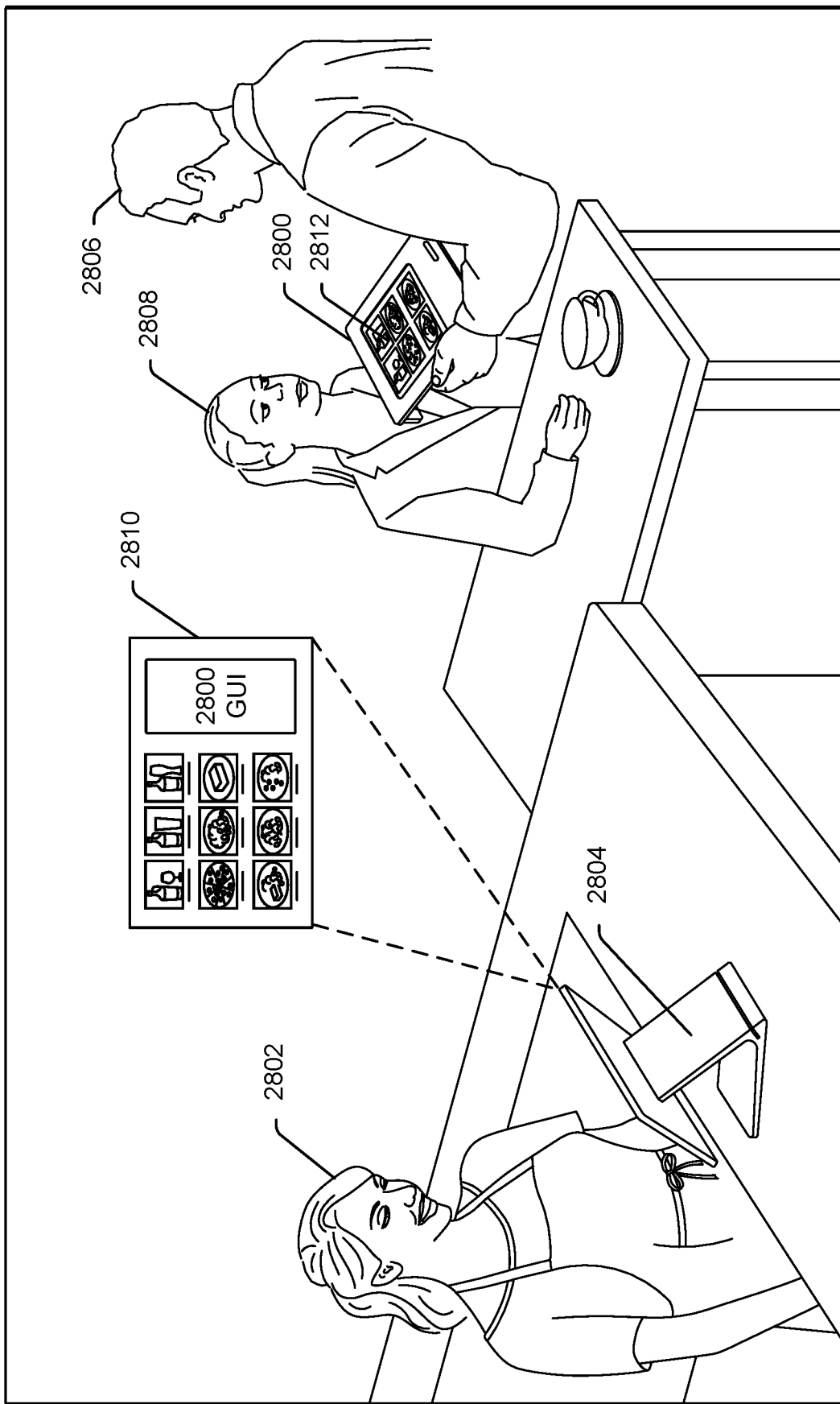
FIG. 28 illustrates another example environment where a customer-facing device of a multi-device POS system is executing merchant functionality and customer functionality as described herein.

FIG. 28 illustrates another example environment where a customer-facing device 2800 of a multi-device POS system can execute merchant functionality and customer functionality as described herein. As illustrated, a first employee 2802 (or other agent) of a merchant can interact with a merchant-facing device 2804, which can correspond to the merchant-facing device 102A described above with reference to FIG. 1. The merchant-facing device 2804 can be coupled to at least one customer-facing device 2800, which can correspond to the customer-facing device 104A described above with reference to FIG. 1. A second employee (or other agent) 2806 of the merchant is shown interacting with the customer-facing device 2800.

In at least one example, the customer-facing device 2800 can be provisioned access to an inventory of the merchant (e.g., via provisioning data associated with at least a portion of the inventory to the customer-facing device 2800 or a channel for accessing the inventory on the merchant-facing device 2804). Such functionality is typically associated with a merchant application. However, by configuring the customer-facing device 2800 to perform such functionality, the second employee 2806 can carry the customer-facing device 2800 throughout a merchant environment (e.g., a store) to interact with customers, such as customer 2808. In at least one example, the second employee 2806 and/or the customer 2808 can interact with the customer-facing device 2800 to add one or more items from the merchant's inventory to a ticket associated with the customer 2808. In such an example, the customer-facing device 2800 can generate a data structure representative of the ticket and can send the data structure (or a duplicate thereof) to the merchant-facing device 2804. The merchant-facing device 2804 can present at least a portion of the data structure via a UI 2810 presented on a display 108 of the merchant-facing device 2804. That is, the merchant-facing device 2804 can enable the first employee 2802 to view the state of the customer-facing device 2800. In some examples, the UI 2810 can present a UI that substantially resembles the UI 2812 on the customer-facing device 2800. In some examples, the UI 2810 can be a duplicate of the UI 2812. In other examples, the UI 2810 can substantially resemble the UI 2812 such that the UI 2810 differs from the UI 2812 less than a similarity threshold. In other examples (e.g., as illustrated in FIG. 28), the UI 2810 can present a picture-in-picture presentation of the UI 2812 within the UI 2810. In some examples, the UI 2810 can include a representation of each customer-facing device coupled to the merchant-facing device 2804 and the first employee 2802 can selectively view and/or interact with individual representations of customer-facing devices.

Figure 29:
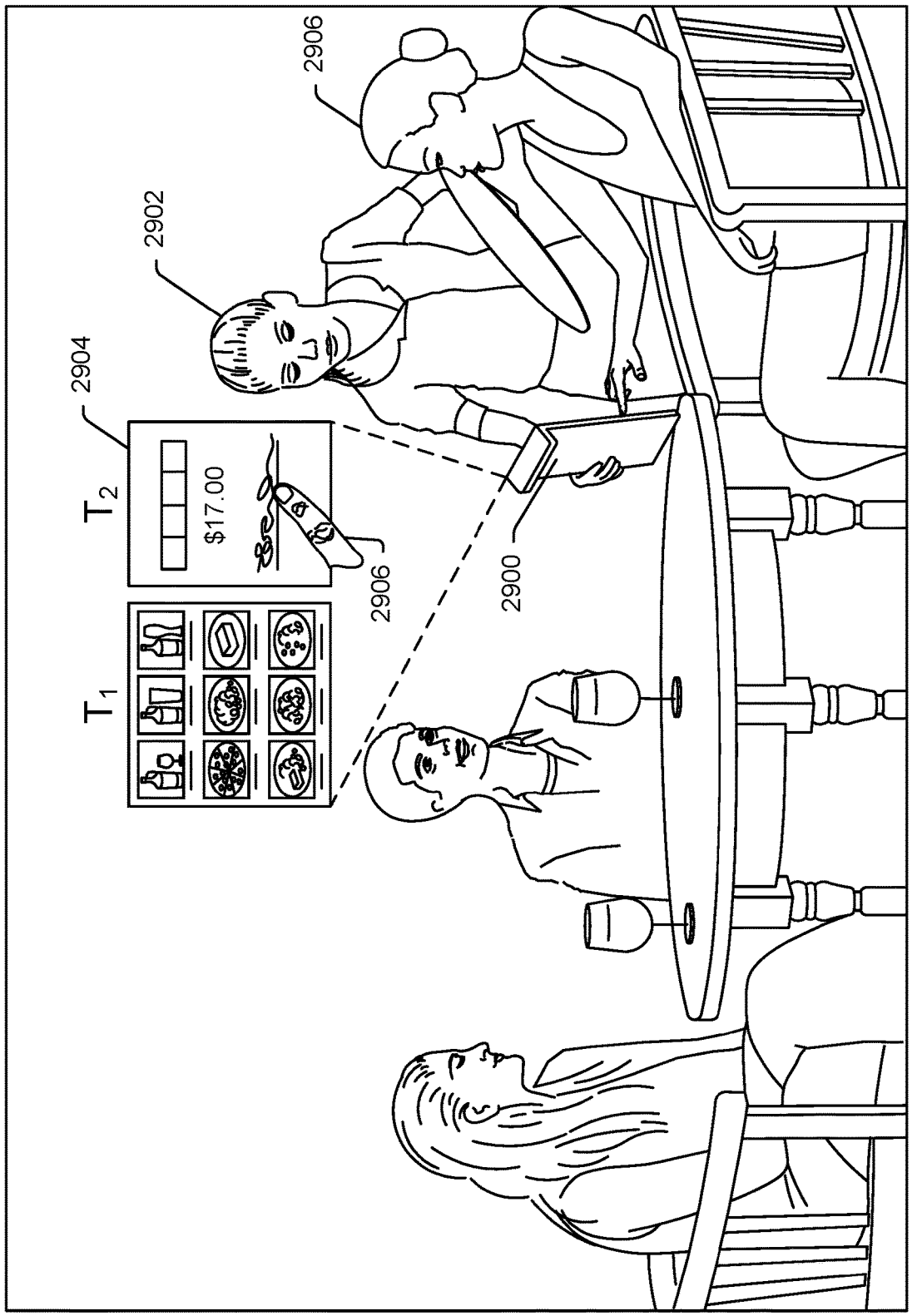
FIG. 29 illustrates yet another example environment where a customer-facing device of a multi-device POS system is executing merchant functionality and customer functionality as described herein.

FIG. 29 illustrates yet another example environment where a customer-facing device 2900 of a multi-device POS system can execute merchant functionality and customer functionality as described herein. Omitted from FIG. 29, but similar to FIG. 28, a first employee (or other agent) of a merchant can interact with a merchant-facing device, which can correspond to the merchant-facing device 102A described above with reference to FIG. 1. The merchant-facing device can be coupled to at least one customer-facing device 2900, which can correspond to the customer-facing device 104A described above with reference to FIG. 1. A second employee (or other agent) 2902 of the merchant is shown interacting with the customer-facing device 2900.

In some examples, the customer-facing device 2900 can transition between providing merchant functionality on providing customer functionality. For instance, as illustrated in FIG. 29, after a ticket has been built via selection from the inventory of the merchant (as described above with reference to FIG. 28) at a first time ($T_1$), the customer-facing device 2900 can transition to executing a payment flow functionality on facilitate settlement of a transaction associated with the ticket, as illustrated by UI 2904, at a second time ($T_2$). Such functionality is typically associated with customer functionality performed by a customer application. As illustrated, a customer 2906 is interacting with the UI 2904 to authorize a transaction.

As illustrated in FIGS. 28 and 29, the customer-facing device 2800 and/or 2900 can toggle between merchant functionality and customer functionality. In some examples, the customer-facing device 2800 and/or 2900 can perform merchant functionality via an executable instance of a merchant application associated with the customer-facing device 2800 and/or 2900. In other examples, the customer-facing device 2800 and/or 2900 can perform merchant functionality via a view of a MVC framework associated with a merchant-facing device, such as merchant device 2804, and the customer-facing device 2800. Additional details associated with both examples are provided below.

As described above, enabling the customer-facing device 2800 and/or 2900 to perform merchant functionality (in addition to customer functionality) improves customer experience and/or security by minimizing the time where a payment instrument is out of sight of a customer, such as customer 2808 and/or customer 2906. That is, by enabling the customer-facing device to execute functionality different than what a typical customer-facing device would execute, transactions can be processed with more transparency, and thus security. Furthermore, the ability to present a duplicate UI of the UI 2812 via the UI 2810, as described above with reference to FIG. 28, allows for improvements with respect to employee oversight, training, consistency of customer experiences, etc.

Figure 30:
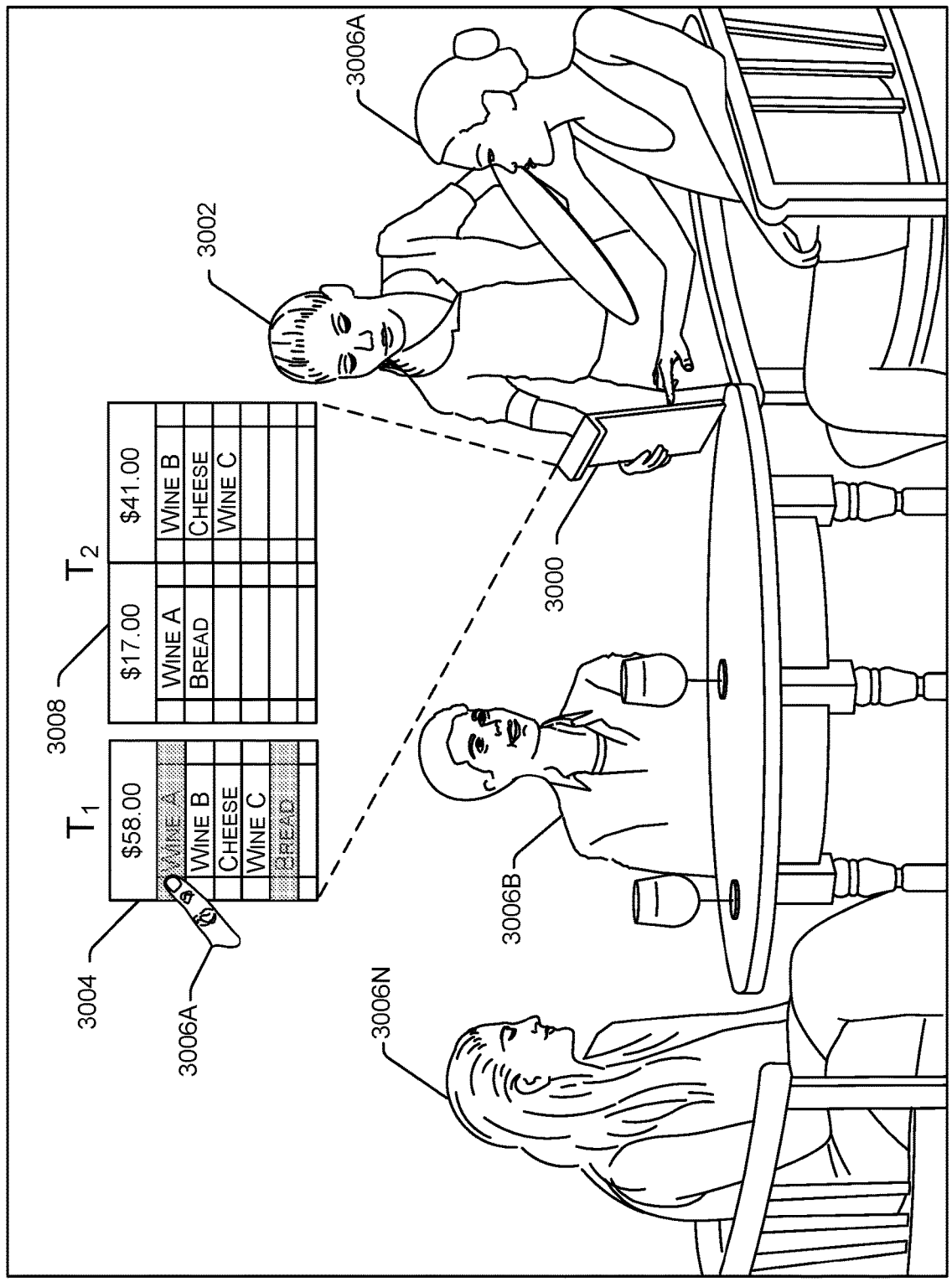
FIG. 30 illustrates another example environment where a customer-facing device of a multi-device POS system is executing merchant functionality and customer functionality as described herein.

FIG. 30 illustrates another example environment where a customer-facing device 3000 of a multi-device POS system can execute merchant functionality and customer functionality as described herein. Omitted from FIG. 30, but similar to FIG. 28, a first employee (or other agent) of a merchant can interact with a merchant-facing device, which can correspond to the merchant-facing device 102A described above with reference to FIG. 1. The merchant-facing device can be coupled to at least one customer-facing device 3000, which can correspond to the customer-facing device 104A described above with reference to FIG. 1. A second employee (or other agent) 3002 of the merchant is shown interacting with the customer-facing device 3000.

As described above, in at least one example, at a first time ($T_1$) the customer-facing device 3000 can present a UI 3004, which can be a graphical representation of one or more items that a group of customers 3006A-N desires to purchase from the merchant (e.g., a graphical representation of a ticket). Such a functionality is typically associated with a customer application executable by the customer-facing device 3000 (e.g., viewing item(s) associated with a ticket). In at least one example, a first customer 3006A can interact with the UI 3004 to identify one or more items that she desires to purchase. That is, the first customer 3006A can indicate which item(s) she desires to split from the ticket associated with the group. As a non-limiting example, the first customer 3006A can select "wine A" and "bread" as the items she desires to purchase.

Responsive to receiving such an input, the customer-facing device 3000 can generate a second ticket (e.g., a second data structure) associated with the items that the first customer 3006A desires to purchase, as shown at the second time ($T_2$). The items that the first customer 3006A does not desire to purchase can remain on the original ticket. That is, as shown in FIG. 30, a first ticket (and thus first data structure) can be associated with the first customer 3006A and a second ticket (and thus second data structure) can be associated with the other customers 3006B and 3006N in the group. The customers 3006A-3006N can pass the customer-facing device 3000 around the table (or the employee 3002 can move around the table with the customer-facing device 3000) and each customer 3006A, 3006B, and 3006N can identify the items that they desire to split from the second ticket. In at least one example, a UI 3008 that illustrates one or more split tickets (e.g., the first ticket and the second ticket) can be presented via the customer-facing device 3000. Such split-ticket functionality is typically performed by a merchant application.

As illustrated in FIG. 30, the customer-facing device 3000 can toggle between merchant functionality and customer functionality. In some examples, the customer-facing device 3000 can perform merchant functionality via an executable instance of a merchant application associated with the customer-facing device 3000. In other examples, the customer-facing device 3000 can perform merchant functionality via a view of a MVC framework associated with a merchant-facing device (not pictured in FIG. 30) and the customer-facing device 3000. Additional details associated with both examples are provided below.

Figure 31:
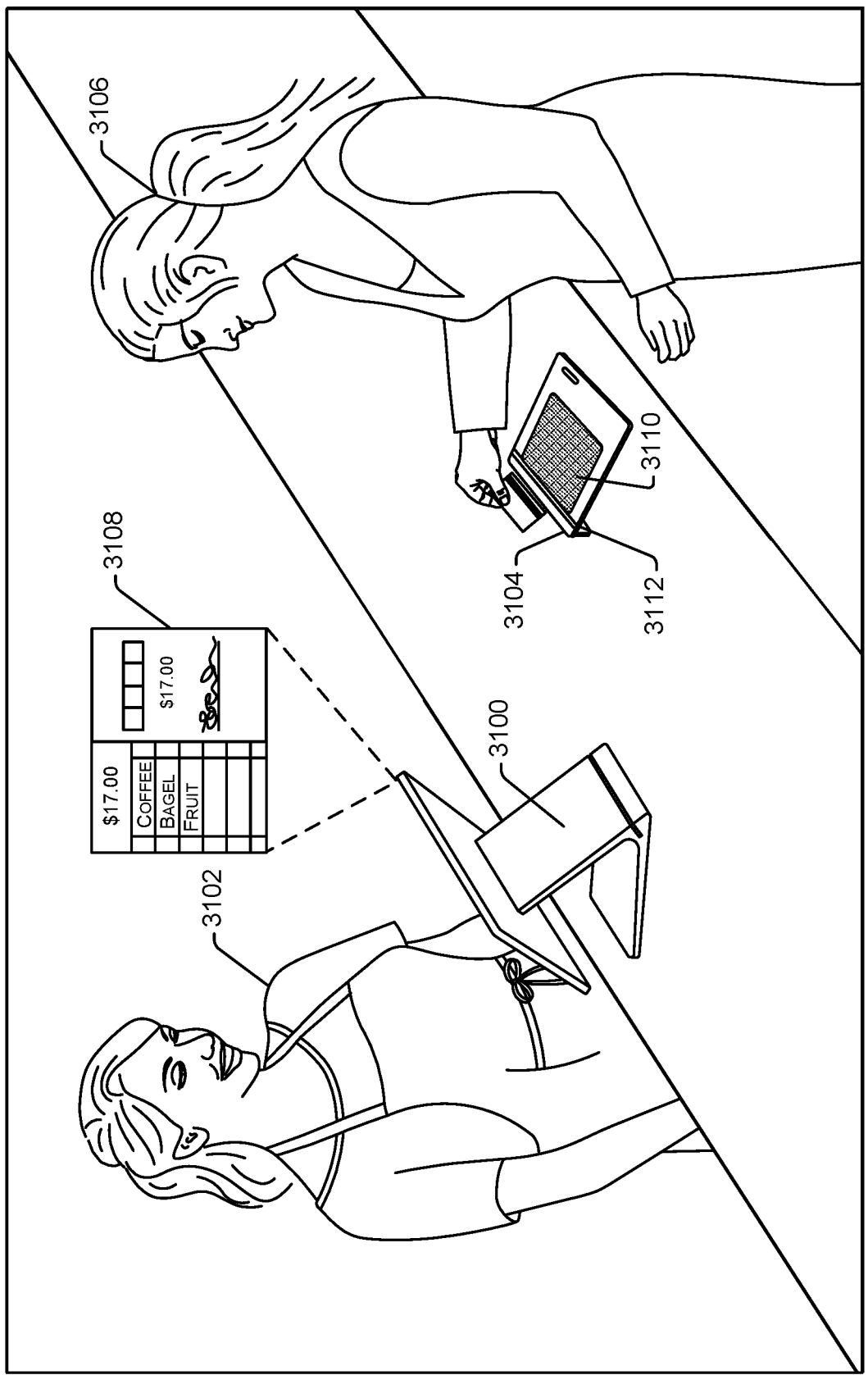
FIG. 31 illustrates an example environment where a merchant-facing device of a multi-device POS system is executing merchant functionality and customer functionality as described herein.

FIG. 31 illustrates an example environment where a merchant-facing device 3100 of a multi-device POS system can execute merchant functionality and customer functionality as described herein. As illustrated, a merchant (or an agent working on behalf of the merchant) 3102 can interact with a merchant-facing device 3100, which can correspond to the merchant-facing device 102A described above with reference to FIG. 1. The merchant-facing device 3100 can be coupled to at least one customer-facing device 3102, which can correspond to the customer-facing device 104A described above with reference to FIG. 1. A customer 3106 is shown interacting with the customer-facing device 3104.

In at least one example, the merchant-facing device 3100 can present a UI 3108, which can be a graphical representation of one or more items the customer 3106 desires to purchase from the merchant 3102 (e.g., a graphical representation of a ticket). Such a functionality is typically associated with a customer application executable by the customer-facing device 3104 (e.g., viewing item(s) associated with a ticket). Additionally, in at least one example, the merchant-facing device 3100 can present, via the UI 3108, a graphical representation of a step in a payment flow for settling a transaction associated with the ticket. This functionality, too, is typically associated with a customer application executable by the customer-facing device 3104 (e.g., processing a payment flow to settle a transaction). However, in some examples, the merchant-facing device 3100 can toggle between merchant functionality and customer functionality. In some examples, the merchant-facing device 3100 can perform customer functionality via an executable instance of a customer application associated with the merchant-facing device 3100. In other examples, the merchant-facing device 3100 can perform customer functionality via a view of a MVC framework associated with a merchant-facing device 3100 and the customer-facing device 3104. Additional details associated with both examples are provided below.

In some examples, the merchant-facing device 3100 can perform such functionality based at least in part on receiving an indication that a display 3010 associated with the customer-facing device 3104 is disabled. The display 3010 can be disabled, for example, due to a software and/or hardware malfunction. For instance, the display 310 can be disabled due to an incompatible driver and/or unreadable signal. Additionally or alternatively, the display 310 can be disabled due to physical damage. In some examples, the display 3104 can be disabled due to the customer-facing device 3104 entering a low power mode and turning off the display 3104 to save power (e.g., extend battery life, etc.). Or, the display 3104 can be disabled due to the merchant explicitly turning off the display 3104 (adjusting the settings associated with the display). In such an example, a reader device associated with the customer-facing device 3104 can still be operational for reading payment data from payment instrument(s). That is, in such an example, the customer-facing device 3104 can be used to obtain payment data, but other customer functionalities can be executed by the merchant-facing device 3100.

FIGS. 27-31 are merely illustrative examples of multi-functionality devices as described herein. Of course, additional or alternative examples are considered to be within the scope of this disclosure.

Figure 32:
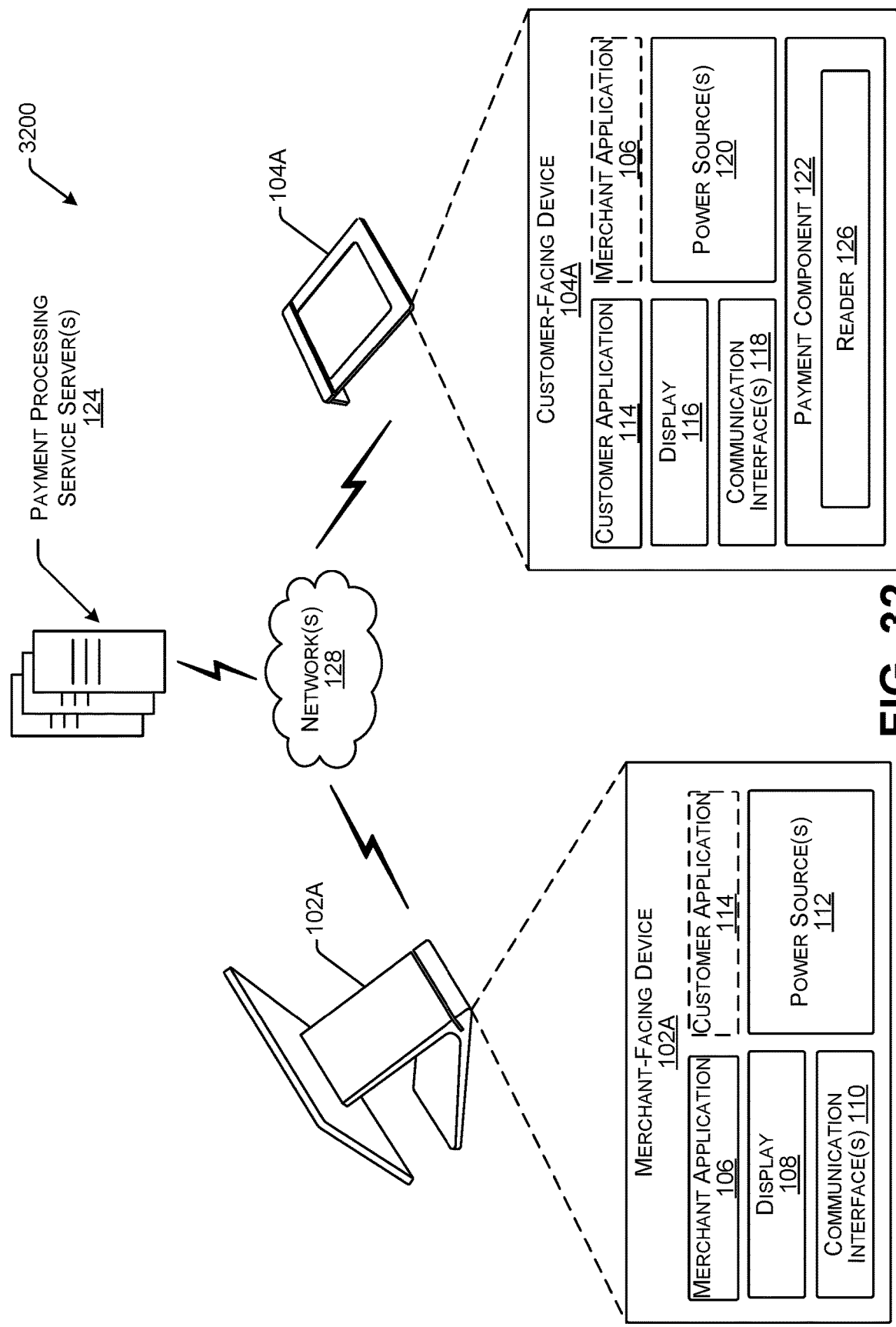
FIG. 32 illustrates an example environment where a customer-facing device of a multi-device POS system and/or a merchant-facing device of a multi-device POS system can execute merchant functionality and customer functionality based on applications executable by the respective devices as described herein.
Figure 33:
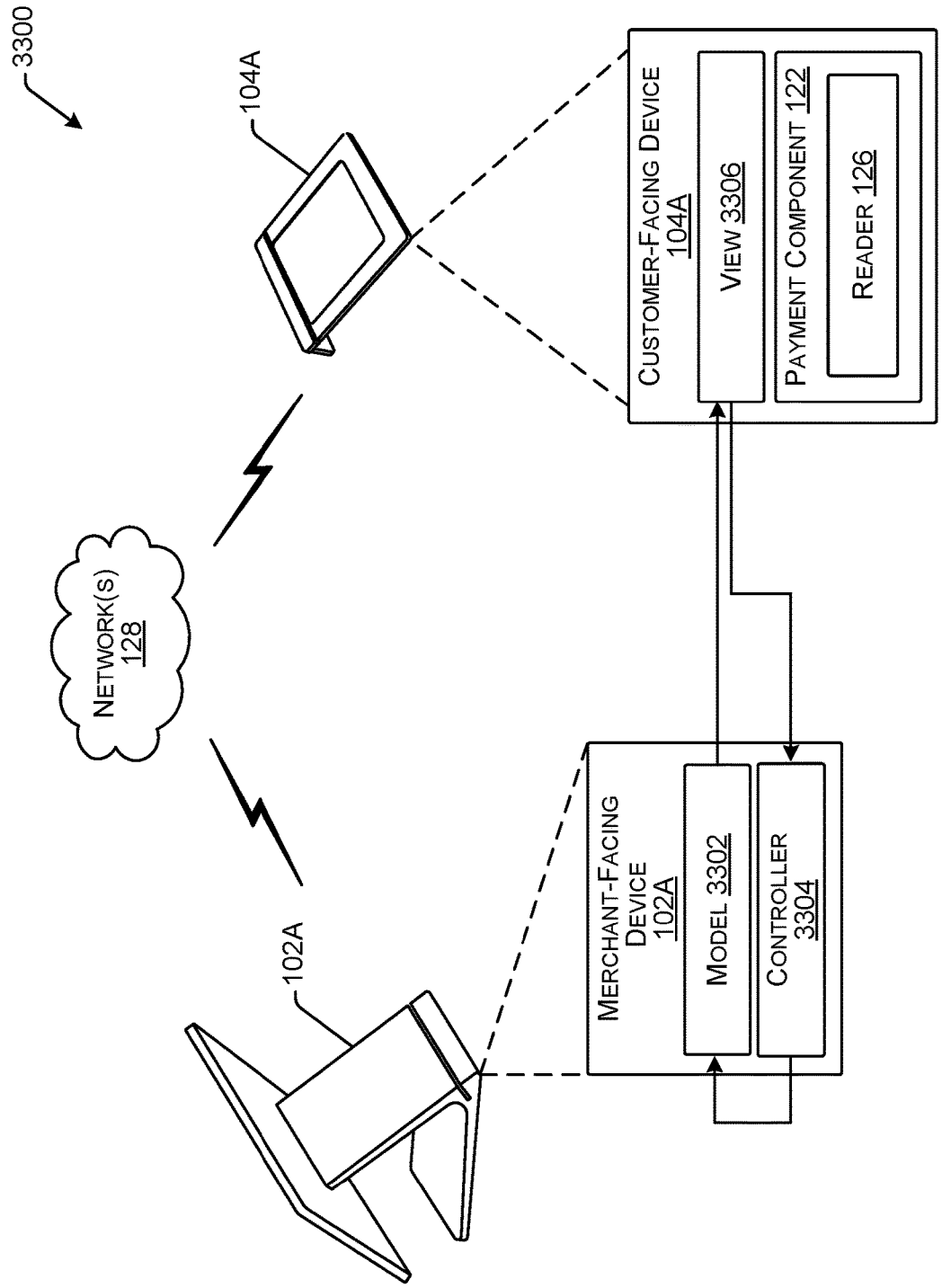
FIG. 33 illustrates an example environment where a customer-facing device of a multi-device POS system can execute merchant functionality (in addition to or as an alternate to customer functionality) based on a model-view-controller (MVC) framework as described herein.
Figure 34:
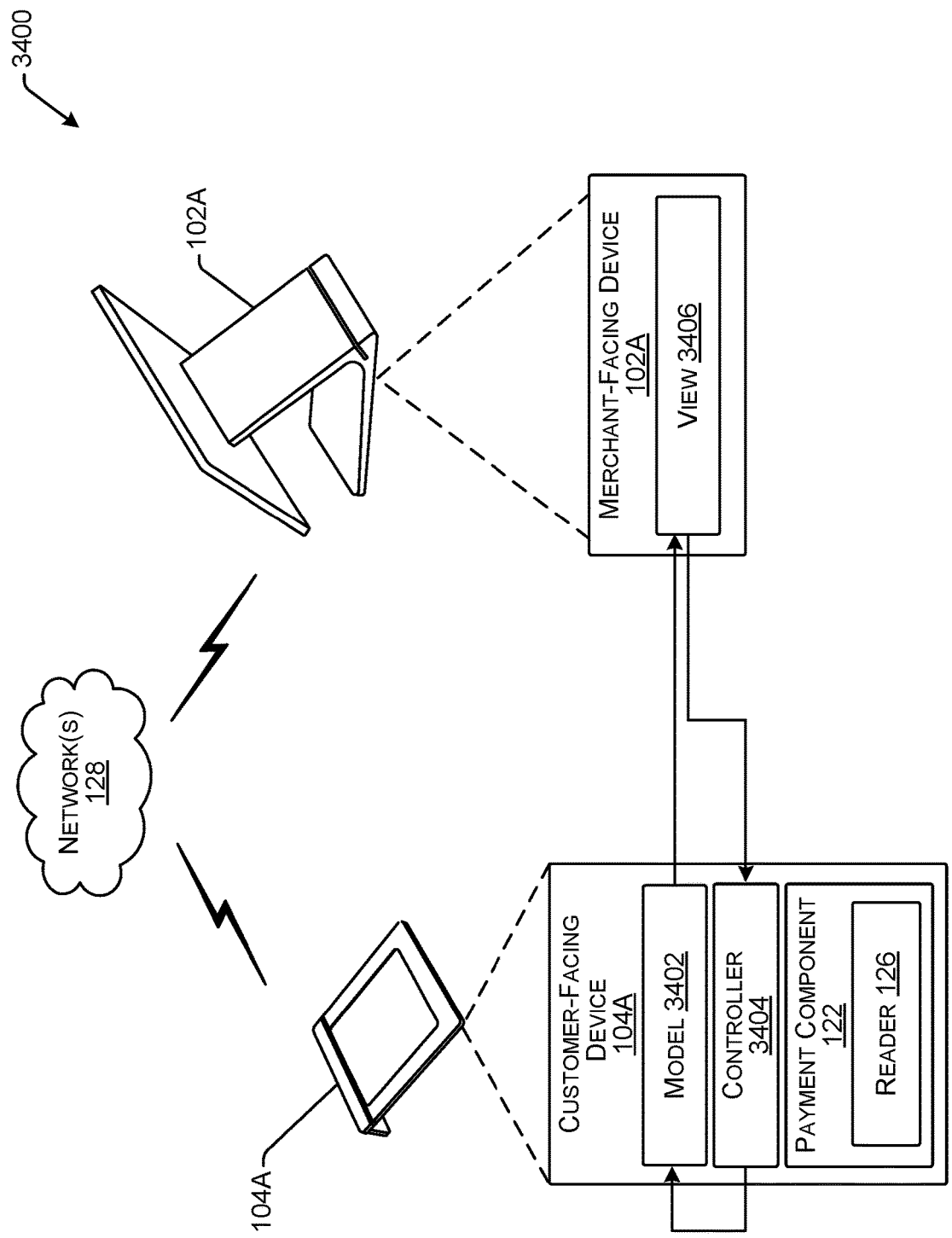
FIG. 34 illustrates an example environment where a merchant-facing device of a multi-device POS system can execute customer functionality (in addition to or as an alternate to merchant functionality) based on a MVC framework as described herein.

FIGS. 32-34 provide additional details associated with enabling multiple functionalities on a merchant-facing device and/or a customer-facing device associated with the multi-device POS system as described herein.

FIG. 32 illustrates an example environment 3200 where a customer-facing device of a multi-device POS system and/or a merchant-facing device of a multi-device POS system can execute merchant functionality and customer functionality based on applications executable by the respective devices as described herein. FIG. 32 is illustrated with devices previously described above with reference to FIG. 1. For instance, FIG. 32 includes the merchant-facing device 102A, which is coupled to at least one customer-facing device 104A. The merchant-facing device 102A and/or the customer-facing device 104A can communicate with the payment processing service server(s) 124 via the network(s) 128. However, unlike the devices described above with reference to FIG. 1, in FIG. 32, the merchant-facing device 102A includes an instance of the customer application 114 and the customer-facing device 104A includes an instance of the merchant application 106.

As described above, in some examples, the merchant-facing device 102A can perform customer functionalities in addition to merchant functionalities. In at least one example, the merchant-facing device 102A can perform such customer functionalities via an instance of the customer application 114 that is executable on the merchant-facing device 102A, as illustrated in FIG. 32. In some examples, the customer application 114 can be temporarily provisioned to the merchant-facing device 102A as described above. In other examples, the customer application 114 can be installed on the merchant-facing device 102A and can be activated for performing customer functionalities. In at least one example, the customer application 114 can be temporarily provisioned and/or activated in association with a customer state. That is, responsive to determining that the merchant-facing device 102A transitions out of a merchant state, the customer application 114 can be temporarily provisioned and/or activated in association with a transition to a customer state. In at least one example, as provided above, the merchant-facing device 102A can toggle between the merchant functionality and customer functionality. In such examples, the merchant-facing device 102A can run the merchant application 106 for performing the merchant functionality and the customer application 114 for performing the customer functionality, and the merchant-facing device 102A can toggle between the two, often seamlessly without the operator noticing a transition between the two applications.

Similarly, the customer-facing device 104A can perform merchant functionalities in addition to customer functionalities. In at least one example, the customer-facing device 104A can perform such functionality via an instance of the merchant application 106 that is executable on the customer-facing device 104A, as illustrated in FIG. 32. In some examples, the merchant application 106 can be temporarily provisioned to the customer-facing device 104A as described above. In other examples, the merchant application 106 can be installed on the customer-facing device 104A and can be activated for performing merchant functionalities. In at least one example, the merchant application 106 can be temporarily provisioned and/or activated in association with a merchant state. That is, responsive to determining that the customer-facing device 104A transitions out of a customer state, the merchant application 106 can be temporarily provisioned and/or activated in association with a transition to a merchant state. In at least one example, as provided above, the customer-facing device 104A can toggle between the customer functionality and merchant functionality. In such examples, the customer-facing device 104A can run the merchant application 106 for performing the merchant functionality and the customer application 114 for performing the customer functionality, and the customer-facing device 104A can toggle between the two, often seamlessly without the operator noticing a transition between the two applications.

It should be noted that while the merchant application 106 and the customer application 114 are both shown in FIG. 32, in some examples, a single application that is capable of performing both customer functionalities and merchant functionalities can be stored on the merchant-facing device 102A and/or the customer-facing device 104A to configure the respective device(s) to execute the various functionalities described herein.

In some examples, the merchant-facing device 102A and/or the customer-facing device 104A may not have connectivity to the payment processing service server(s) 124. In such examples, the merchant-facing device 102A and the customer-facing device 104A can communicate with each other via short-range networks (e.g., BLUETOOTH®, BLE, NFC, Wi-Fi, etc.). In an example where the merchant-facing device 102A has connectivity to the payment processing service server(s) 124, but the customer-facing device 104A does not, the customer-facing device 104A can communicate with the merchant-facing device 102A via short-range networks (e.g., BLUETOOTH®, BLE, NFC, Wi-Fi, etc.), and the merchant-facing device 102A can communicate with the payment processing service server(s) 124. That is, in such examples, the customer-facing device 104A can communicate with the payment processing service server(s) 124 indirectly.

FIG. 33 illustrates an example environment 3300 where a customer-facing device of a multi-device POS system can execute merchant functionality (in addition to or as an alternate to customer functionality) based on a MVC framework as described herein. FIG. 33 is illustrated with devices previously described above with reference to FIG. 1. For instance, FIG. 33 includes the merchant-facing device 102A, which is coupled to at least one customer-facing device 104A. The merchant-facing device 102A and/or the customer-facing device 104A can communicate with the payment processing service server(s) 124 via the network(s) 128. In FIG. 33, various components are omitted from the merchant-facing device 102A and the customer-facing device 104A for ease of understanding. However, the merchant-facing device 102A and the customer-facing device 104A can include any or all of the components described above with reference to FIG. 1.

As described above, the customer-facing device 104A can perform merchant functionalities in addition to customer functionalities. In at least one example, the customer-facing device 104A can perform such functionality via an MVC framework, as illustrated in FIG. 33. Traditionally, MVC is an architectural pattern that can be used for developing user interfaces that divides an application into three interconnected components: a model component, a view component, and a controller component. The three components separate internal representations of information from the ways information is presented to and accepted from a user of a device.

In at least one example, the model component is the central component of the framework. The model component can express the behavior of an application, such as the merchant application 106, independent of the user interface. The model component can directly manage data, logic, and/or rules associated with the merchant application 106. The view component can output representations of information, such as a via a GUI. The controller component can be configured to accept input and convert the input into commands for the model component and/or the view component.

As illustrated in FIG. 33, in at least one example, the merchant-facing device 102A can be associated with the model component 3302 and the controller component 3304. The customer-facing device 104A can be associated with the view component 3306. In such an example, the model component 3302 can express the merchant application 106, independent of the user interface. The model component 3302 can directly manage data, logic, and/or rules associated with the merchant application 106. In at least one example, the model component 3302 can send an instruction to the view component 3306. The instruction can be associated with a merchant functionality (e.g., adding item(s) to a ticket, editing item(s) associated with a ticket, etc.). The view component 3306 can output a representation of information, such as via a GUI, to facilitate the merchant functionality. In at least one example, a customer can interact with the GUI and the view component 3306 can provide an indication of the input back to the controller component 3304. The controller component 3304 can be configured to accept input and convert the input into commands for the model component 3302 and/or the view component 3306. Then, the view component 3306 on the customer-facing device 104A awaits further instruction from the model component 3302 on the merchant-facing device 102A.

FIG. 34 illustrates an example environment 3400 where a merchant-facing device of a multi-device POS system can execute customer functionality (in addition to or as an alternate to merchant functionality) based on a MVC framework as described herein. FIG. 34 is illustrated with devices previously described above with reference to FIG. 1. For instance, FIG. 34 includes the merchant-facing device 102A, which is coupled to at least one customer-facing device 104A. The merchant-facing device 102A and/or the customer-facing device 104A can communicate with the payment processing service server(s) 124 via the network(s) 128. In FIG. 34, various components are omitted from the merchant-facing device 102A and the customer-facing device 104A for ease of understanding. However, the merchant-facing device 102A and the customer-facing device 104A can include any or all of the components described above with reference to FIG. 1.

As described above, in some examples, the merchant-facing device 102A can perform customer functionalities in addition to merchant functionalities. In at least one example, the merchant-facing device 102A can perform such functionality via an MVC framework, as illustrated in FIG. 34. As described above, MVC is an architectural pattern that can be used for developing user interfaces that divides an application into three interconnected components: a model component, a view component, and a controller component. The three components separate internal representations of information from the ways information is presented to and accepted from a user of a device.

As illustrated in FIG. 34, in at least one example, the customer-facing device 104A can be associated with the model component 3402 and the controller component 3404. The merchant-facing device 102A can be associated with the view component 3406. In such an example, the model component 3402 can express the customer application 114, independent of the user interface. The model component 3402 can directly manage data, logic, and/or rules associated with the customer application 114. In at least one example, the model component 3402 can send an instruction to the view component 3406. The instruction can be associated with a customer functionality (e.g., viewing item(s) associated with a ticket, executing step(s) of a payment flow, etc.). The view component 3406 can output a representation of information, such as a GUI, to facilitate the customer functionality. In at least one example, a customer can interact with the GUI and the view component 3406 can provide an indication of the input back to the controller component 3404. The controller component 3404 can be configured to accept input and convert the input into commands for the model component 3402 and/or the view component 3406. Then, the view component 3406 on the merchant-facing device 102A awaits further instruction from the model component 3402 on the customer-facing device 104A.

Figure 35:
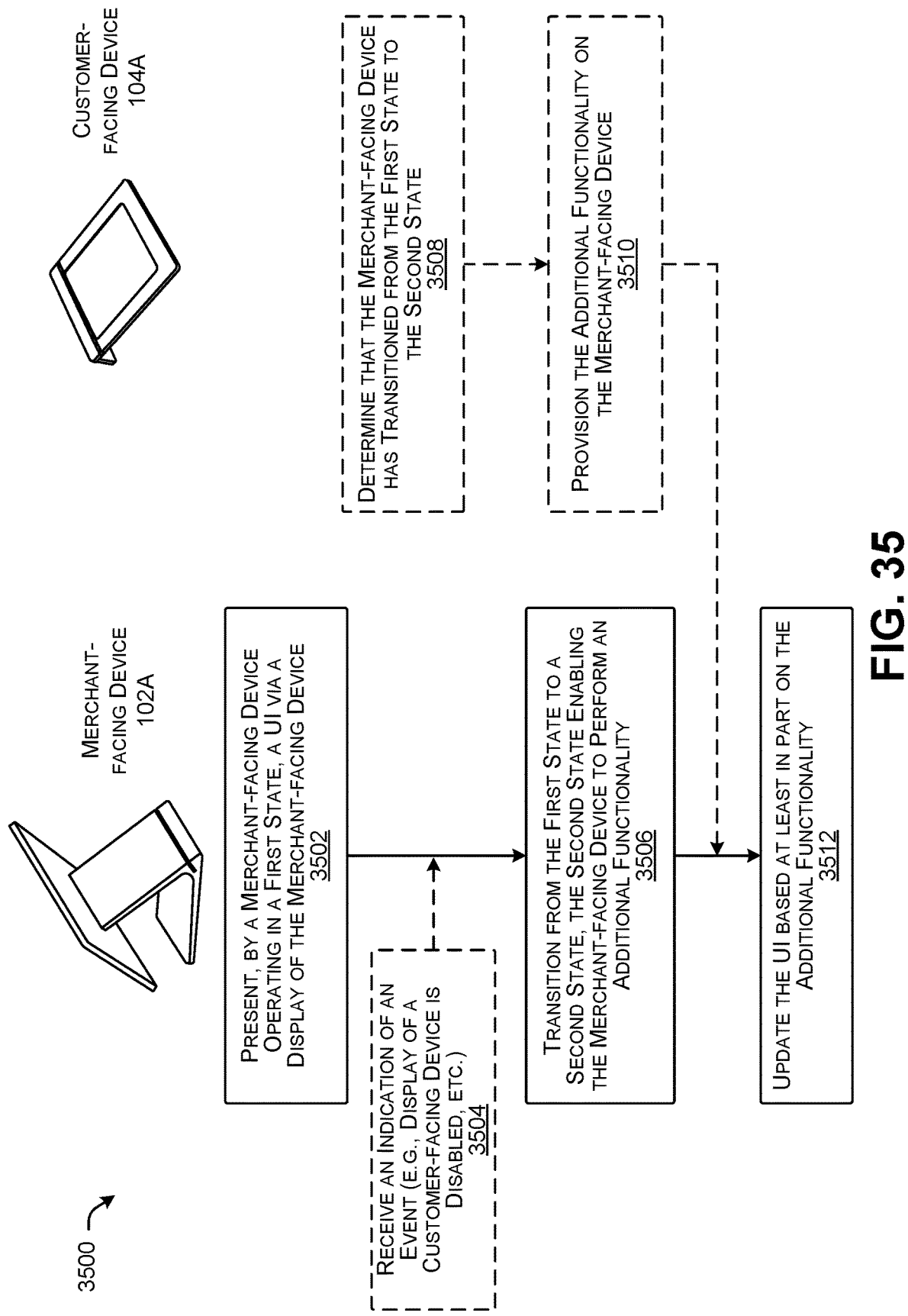
FIG. 35 illustrates an example process for enabling a merchant-facing device of a multi-device POS system to perform merchant functionality and customer functionality as described herein.
Figure 36:
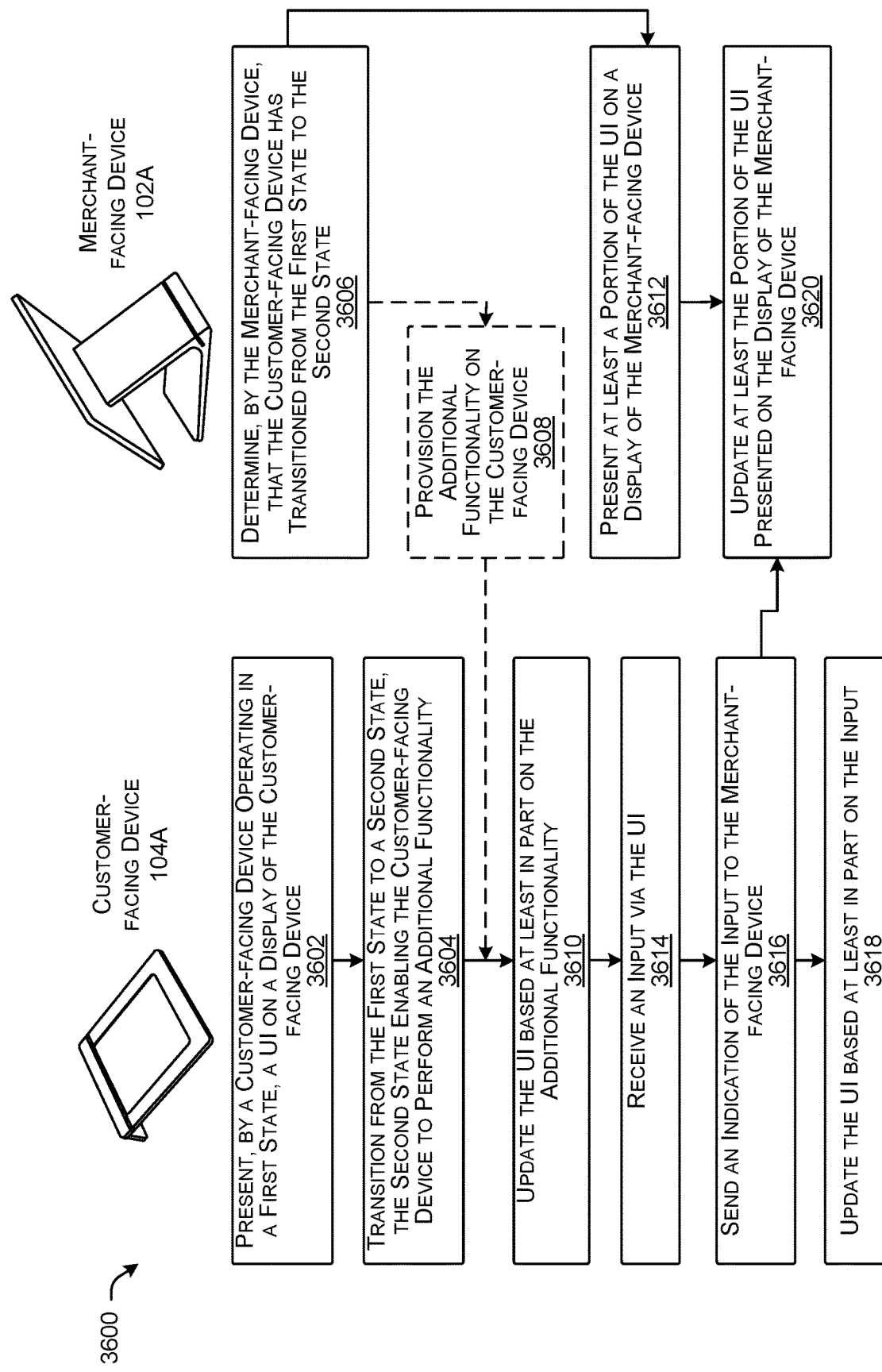
FIG. 36 illustrates an example process for enabling a customer-facing device of a multi-device POS system to perform merchant functionality and customer functionality as described herein.
Figure 37:
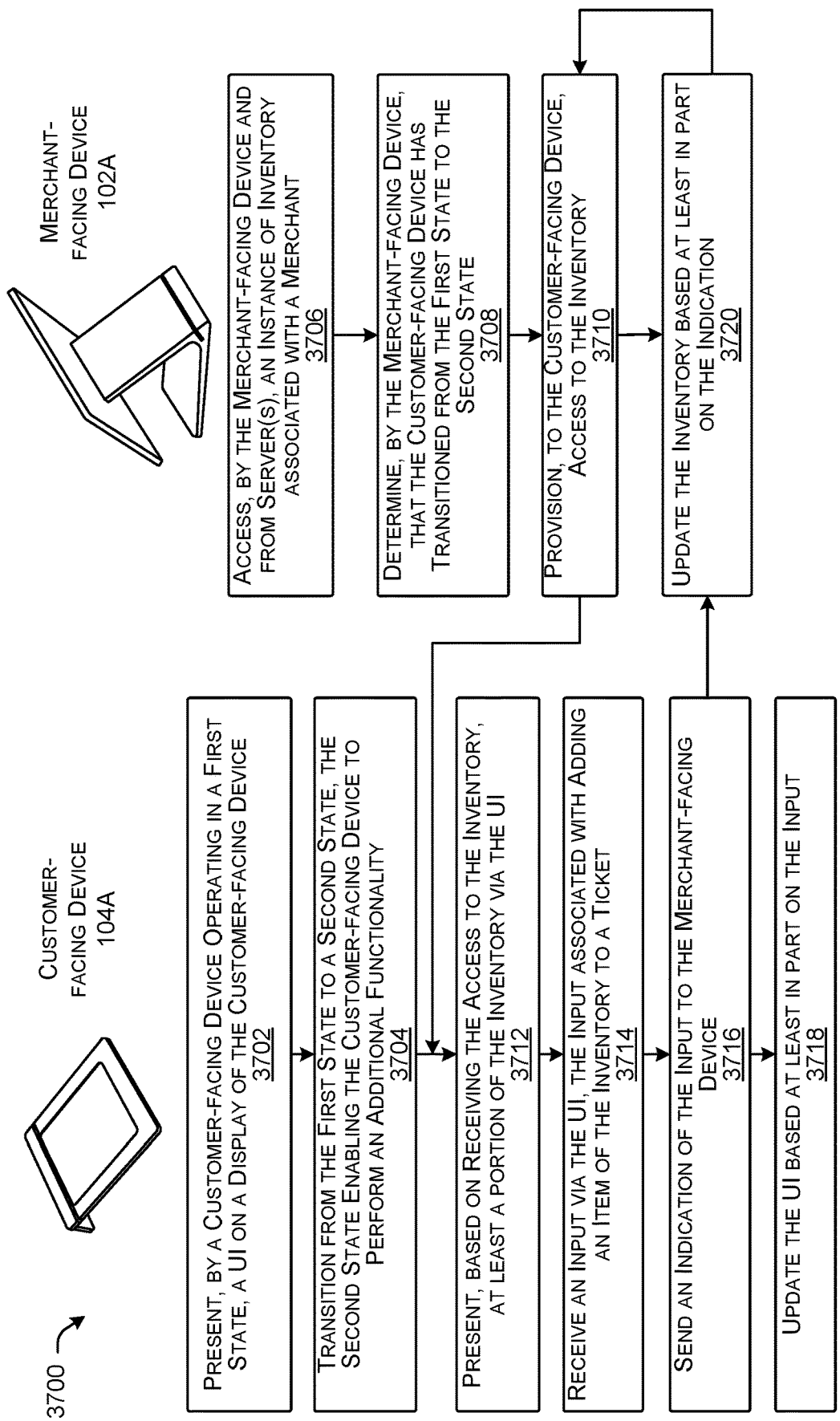
FIG. 37 illustrates an example process for managing inventory when a customer-facing device of a multi-device POS system is performing merchant functionality that affects inventory as described herein.

FIGS. 35-37 illustrate various processes associated with enabling multi-functionality devices as described herein. FIGS. 35-37 are illustrated in the environment 100 described above, but are not limited to implementation in such an environment. Operations performed by a first merchant-facing device 102A are illustrated under the first merchant-facing device 102A and operations performed by a customer-facing device 104A coupled to the first merchant-facing device 102A are illustrated under the customer-facing device 104A.

FIG. 35 illustrates an example process 3500 for enabling a merchant-facing device of a multi-device POS system to perform merchant functionality and customer functionality as described herein.

Block 3502 illustrates presenting, by a merchant-facing device operating in a first state, a UI on a display 108 of the merchant-facing device. As described above, in at least one example, a merchant application 106 executable by the merchant-facing device 102A can generate instructions for presenting, on a display 108 of the merchant-facing device 102A, a UI that enables a merchant (or individual working on behalf of the merchant) to perform one or more merchant functionalities.

Block 3504 illustrates receiving an indication of an event. In some examples, the merchant application 106 can receive an indication of an event, such as a disablement of a display 116 associated with a customer-facing device 104A that is coupled to the merchant-facing device 102A. That is, in some examples, responsive to a display 116 of a customer-facing device 104A becoming disabled, the customer-facing device 104A can send an indication to the merchant-facing device 102A indicating such.

Block 3506 illustrates transitioning from the first state to a second state, the second state enabling the merchant-facing device to perform an additional functionality. In at least one example, the merchant-facing device 102A can transition from a first state—a merchant state—whereby the merchant-facing device 102A is performing merchant functionalities to a second state—a customer state—whereby the merchant-facing device 102A can perform customer functionalities. In some examples, the merchant-facing device 102A can transition from the first state to the second state based at least in part on receiving the indication of the event. In additional or alternative examples, the merchant-facing device 102A can transition from the first state to the second state based at least in part on receiving an input requesting to transition from the first state to the second state. In other examples, the merchant-facing device 102A can transition from the first state to the second state based at least in part on detecting a change in a position of the merchant-facing device 102A and/or a portion of the merchant-facing device 102A (e.g., the display 106). For instance, in at least one example, the merchant-facing device 102A can utilize sensor data to determine that an orientation of the merchant-facing device 102A and/or a portion of the merchant-facing device 102A (e.g., the display 106) has changed (e.g., from facing an employee of a merchant to facing a customer), and the merchant-facing device 102A can transition from the first state to the second state based at least in part on detecting the change in orientation of the merchant-facing device 102A.

As described above, in some examples, the merchant-facing device 102A can perform customer functionality via an executable instance of the customer application 114 associated with the merchant-facing device 102A. As described above, in some examples, the customer application 114 can be temporarily provisioned to the merchant-facing device 102A. In other examples, the customer application 114 can be installed on the merchant-facing device 102A and can be activated for performing customer functionalities. In at least one example, the customer application 114 can be temporarily provisioned and/or activated in association with a customer state. That is, responsive to determining that the merchant-facing device 102A transitions out of the first state (e.g., the merchant state), the customer application 114 can be temporarily provisioned and/or activated in association with a transition to the second state (e.g., the customer state). In at least one example, as provided above, the merchant-facing device 102A can toggle between the merchant functionality and customer functionality. In such examples, the merchant-facing device 102A can run the merchant application 106 for performing the merchant functionality and the customer application 114 for performing the customer functionality, and the merchant-facing device 102A can toggle between the two, often seamlessly without the operator noticing a transition between the two applications.

In other examples, the merchant-facing device 102A can perform customer functionality via a view of a MVC framework associated with a merchant-facing device 102A and the customer-facing device 104A, as described above with reference to FIG. 34. In such examples, the customer-facing device 104A can determine that the merchant-facing device 102A has transitioned the first state to the second state as illustrated in block 3508, and can provision the additional functionality on the merchant-facing device 102A, as illustrated in block 3510.

In such an example, and as described above with reference to FIG. 34, the customer-facing device 104A can be associated with the model component 3402 and the controller component 3404. The merchant-facing device 102A can be associated with the view component 3406. In such an example, the model component 3402 can express the customer application 114, independent of the user interface. The model component 3402 can directly manage data, logic, and/or rules associated with the customer application 114. In at least one example, the model component 3402 can send an instruction to the view component 3406. The instruction can be associated with a customer functionality (e.g., viewing item(s) associated with a ticket, executing step(s) of a payment flow, etc.). The view component 3406 can output a representation of information, such as a GUI, to facilitate the customer functionality. In at least one example, a customer can interact with the GUI and the view component 3406 can provide an indication of the input back to the controller component 3404. The controller component 3404 can be configured to accept input and convert the input into commands for the model component 3402 and/or the view component 3406. Then, the view component 3406 on the merchant-facing device 102A awaits further instruction from the model component 3402 on the customer-facing device 104A.

Block 3512 illustrates updating the UI based at least in part on the additional functionality. In at least one example, based at least in part on the second state enabling the merchant-facing device 102A to perform an additional functionality, the merchant-facing device 102A can update the UI based at least in part on the additional functionality. In some examples, an instance of the customer application 114 can generate instructions for updating the UI. In other examples, a view component 3406 associated with the merchant-facing device 102A can receive instructions from a model component 3402 associated with the customer-facing device 104A for updating the UI.

FIG. 36 illustrates an example process 3600 for enabling a customer-facing device of a multi-device POS system to perform merchant functionality and customer functionality as described herein.

Block 3602 illustrates presenting, by a customer-facing device operating in a first state, a UI on a display 116 of the customer-facing device. As described above, in at least one example, a customer application 114 executable by the customer-facing device 104A can generate instructions for presenting, on a display 116 of the customer-facing device 104A, a UI that enables a customer to interact with the customer-facing device 104A to perform one or more customer functionalities.

Block 3604 illustrates transitioning from the first state to a second state, the second state enabling the customer-facing device to perform an additional functionality. In at least one example, the customer-facing device 104A can transition from a first state—a customer state—whereby the customer-facing device 104A is performing customer functionalities to a second state—a merchant state—whereby the customer-facing device 104A can perform merchant functionalities. In some examples, the customer-facing device 104A can transition from the first state to the second state based at least in part on receiving an input requesting to transition from the first state to the second state. In other examples, the customer-facing device 104A can transition from the first state to the second state based at least in part on detecting a change in a position of the customer-facing device 104A and/or a portion of the customer-facing device 104A. For instance, in at least one example, the customer-facing device 104A can utilize sensor data to determine that an orientation of the customer-facing device 104A and/or a portion of the customer-facing device 104A has changed (e.g., from facing an employee of a merchant to facing a customer), and the customer-facing device 104A can transition from the first state to the second state based at least in part on detecting the change in orientation of the customer-facing device 104A.

As described above, in some examples, the customer-facing device 104A can perform merchant functionality via an executable instance of the merchant application 106 associated with the customer-facing device 104A. In some examples, the merchant application 106 can be temporarily provisioned to the customer-facing device 104A as described above. In other examples, the merchant application 106 can be installed on the customer-facing device 104A and can be activated for performing merchant functionalities. In at least one example, the merchant application 106 can be temporarily provisioned and/or activated in association with a merchant state. That is, responsive to determining that the customer-facing device 104A transitions out of the first state (e.g., the customer state), the merchant application 106 can be temporarily provisioned and/or activated in association with a transition to the second state (e.g., the merchant state). In at least one example, as provided above, the customer-facing device 104A can toggle between the customer functionality and merchant functionality. In such examples, the customer-facing device 104A can run the merchant application 106 for performing the merchant functionality and the customer application 114 for performing the customer functionality, and the customer-facing device 104A can toggle between the two, often seamlessly without the operator noticing a transition between the two applications.

In other examples, the customer-facing device 104A can perform merchant functionality via a view of a MVC framework associated with a merchant-facing device 102A and the customer-facing device 104A, as described above with reference to FIG. 33. In such examples, the merchant-facing device 102A can determine that the customer-facing device 104A has transitioned the first state to the second state as illustrated in block 3606, and can provision the additional functionality on the customer-facing device 104A, as illustrated in block 3608.

In such examples, and as described above with reference to FIG. 33, the merchant-facing device 102A can be associated with the model component 3302 and the controller component 3304. The customer-facing device 104A can be associated with the view component 3306. In such an example, the model component 3302 can express the merchant application 106, independent of the user interface. The model component 3302 can directly manage data, logic, and/or rules associated with the merchant application 106. In at least one example, the model component 3302 can send an instruction to the view component 3306. The instruction can be associated with a merchant functionality (e.g., adding item(s) to a ticket, editing item(s) associated with a ticket, etc.). The view component 3306 can output a representation of information, such as a GUI, to facilitate the merchant functionality. In at least one example, a customer can interact with the GUI and the view component 3306 can provide an indication of the input back to the controller component 3304. The controller component 3304 can be configured to accept input and convert the input into commands for the model component 3302 and/or the view component 3306. Then, the view component 3306 on the customer-facing device 104A awaits further instruction from the model component 3302 on the merchant-facing device 102A.

Block 3610 illustrates updating the UI based at least in part on the additional functionality. In at least one example, based at least in part on the second state enabling the customer-facing device 104A to perform an additional functionality, the customer-facing device 104A can update the UI based at least in part on the additional functionality. In some examples, an instance of the merchant application 106 can generate instructions for updating the UI. In other examples, a view component 3306 associated with the customer-facing device 104A can receive instructions from a model component 3302 associated with the merchant-facing device 102A for updating the UI.

Block 3612 illustrates presenting at least a portion of the UI on a display 108 of the merchant-facing device. In at least one example, the merchant application 106 associated with the merchant-facing device 102A can generate instructions for presenting at least a portion of the UI presented on the display 116 of the customer-facing device 104A on a display 108 of the merchant-facing device 102A. In some examples, the merchant-facing device 102A can present a duplicate of the UI presented on the display 116 of the customer-facing device 104A such that as the customer-facing device 104A receives inputs, the UI presented via the merchant-facing device 102A reflects such inputs in near-real time. In other examples, the merchant-facing device 102A can present a representation of the UI presented on the display 116 of the customer-facing device 104A. In at least one example, such a representation can be presented via a picture-in-picture presentation. In some examples, the UI presented via the merchant-facing device 102A can include a representation of each customer-facing device that is coupled to the merchant-facing device 102A. The representations can be associated with selectable controls to enable the merchant (or employee thereof) to view and/or interact with individual representations of the customer-facing devices and associated transactions. For example, a selection of a particular representation of each customer-facing device can cause the UI presented via the respective customer-facing device to be enlarged and/or additional details can be presented on the merchant-facing device 102A.

Block 3614 illustrates receiving an input via the UI presented via the customer-facing device. In at least one example, an operator (e.g., customer or merchant) can interact with the UI presented via the customer-facing device 104A. Responsive to receiving an input associated with such an interaction, the customer-facing device 104A can send an indication of the input to the merchant-facing device 102A, as illustrated in block 3616, and can update the UI based at least in part on the input, as illustrated in block 3618. Upon receiving the indication of the input, the merchant-facing device 102A can update at least the portion of the UI presented on the display 108 of the merchant-facing device 102A, as illustrated in block 3620. In some examples, an instance of the merchant application 106 executable by the customer-facing device 104A can send the indication of the input to the merchant-facing device 102A. In other examples, the view component 3306 can provide indication of the input back to the controller component 3304. The controller component 3304 can be configured to accept input and convert the input into commands for the model component 3302 and/or the view component 3306. Then, the view component 3306 on the customer-facing device 104A awaits further instruction from the model component 3302 on the merchant-facing device 102A.

FIG. 37 illustrates an example process 3700 for managing inventory when a customer-facing device of a multi-device POS system is performing merchant functionality that affects inventory as described herein.

Block 3702 illustrates presenting, by a customer-facing device operating in a first state, a UI on a display 116 of the customer-facing device. As described above, in at least one example, a customer application 114 executable by the customer-facing device 104A can generate instructions for presenting, on a display 116 of the customer-facing device 104A, a UI that enables a customer to interact with the customer-facing device 104A to perform one or more customer functionalities.

Block 3704 illustrates transitioning from the first state to a second state, the second state enabling the customer-facing device to perform an additional functionality. In at least one example, the customer-facing device 104A can transition from a first state—a customer state—whereby the customer-facing device 104A is performing customer functionalities to a second state—a merchant state—whereby the customer-facing device 104A can perform merchant functionalities. In some examples, the customer-facing device 104A can transition from the first state to the second state based at least in part on receiving an input requesting to transition from the first state to the second state. In other examples, the customer-facing device 104A can transition from the first state to the second state based at least in part on detecting a change in a position of the customer-facing device 104A or a portion of the customer-facing device 104A, as described above.

Block 3706 illustrates accessing, by the merchant-facing device 102A and from server(s), an instance of inventory associated with a merchant. As described above, the merchant application 106 can be associated with functionality for managing inventory of a merchant. As described above, the inventory of a merchant can indicate a quantity of each item that a merchant has available for sale. In at least one example, the payment processing service server(s) 124 can store the inventory in a database and the merchant application 106 can access an instance of the inventory from the payment processing service server(s) 124.

Block 3708 illustrates determining, by the merchant-facing device, that the customer-facing device has transitioned the first state to the second state. In at least one example, the merchant-facing device 102A can determine that the customer-facing device 104A transitions from the first state—a customer state—whereby the customer-facing device 104A is performing customer functionalities to the second state—a merchant state—whereby the customer-facing device 104A can perform merchant functionalities.

Block 3710 illustrates provisioning access to the inventory to the customer-facing device. In at least one example, one of the merchant functionality availed to the customer-facing device 104A can be reviewing the inventory of the merchant to build a ticket. Accordingly, in at least one example, the merchant-facing device 102A can provision access to the inventory to the customer-facing device 104A. In some examples, the access can be provisioned to an instance of the merchant application 106 executable by the customer-facing device 104A. In other examples, the access can be provisioned via an MVC framework.

Block 3712 illustrates presenting, based on receiving the access to the inventory, at least a portion of the inventory via the UI. Based at least in part on receiving access to the inventory, the customer-facing device 104A can present at least a portion of the inventory via the UI. In some examples, the UI can be presented by an instance of the merchant application 106 executable by the customer-facing device 104A. In other examples, the UI can be presented via an MVC framework.

Block 3714 illustrates receiving an input via the UI, the input associated with adding an item of the inventory to a ticket. In at least one example, a customer (or an employee of the merchant) can interact with the UI to add an item to a ticket. Responsive to receiving an input associated with such an interaction, the customer-facing device 104A can send an indication of the input to the merchant-facing device 102A, as illustrated in block 3716, and can update the UI based at least in part on the input, as illustrated in block 3718. Upon receiving the indication of the input, the merchant-facing device 102A can update at least the portion of the inventory, as illustrated in block 3720. In some examples, an instance of the merchant application 106 executable by the customer-facing device 104A can send the indication of the input to the merchant-facing device 102A. In other examples, the view component 3306 can provide indication of the input back to the controller component 3304. The controller component 3304 can be configured to accept input and convert the input into commands for the model component 3302 and/or the view component 3306. For instance, the model component 3302 can receive the commands from the controller component 3304 and can update the inventory responsive to receiving the commands.

In some examples, the merchant-facing device 102A and/or the customer-facing device 104A can lose connectivity to the payment processing service server(s) 124 (e.g., due to disruptions in connectivity). In such examples, the merchant-facing device 102A and/or the customer-facing device 104A can operate in offline mode. In such examples, the merchant-facing device 102A can, in block 3706, for example, download an instance of the inventory and can update the locally stored instance of the inventory based on input received from the customer-facing device 104A (and/or input received from the merchant-facing device 102A). When the connectivity is restored, the merchant-facing device 102A can send the current inventory to the payment processing service server(s) 124 so that the locally stored inventory and the remotely stored inventory can be synchronized.

As described above, techniques described herein are directed to provisioning functionality on merchant-facing devices and/or customer-facing devices to enable the merchant-facing devices and/or customer-facing devices to execute functionality different than what a typical merchant-facing device and/or customer-facing device would execute. Such additional functionalities expand the usefulness of the multi-device POS system thereby enhancing both payment processing efficiencies and/or customer experiences.

Components of POS Environment

FIGS. 38-41 below depict illustrative block diagrams of select components of environment 100 described above with reference to FIG. 1.

Figure 38:
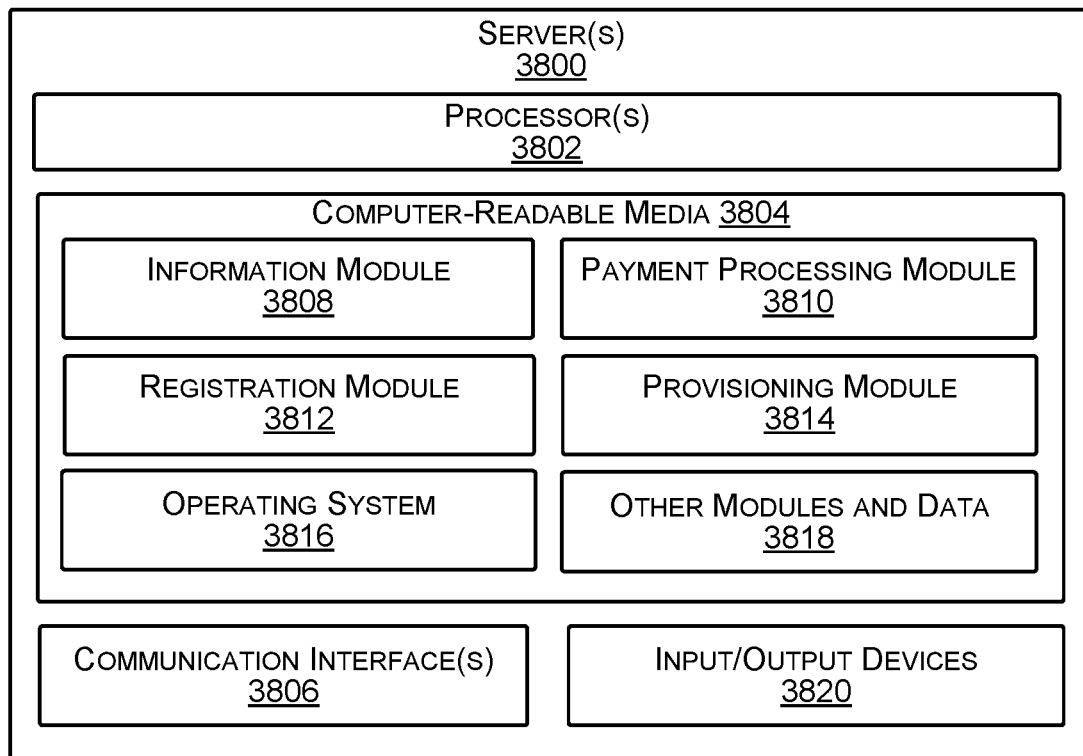
FIG. 38 illustrates a block diagram of select components of payment processing service server(s), in accordance with some implementations as described herein.

FIG. 38 illustrates depicts an illustrative block diagram of select components of the payment processing service server(s) 124. In some examples, the payment processing service server(s) 124 can include one or more server computing devices 3800 or other types of computing devices that can be embodied in any number of ways. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while FIG. 38 illustrates the components and data of the server(s) 3800 as being present in a single location, these components and data can alternatively be distributed across different computing devices and different locations in any manner. Consequently, the functions can be implemented by server(s) 3800, with the various functionality described above distributed in various ways across the different computing devices. Multiple server(s) 3800 can be located together or separately, and organized, for example, as virtual servers, server banks and/or server farms. The described functionality can be provided by the servers of a single entity or enterprise, or can be provided by the servers and/or services of multiple different buyers/customer or enterprises.

In the illustrated example, the server(s) 3800 can include one or more processors 3802, one or more computer-readable media 3804, and one or more communication interfaces 3806. Each processor 3802 can be a single processing unit or a number of processing units, and can include single or multiple computing units or multiple processing cores. The processor(s) 3802 can be implemented as one or more microprocessors, microcomputers, microcontrollers, digital signal processors, central processing units, state machines, logic circuitries, and/or any devices that manipulate signals based on operational instructions. For instance, the processor(s) 3802 can be one or more hardware processors and/or logic circuits of any suitable type specifically programmed or configured to execute the algorithms and processes described herein. The processor(s) 3802 can be configured to fetch and execute computer-readable instructions stored in the computer-readable media 3804, which can program the processor(s) 3802 to perform the functions described herein.

The computer-readable media 3804 can include volatile and nonvolatile memory and/or removable and non-removable media implemented in any type of technology for storage of information, such as computer-readable instructions, data structures, program modules, or other data. Such computer-readable media 3804 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 3800, the computer-readable media 3804 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 3804 can be used to store any number of functional components that are executable by the processors 3802. In many examples, these functional components comprise instructions or programs that are executable by the processors 3802 and that, when executed, specifically configure the one or more processors 3802 to perform the actions attributed above to payment processing service server(s). Functional components stored in the computer-readable media 3804 can include an information module 3808, a payment processing module 3810, a device identifier module 3812, and/or a provisioning module 3814. Additional functional components stored in the computer-readable media 3804 can include an operating system 3816 for controlling and managing various functions of the server(s) 3800. Furthermore, in at least one example, the computer-readable media 3804 can store other modules and data 3818.

In at least one example, the information module 3808 can enable the server(s) 3800 to, among other things, access, receive, send, track, parse, and/or store (or otherwise manage the storage of) information, such as transaction data, payment data, merchant profiles, customer profiles, inventory, etc.

In some examples, the payment processing module 3810 can enable the server(s) 3800 to, among other things, process payments for one or more merchants. For instance, the payment processing module 3810 can provide the functionality for processing payments for multiple different merchants. In at least one example, the payment processing module 3810 can receive transaction data and/or payment data and can communicate with one or more card networks, or other payment services, to authorize transactions based on the transaction data and/or the payment data.

In at least one example, the device identifier module 3812 can be configured to receive requests to register a new device with the payment processing service. In some examples, the device identifier module 3812 can assist with setting up a new account associated with the new device. In other examples, the device identifier module 3812 can receive a request associated with an account identifier of a previously registered merchant and can access information associated with the corresponding account (e.g., via a profile corresponding to the account identifier). The device identifier module 3812 can send such information (or representations thereof) to the new device to assist with onboarding.

The provisioning module 3814 can assist with temporarily provisioning functionality on devices (e.g., personal devices of users, merchant-facing devices, customer-facing devices, etc.). In at least one example, the provisioning module 3814 can determine that a device is within a range of a POS system and can provision such functionality on the device, as described above. In some examples, a user can actuate a hyperlink that causes a request to be sent to the server(s) 3800. In such examples, the provisioning module 3814 can provision the functionality responsive to receiving the request. In at least one example, the provisioning module 3814 can access information stored in the information module 3808 to personalize at least one of how functionality is provisioned to a device and/or what functionality is provisioned to the device.

In addition, the computer-readable media 3804 can store data used for performing the operations described herein. The server(s) 3800 can also include or maintain other functional components and data, such as other modules and data 3818, which can include programs, drivers, etc., and the data used or generated by the functional components. Further, the server(s) 3800 can include many other logical, programmatic and physical components, of which those described above are merely examples that are related to the discussion herein.

The communication interface(s) 3806 can include one or more interfaces and hardware components for enabling communication with various other devices, such as over the network(s) 128. For example, communication interface(s) 3806 can enable communication through one or more of the Internet, cable networks, cellular networks, wireless networks (e.g., Wi-Fi) and wired networks, Bluetooth®, BLE, NFC, and the like, as additionally enumerated elsewhere herein.

The server(s) 3800 can further be equipped with various input/output (I/O) devices 3820. Such I/O devices 3820 can include a display, various user interface controls (e.g., buttons, joystick, keyboard, mouse, touch screen, etc.), audio speakers, connection ports and so forth.

Figure 39:
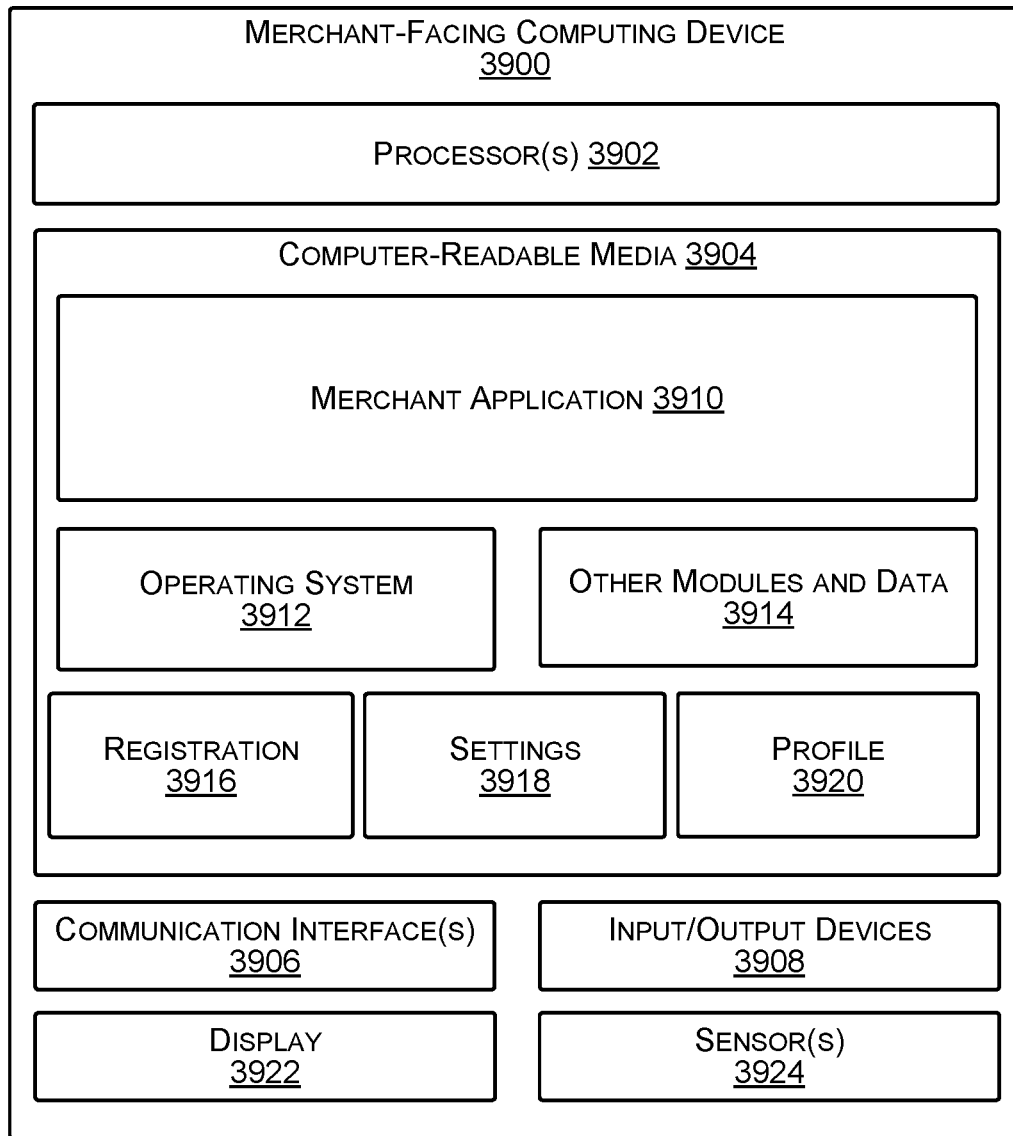
FIG. 39 illustrates a block diagram of select components of an example merchant-facing computing device, in accordance with some implementations as described herein.

FIG. 39 depicts an illustrative block diagram of select components of an example merchant-facing device 102A, in accordance with some implementations as described herein.

The merchant-facing computing device 3900 can be any suitable type of computing device, e.g., portable, semi-portable, semi-stationary, or stationary. Some examples of the merchant-facing computing device 3900 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant-facing computing device 3900 includes at least one processor 3902, one or more computer-readable media 3904, one or more communication interfaces 3906, and one or more input/output (I/O) devices 3908. Each processor 3902 can itself comprise one or more processors or processing cores. For example, the processor 3902 can be implemented as one or more microprocessors, microcomputers, microcontrollers, digital signal processors, central processing units, state machines, logic circuitries, and/or any devices that manipulate signals based on operational instructions. In some cases, the processor 3902 can be one or more hardware processors and/or logic circuits of any suitable type specifically programmed or configured to execute the algorithms and processes described herein. The processor 3902 can be configured to fetch and execute computer-readable processor-executable instructions stored in the computer-readable media 3904.

Depending on the configuration of the merchant-facing computing device 3900, the computer-readable media 3904 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 3904 can include, but is not limited to, RAM, ROM, EEPROM, flash memory, solid-state storage, magnetic disk storage, optical storage, and/or other computer-readable media technology. Further, in some cases, the merchant-facing computing device 3900 can access external storage, such as RAID storage systems, storage arrays, network attached storage, storage area networks, cloud storage, or any other medium that can be used to store information and that can be accessed by the processor 3902 directly or through another computing device or network. Accordingly, the computer-readable media 3904 can be computer storage media able to store instructions, modules or components that can be executed by the processor 3902. Further, when mentioned, non-transitory computer-readable media exclude media such as energy, carrier signals, electromagnetic waves, and signals per se.

The computer-readable media 3904 can be used to store and maintain any number of functional components that are executable by the processor 3902. In some implementations, these functional components comprise instructions or programs that are executable by the processor 3902 and that, when executed, implement operational logic for performing the actions and services attributed above to the merchant-facing computing device 3900. Functional components of the merchant-facing computing device 3900 stored in the computer-readable media 3904 can include a merchant application 3910. The merchant application 3910 can correspond to the merchant application 106 described above. In some examples, the computer-readable media 3904 can include an instance of a customer application, such as customer application 114, described above (not illustrated in FIG. 39). Additional functional components can include an operating system 3912 for controlling and managing various functions of the merchant-facing computing device 3900 and for enabling basic user interactions with the merchant-facing computing device 3900.

In addition, the computer-readable media 3904 can also store data, data structures and the like, that are used by the functional components. For example, data stored by the computer-readable media 3904 can include device identifier information 3916, which can indicate which customer-facing device(s) and/or merchant-facing device(s) are coupled to the merchant-facing computing device 3900. The data stored by the computer-readable media 3904 can further include settings information 3918 and profile information 3920. The settings information 3918 can store settings information associated with the settings of the merchant-facing computing device 3900. For instance, the settings information 3918 can store information such as languages available on the merchant-facing computing device 3900, a language selection for the merchant-facing computing device 3900 (e.g., input language, keyboard language, spoken language, etc.), characteristics (e.g., high contrast) associated with the merchant-facing computing device 3900, volume control, brightness control, network priorities (e.g., back-up networks), date, time, time zone, passwords, account information, etc. The profile information 3920 can store one or more profiles associated with the merchant and/or customer(s) of the merchant, as described above.

Depending on the type of the merchant-facing computing device 3900, the computer-readable media 3904 can also optionally include other functional components and data, such as other modules and data 3920, which can include programs, drivers, etc., and the data used or generated by the functional components. Further, the merchant-facing computing device 3900 can include many other logical, programmatic and physical components, of which those described are merely examples that are related to the discussion herein.

The communication interface(s) 3906 can include one or more interfaces and hardware components for enabling communication with various other devices, such as over the network(s) 128, or directly. For example, communication interface(s) 3906 can enable communication through one or more of the Internet, cable networks, cellular networks, wireless networks (e.g., Wi-Fi) and wired networks, as well as close-range communications such as Bluetooth®, BLE, NFC, and the like, as additionally enumerated elsewhere herein. Additionally or alternatively, the communication interface(s) 3906 can include one or more Universal Serial Bus (USB) interfaces, Ethernet interfaces, etc.

The merchant-facing computing device 3900 can further include the one or more I/O devices 3908. The I/O devices 3908 can include speakers, a microphone, a camera, a projector, a cash drawer, a printer, a barcode scanner, a scale, a kitchen di splay system (KDS), various user controls (e.g., buttons, a joystick, a keyboard, a keypad, etc.), a haptic output device, and so forth. In at least one example, the I/O devices 3908 can be peripheral devices. In other examples, the I/O devices 3908 can be integrated into the customer-facing computing device 4100.

FIG. 39 further illustrates that the merchant-facing computing device 3900 can include a display 3922, mentioned above. Depending on the type of computing device used as the merchant-facing computing device 3900, the display 3922 can employ any suitable display technology. For example, the display 3922 can be a liquid crystal display, a plasma display, a light-emitting diode display, an OLED (organic light-emitting diode) display, an electronic paper display, or any other suitable type of display able to present digital content thereon. In some examples, the display 3922 can have a touch sensor associated with the display 3922 to provide a touchscreen display configured to receive touch inputs for enabling interaction with a graphic interface presented on the display 3922. Accordingly, implementations herein are not limited to any particular display technology. Alternatively, in some examples, the merchant-facing computing device 3900 may not include the display 3922, and information can be presented by other means, such as aurally.

In addition, the merchant-facing computing device 3900 can include or can be connectable to a payment reader (not pictured in FIG. 39). In some examples, the payment reader can plug in to a port in the merchant-facing computing device 3900, such as a microphone/headphone port, a data port, or other suitable port. The payment reader can include a read head for reading a magnetic strip of a payment card, and further can include encryption technology for encrypting the information read from the magnetic strip. Alternatively, numerous other types of payment readers can be employed with the merchant computing devices herein, depending on the type and configuration of the merchant-facing computing device 3900.

Other components included in the merchant-facing computing device 3900 can include various types of sensors 3924, which can include a GPS device able to indicate location information, as well as other sensors such as an accelerometer, gyroscope, compass, proximity sensor, and the like. Additionally, the merchant-facing computing device 3900 can include various other components, some of which are described below with reference to FIG. 40.

Figure 40:
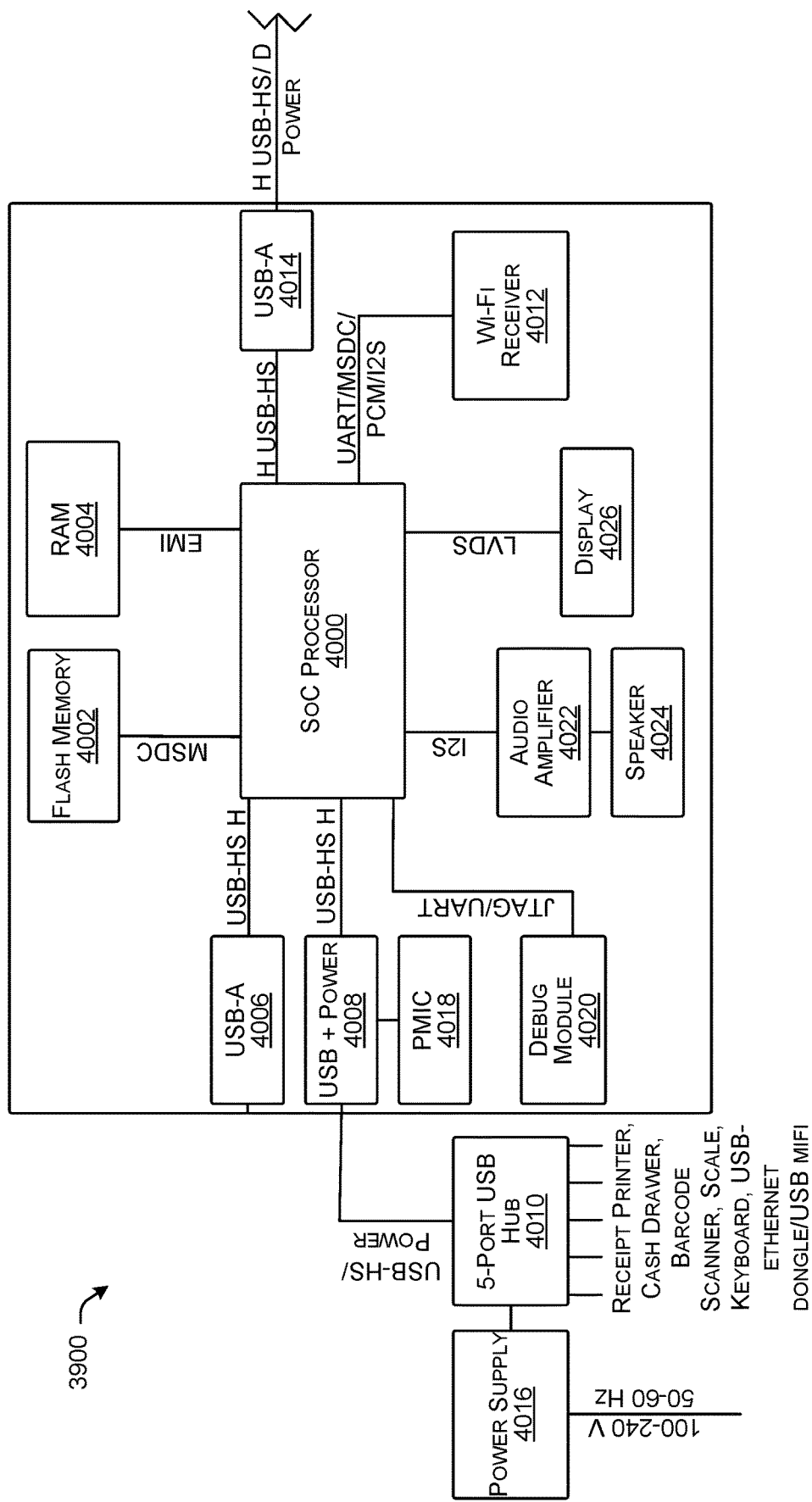
FIG. 40 illustrates a block diagram of additional components of the example merchant-facing computing device described in FIG. 39.

FIG. 40 depicts a block diagram that includes additional details associated with components of the merchant-facing computing device 3900. As described in FIG. 39, the merchant-facing computing device 3900 can include processor(s) 3902 and computer-readable media 3904. For instance, in at least one example, the merchant-facing computing device 3900 includes a SoC (System-on-chip) processor 4000 and associated flash memory 4002 and RAM 4004.

As described above in FIG. 39, the merchant-facing computing device 3900 can include communication interface(s) 3906, which can include one or more Universal Serial Bus (USB) interfaces, Ethernet interfaces, etc. For instance, a USB-A port 4006 can be provided for connecting other devices or components to the merchant-facing computing device 3900 as appropriate. Additionally or alternatively, a USB+Power port 4008 can be provided, which can be connected to a 5-port USB Hub 4010, for various peripherals associated with a point-of-sale system, including a receipt printer, cash drawer, barcode scanner, scale, keyboard, USB-ethernet dongle/USB mifi, and other point-of-sale peripheral components known in the art. While both a USB-A port and a USB+Power port are separately identified, such should not be considered limitation. The merchant-facing computing device 3900 can have any number of USB ports, and the ports can be of any suitable characteristics. Furthermore, a Wi-Fi receiver 4012 is illustrated as being in communication with the processor 4000 to perform the wireless communication, for example, with one or more customer-facing computing devices, one or more other merchant-facing computing devices, and/or other point-of-sale system components, or for example a payment system. As described above, in additional or alternative examples, the merchant-facing computing device 3900 can include receivers for other types of wireless communication, for instance via one or more of the Internet, cable networks, cellular networks, Bluetooth®, BLE, NFC, and the like, as additionally enumerated elsewhere herein.

A USB port 4014 is provided for detachably connecting the merchant-facing computing device 3900 to at least one customer-facing computing device. The term "detachably" is intended to refer to the ability for the merchant-facing computing device 3900 to be connected to a customer-facing computing device but also configured to being detached from the customer-facing computing device when desired for storage, upgrades, or other uses. This mating (or, coupling as described above) between the devices can be through wired connections shown or wirelessly, as described herein.

The merchant-facing computing device 3900 can further include a power supply 4016 (e.g., P2 60W AC/DC) for providing power through the 5-port USB Hub H3 4010 via a connector associated with the USB+Power port 4008 on the merchant-facing computing device 3900. In at least one example, the USB+Power port 4008 can be associated with a Power Management Integrated Circuit (PMIC) 4018. A PMIC is an integrated circuit for managing power requirements of the host system. In additional or alternative examples, the merchant-facing computing device 3900 can have a battery for providing power (although not pictured). Furthermore, the merchant-facing computing device 3900 can include a debug module 4020 for appropriate debugging of the merchant-facing computing device 3900 and the various components thereof. As described above, the merchant-facing computing device 3900 can include one or more input/output devices 3908. For instance, the merchant-facing computing device 3900 can include an audio amplifier 4022 and a speaker 4024 for providing the appropriate audio for the merchant-facing computing device 3900. In FIG. 39, the merchant-facing computing device 3900 is shown with a display 3922. In FIG. 40, a display 4026 is illustrated as being connected to the processor 4000, for example a 13.3-inch LDC display having a resolution of 1920×1080 IPS 166 PPI. The display 4026 can provide the interfaces and outputs described herein to the merchant-facing computing device 3900 to be viewed by a merchant.

Figure 41:
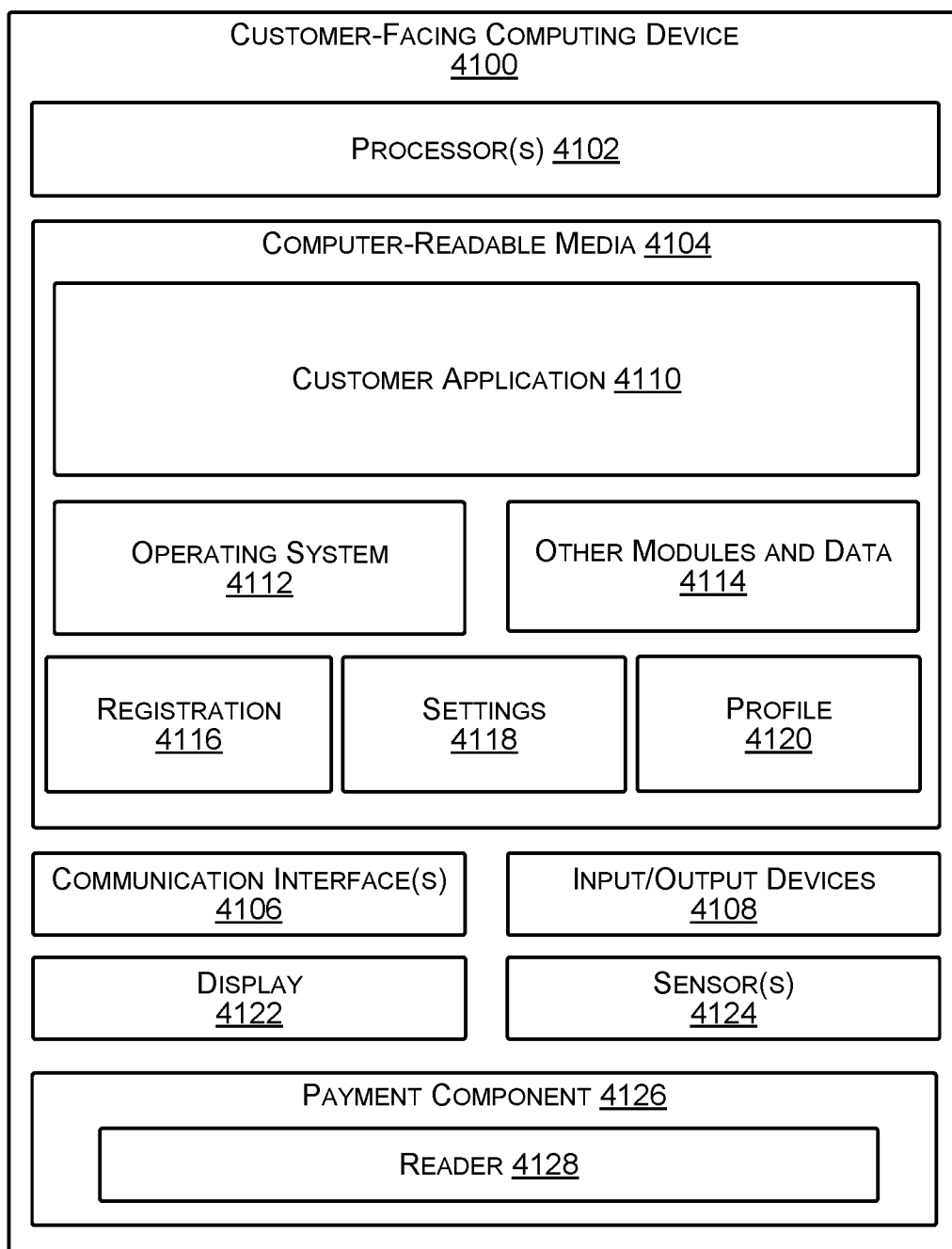
FIG. 41 illustrates a block diagram of select components of an example customer-facing computing device, in accordance with some implementations as described herein.

FIG. 41 depicts an illustrative block diagram of select components of an example customer-facing device 104A, in accordance with some implementations as described herein.

The customer-facing computing device 4100 can be any suitable type of computing device, e.g., portable, semi-portable, semi-stationary, or stationary. Some examples of the customer-facing computing device 4100 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the customer-facing computing device 4100 includes at least one processor 4102, one or more computer-readable media 4104, one or more communication interfaces 4106, and one or more input/output (I/O) devices 4108. Each processor 4102 can itself comprise one or more processors or processing cores. For example, the processor 4102 can be implemented as one or more microprocessors, microcomputers, microcontrollers, digital signal processors, central processing units, state machines, logic circuitries, and/or any devices that manipulate signals based on operational instructions. In some cases, the processor 4102 can be one or more hardware processors and/or logic circuits of any suitable type specifically programmed or configured to execute the algorithms and processes described herein. The processor 4102 can be configured to fetch and execute computer-readable processor-executable instructions stored in the computer-readable media 4104.

Depending on the configuration of the customer-facing computing device 4100, the computer-readable media 4104 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 4104 can include, but is not limited to, RAM, ROM, EEPROM, flash memory, solid-state storage, magnetic disk storage, optical storage, and/or other computer-readable media technology. Further, in some cases, the customer-facing computing device 4100 can access external storage, such as RAID storage systems, storage arrays, network attached storage, storage area networks, cloud storage, or any other medium that can be used to store information and that can be accessed by the processor 4102 directly or through another computing device or network. Accordingly, the computer-readable media 4104 can be computer storage media able to store instructions, modules or components that can be executed by the processor 4102. Further, when mentioned, non-transitory computer-readable media exclude media such as energy, carrier signals, electromagnetic waves, and signals per se.

The computer-readable media 4104 can be used to store and maintain any number of functional components that are executable by the processor 4102. In some implementations, these functional components comprise instructions or programs that are executable by the processor 4102 and that, when executed, implement operational logic for performing the actions and services attributed above to the customer-facing computing device 4100. Functional components of the customer-facing computing device 4100 stored in the computer-readable media 4104 can include a customer application 4110. The customer application 4110 can correspond to the customer application 114 described above. In some examples, the computer-readable media 4104 can include an instance of a merchant application, such as merchant application 106, described above (not illustrated in FIG. 41). Additional functional components can include an operating system 4112 for controlling and managing various functions of the customer-facing computing device 4100 and for enabling basic user interactions with the customer-facing computing device 4100.

In addition, the computer-readable media 4104 can also store data, data structures and the like, that are used by the functional components. For example, data stored by the computer-readable media 4104 can include device identifier information 4116 which can indicate which customer-facing device(s) and/or merchant-facing device(s) are coupled to the customer-facing computing device 4100. The data stored by the computer-readable media 4104 can further include settings information 4118 and profile information 4120. The settings information 4118 can store settings information associated with the settings of the customer-facing computing device 4100. store information such as languages available on the customer-facing computing device 4100, a language selection for the customer-facing computing device 4100 (e.g., input language, keyboard language, spoken language, etc.), characteristics (e.g., high contrast) associated with the customer-facing computing device 4100, volume control, brightness control, network priorities (e.g., back-up networks), date, time, time zone, passwords, account information, etc. In some examples, the settings of the customer-facing computing device 4100 can be the same as the settings of the merchant-facing computing device 3900, as described above with reference to FIG. 39. In other examples, the settings of the customer-facing computing device 4100 can be different than the settings of the merchant-facing computing device 3900. The profile information 4120 can store one or more profiles associated with the merchant and/or customer(s) of the merchant, as described above.

Depending on the type of the customer-facing computing device 4100, the computer-readable media 4104 can also optionally include other functional components and data, such as other modules and data 4120, which can include programs, drivers, etc., and the data used or generated by the functional components. Further, the customer-facing computing device 4100 can include many other logical, programmatic and physical components, of which those described are merely examples that are related to the discussion herein.

The communication interface(s) 4106 can include one or more interfaces and hardware components for enabling communication with various other devices, such as over the network(s) 128, or directly. For example, communication interface(s) 4106 can enable communication through one or more of the Internet, cable networks, cellular networks, wireless networks (e.g., Wi-Fi) and wired networks, as well as close-range communications such as Bluetooth®, BLE, NFC, and the like, as additionally enumerated elsewhere herein. Additionally or alternatively, the communication interface(s) 4106 can include one or more Universal Serial Bus (USB) interfaces, Ethernet interfaces, etc.

The customer-facing computing device 4100 can further include the one or more I/O devices 4108. The I/O devices 4108 can include speakers, a microphone, a camera, a projector, a cash drawer, a printer, a barcode scanner, a scale, a kitchen display system (KDS), various user controls (e.g., buttons, a joystick, a keyboard, a keypad, etc.), a haptic output device, and so forth. In at least one example, the I/O devices 4108 can be peripheral devices. In other examples, the I/O devices 4108 can be integrated into the customer-facing computing device 4100.

FIG. 41 further illustrates that the customer-facing computing device 4100 can include a display 4122, mentioned above. Depending on the type of computing device used as the customer-facing computing device 4100, the display 4122 can employ any suitable display technology. For example, the display 4122 can be a liquid crystal display, a plasma display, a light-emitting diode display, an OLED (organic light-emitting diode) display, an electronic paper display, or any other suitable type of display able to present digital content thereon. In some examples, the display 4122 can have a touch sensor associated with the display 4122 to provide a touchscreen display configured to receive touch inputs for enabling interaction with a graphic interface presented on the display 4122. Accordingly, implementations herein are not limited to any particular display technology. Alternatively, in some examples, the customer-facing computing device 4100 may not include the display 4122, and information can be presented by other means, such as aurally.

Other components included in the customer-facing computing device 4100 can include various types of sensors 4124, which can include a GPS device able to indicate location information, as well as other sensors such as an accelerometer, gyroscope, compass, proximity sensor, and the like. Additionally, the customer-facing computing device 4100 can include various other components, some of which are described below in FIG. 42.

In addition, the customer-facing computing device 4100 can include a payment component 4126, which, as described above, can be housed in, or otherwise associated with, a secure enclave. The payment component 4126 can perform functionalities to control payment interfaces (e.g., a contactless interface, a contact interface, etc.), a wireless communication interface, a wired interface, a user interface (e.g., a signal condition device (FPGA)), etc. In at least one example, the payment component 4126 can include a reader 126, which can read payment data associated with a payment instrument. In some examples, the reader 4128 can be an EMV payment reader, a read head for reading a magnetic strip of a payment card, etc. The payment data can include a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which can or may not match the number associated with the payment instrument), restrictions on what types of charges/debts can be made, etc. In at least one example, the payment component 4126 can include encryption technology for encrypting the payment data upon receiving the payment data. While not pictured in FIG. 39, in some examples, the merchant-facing device 3900 can include a payment component 4126 having the same or similar structure and/or function as the payment component 4126.

Figure 42:
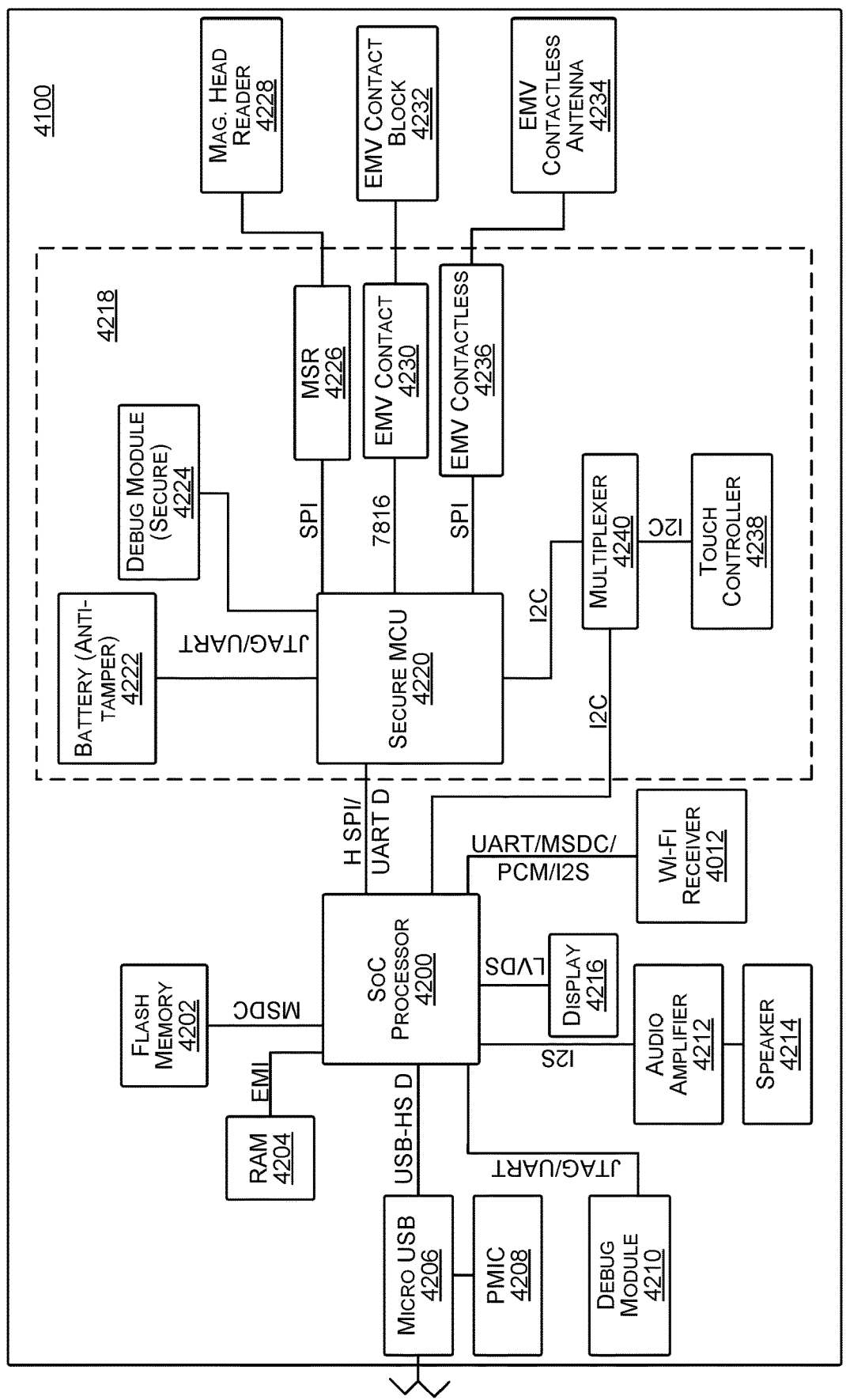
FIG. 42 illustrates a block diagram of additional components of the example customer-facing computing device described in FIG. 41.

FIG. 42 depicts a block diagram that includes additional details associated with components of the customer-facing device 4100. As described above, the customer-facing computing device 4100 can include processor(s) 4102, computer-readable media 4104, and communication interface(s) 4106, which can include one or more Universal Serial Bus (USB) interfaces, Ethernet interfaces, etc. In at least one example, the customer-facing computing device 4100 can include a SoC processor 4200 which can be coupled to flash memory 4202 and RAM 4204 for appropriate storage and processing of data. Further, in at least one example, the SoC processor 4200 can be connected to the micro USB 4206 for communication with the merchant-facing computing device 3900. A PMIC 4208 is shown in communication with the micro USB connector 4202. A PMIC is an integrated circuit for managing power requirements of the host system. In additional or alternative examples, the customer-facing computing device 3900 can include a battery for providing power (even though not shown in FIG. 42). Additionally, the customer-facing computing device 4100 can include a debug module 4210, which can be provided for the processor 4200 for the appropriate debugging of the customer-facing computing device 4100 and the various components thereof.

As described above, the customer-facing computing device 4100 can include input/output devices 4108. For instance, the customer-facing computing device 4100 can include an audio amplifier 4212 and a speaker 4214 for providing audio for the customer on the customer-facing computing device 4100. A display 4216 is provided, such as a 7-inch LCD touch-screen display having a resolution of 1280×800 IPS 216 PPI. The display 4216 provides interfaces and the outputs of the point-of-sale system to the customer-facing computing device 4100. The display 4216 can correspond to the display 4122 described above.

The customer-facing computing device 4100 can include a payment component 4026, as described above. The payment component 4026 can be housed in, or otherwise associated with, a secure enclave. A secure enclave 4218 is included in the customer-facing computing device 4100. The secure enclave includes a secure MCU 4220 (e.g., secure MCU freescale MK21FX512VMC12), an anti-tamper battery 4222, and a secure debug module 4224. The MCU 4222 receives inputs from the Magnetic Stripe Reader (MSR) 4226 which are read by a magnetic head reader 4228. Inputs are also received from EMV contact 4230 (e.g., NXP TDA 8034) and processed by an EMV contact block 4232 (EMV ICC contact block). Inputs from a contactless EMV are received from an EMV contactless antenna 4234 and processed by the EMV contactless block 4236 (e.g., EMV contactless NXP CLRC663). The contactless EMV antenna 4234 is dual-use in some embodiments, and configured to receive input from EMV cards and NFC (near field communication) cards, as well as other NFC devices, such as smart phones or other devices configured to process payment transactions. All inputs received by the consumer terminal at the touch controller 4238 (for example, as entries into a payment application or a register-buddy application in communication with the merchant-facing computing device 3900), are sent to the secure enclave 4220 and a multiplexer 4240 determines if the entries should go directly to the non-secure memory, or if further processing (for example, encryption) is needed, and the entries are sent to secure memory. A multiplexer 4240 (e.g., I2C) receives inputs from the touch controller 4238 and directs inputs received in a non-secure portion of the GUI into non-secure memory, and directs inputs received in a secure portion of the GUI into secure memory. As described above, in at least one example, the main processor on the merchant-facing computing device 3900 and the customer-facing computing device 4100 will each run their own operating system (including possibly two different copies of the same operating system, different versions of the same operating system, or different operating systems altogether, etc.).

As noted above, while not shown, in some examples, the merchant-facing computing device 3900 can additionally include the secure enclave 4220 described above. Further, in some examples, a personal computing device, as described below, in FIG. 43, can additionally include the secure enclave 4220.

Furthermore, a Wi-Fi receiver 4242 is illustrated as being in communication with the processor 4200 to perform the wireless communication, for example, with one or more merchant-facing computing devices, one or more other customer-facing computing devices, and/or other point-of-sale system components, or for example a payment system. As described above, in additional or alternative examples, the customer-facing computing device 4000 can include receivers for other types of wireless communication, for instance via one or more of the Internet, cable networks, cellular networks, Bluetooth®, BLE, NFC, and the like, as additionally enumerated elsewhere herein.

Figure 43:
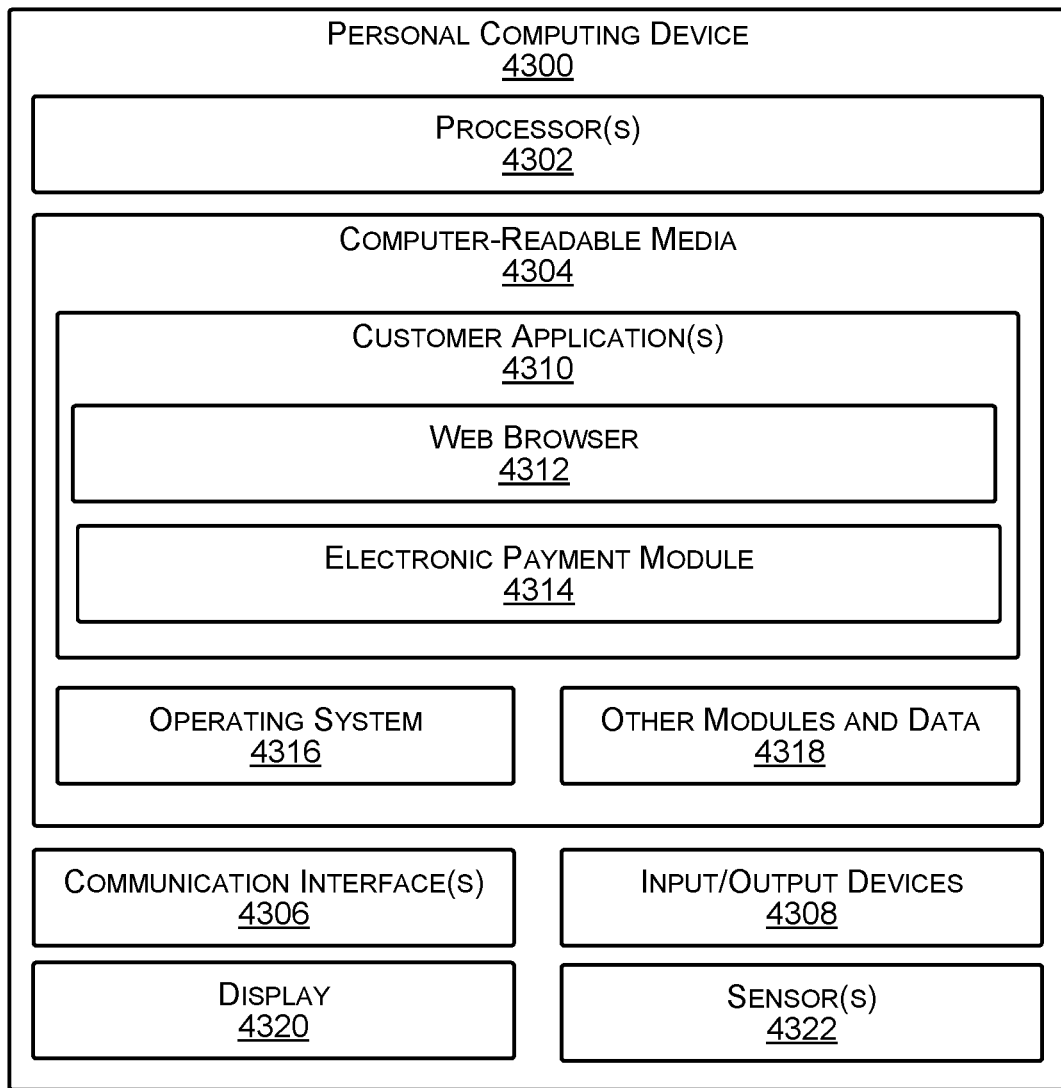
FIG. 43 illustrates a block diagram of select components of an example personal computing device, in accordance with some implementations as described herein.

FIG. 43 depicts an illustrative block diagram of select components of an example personal computing device 4300, in accordance with some implementations as described herein. In at least one example, the personal computing device 4300 can correspond to the personal device described above with reference to FIGS. 20-23. The personal computing device 4300 can be any of a number of different types of computing devices, including portable computing devices. Some examples of the personal computing device 4300 can include smart phones and mobile communication devices; tablet computing devices; laptops, netbooks and other portable computers; wearable computing devices and/or body-mounted computing devices, which can include watches and augmented reality devices, such as helmets, goggles or glasses; and any other portable device capable of sending communications and performing the functions according to the techniques described herein.

In the example of FIG. 43, the personal computing device 4300 includes components such as at least one processor 4302, one or more computer-readable media 4304, one or more communication interfaces 4306, and one or more input/output (I/O) devices 4308. Each processor 4302 can itself comprise one or more processors or processing cores. For example, the processor 4302 can be implemented as one or more microprocessors, microcomputers, microcontrollers, digital signal processors, central processing units, state machines, logic circuitries, and/or any devices that manipulate signals based on operational instructions. In some cases, the processor 4302 can be one or more hardware processors and/or logic circuits of any suitable type specifically programmed or configured to execute the algorithms and processes described herein. The processor 4302 can be configured to fetch and execute computer-readable processor-executable instructions stored in the computer-readable media 4304.

Depending on the configuration of the personal computing device 4300, the computer-readable media 4304 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 4304 can include, but is not limited to, RAM, ROM, EEPROM, flash memory, solid-state storage, magnetic disk storage, optical storage, and/or other computer-readable media technology. Further, in some cases, the personal computing device 4300 can access external storage, such as RAID storage systems, storage arrays, network attached storage, storage area networks, cloud storage, or any other medium that can be used to store information and that can be accessed by the processor 4302 directly or through another computing device or network. Accordingly, the computer-readable media 4304 can be computer storage media able to store instructions, modules or components that can be executed by the processor 4302. Further, when mentioned, non-transitory computer-readable media exclude media such as energy, carrier signals, electromagnetic waves, and signals per se.

The computer-readable media 4304 can be used to store and maintain any number of functional components that are executable by the processor 4302. In some implementations, these functional components comprise instructions or programs that are executable by the processor 4302 and that, when executed, implement operational logic for performing the actions and services attributed above to the personal computing device 4300. Functional components of the personal computing device 4300 stored in the computer-readable media 4304 can include customer application(s) 4310. In this example, the customer applications 4310 include a web browser 4312, and an electronic payment module 4314 that provides functionality allowing the customer to make electronic payments. In some examples, an instance of the merchant application 106 and/or the customer application 114, as described above with reference to FIG. 1, can be provisioned, at least temporarily, onto the personal computing device 4300 (not illustrated in FIG. 43). Additional functional components can include an operating system 4316 for controlling and managing various functions of the personal computing device 4300 and for enabling basic user interactions with the personal computing device 4300.

In addition, the computer-readable media 4304 can also store data, data structures, and the like, that are used by the functional components. Depending on the type of the customer device 4300, the computer-readable media 4304 can also optionally include other functional components and data, such as other modules and data 4318, which can include applications, programs, drivers, etc., and the data used or generated by the functional components. Further, the personal computing device 4300 can include many other logical, programmatic and physical components, of which those described are merely examples that are related to the discussion herein.

The communication interface(s) 4306 can include one or more interfaces and hardware components for enabling communication with various other devices, such as over the network(s) 128, or directly. For example, communication interface(s) 4306 can enable communication through one or more of the Internet, cable networks, cellular networks, wireless networks (e.g., Wi-Fi) and wired networks, as well as close-range communications such as Bluetooth®, BLE, NFC, and the like, as additionally enumerated elsewhere herein.

The personal computing device 4300 can further include the one or more I/O devices 4308. The I/O devices 4308 can include speakers, a microphone, a camera, a projector, and various user controls (e.g., buttons, a joystick, a keyboard, a keypad, etc.), a haptic output device, and so forth.

FIG. 43 further illustrates that the personal computing device 4300 can include a display 4320. Depending on the type of computing device used as the personal computing device 4300, the display 4320 can employ any suitable display technology. For example, the display 4320 can be a liquid crystal display, a plasma display, a light-emitting diode display, an OLED (organic light-emitting diode) display, an electronic paper display, or any other suitable type of display able to present digital content thereon. In some examples, the display 4320 can have a touch sensor associated with the display 4320 to provide a touchscreen display configured to receive touch inputs for enabling interaction with a graphic interface presented on the display 4320. Accordingly, implementations herein are not limited to any particular display technology. Alternatively, in some examples, the personal computing device 4300 may not include a display.

Other components included in the personal computing device 4300 can include various types of sensors 4322, which can include a GPS device able to indicate location information, as well as other sensors such as an accelerometer, gyroscope, compass, proximity sensor, and the like. Additionally, the personal computing device 4300 can include various other components that are not shown, examples of which include removable storage, a power source, such as a battery and power control unit, a payment component and/or secure enclave as described above, and so forth.

The previous description provides specific details for a thorough understanding and an enabling description of various implementations. One skilled in the art will understand, however, that the disclosed systems and methods can be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods.

The methods described above are illustrated as collections of blocks in logical flow diagrams, which represent a sequence of operations, some or all of which can be implemented in hardware, software, or a combination thereof. In the context of software, the blocks can represent computer-executable instructions stored on one or more computer-readable media that, when executed by one or more processors, program the processors to perform operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the method, or alternative methods, and not all of the blocks need to be executed. For discussion purposes, the methods are described with reference to the environments, architectures, and systems described in the examples herein, although the methods can be implemented in a wide variety of other environments, architecture, and systems.

The phrases "in some examples," "according to various examples," "in the examples shown," "in one example," "in other examples," "various examples," "some examples," and the like generally mean the particular feature, structure, or characteristic following the phrase is included in at least one example of the present invention, and can be included in more than one example of the present invention. In addition, such phrases do not necessarily refer to the same examples or to different examples.

If the specification states a component or feature "can," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that can generate useful data or other output using specified input(s). A module can or may not be self-contained. An application program (also called an "application") can include one or more modules, or a module can include one or more application programs.

Although the subject matter above has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   determining, by a first instance of a merchant application executable by a merchant-facing device, that a first customer-facing device coupled to the merchant-facing device has transitioned from a customer state to a merchant state, the first customer-facing device presenting a first graphical user interface (GUI); and
   based at least in part on determining that the first customer-facing device has transitioned from the customer state to the merchant state, displaying at least a portion of the first GUI that is presented via the first customer-facing device on a display integrated with the merchant-facing device.

2. The method as claim 1 recites, further comprising, based at least in part on determining that the first customer-facing device has transitioned from the customer state to the merchant state, controlling the first GUI via a model-view-controller framework.

3. The method as claim 1 recites, further comprising:
   receiving, from a second instance of the merchant application executable by the first customer-facing device, an indication of an interaction with the first GUI; and
   updating at least the portion of the first GUI based at least in part on the indication.

4. The method as claim 1 recites, further comprising:
   determining, by the first instance of a merchant application, that a second customer-facing device coupled to the merchant-facing device has transitioned from the customer state to the merchant state, the second customer-facing device presenting a second GUI; and
   based at least in part on determining that the second customer-facing device has transitioned from the customer state to the merchant state, displaying at least a portion of the second GUI on the display.

5. The method as claim 4 recites, wherein displaying at least the portion of the first GUI and at least the portion of the second GUI comprises displaying at least the portion of the first GUI and at least the portion of the second GUI in a picture-in-picture (PIP) presentation.

6. The method as claim 5 recites, wherein a first picture corresponding to the first GUI and a second picture corresponding to the second GUI are configured as selectable controls, selection of which results in a representation of the first GUI or a representation of the second GUI being presented on the display.

7. The method as claim 1 recites, further comprising:
   downloading, from one or more servers of a payment processing service, an inventory of a merchant operating the merchant-facing device, the inventory indicating one or more items that are offered for sale by the merchant;
   provisioning access to the inventory to the first customer-facing device;
   receiving, from the first customer-facing device, a first indication that a first item of the one or more items is added to a first ticket corresponding to a first customer; and
   updating the inventory based at least in part on the first indication.

8. The method as claim 7 recites, wherein the merchant-facing device is in an offline mode in which the merchant-facing device is unable to communicate with the one or more servers and, based at least in part on determining that the merchant-facing device transitions to an online mode, sending an updated inventory to the one or more servers.

9. The method as claim 7 recites, further comprising:
   receiving, from a second customer-facing device, a second indication that a second item of the one or more items is added to a second ticket corresponding to a second customer;
   updating the inventory based at least in part on the second indication; and
   sending, to at least the first customer-facing device, an updated inventory based at least in part on the second indication.

10. A system comprising:
    one or more processors; and
    one or more computer-readable media storing instructions executable by the one or more processors, wherein the instructions, when executed by the one or more processors, cause the one or more processors to perform acts comprising:
       determining that a first customer-facing device coupled to a merchant-facing device has transitioned from a customer state to a merchant state, the first customer-facing device presenting a first graphical user interface (GUI); and
       based at least in part on determining that the first customer-facing device has transitioned from the customer state to the merchant state, displaying at least a portion of the first GUI that is presented via the first customer-facing device on a display integrated with the merchant-facing device.

11. The system as claim 10 recites, the acts further comprising, based at least in part on determining that the first customer-facing device has transitioned from the customer state to the merchant state, controlling the first GUI via a model-view-controller framework.

12. The system as claim 10 recites, the acts further comprising:
    receiving, from an instance of a merchant application executable by the first customer-facing device, an indication of an interaction with the first GUI; and
    updating at least the portion of the first GUI based at least in part on the indication.

13. The system as claim 10 recites, the acts further comprising:
    determining that a second customer-facing device coupled to the merchant-facing device has transitioned from the customer state to the merchant state, the second customer-facing device presenting a second GUI; and
    based at least in part on determining that the second customer-facing device has transitioned from the customer state to the merchant state, displaying at least a portion of the second GUI on the display.

14. The system as claim 13 recites, wherein displaying at least the portion of the first GUI and at least the portion of the second GUI comprises displaying at least the portion of the first GUI and at least the portion of the second GUI in a picture-in-picture (PIP) presentation.

15. The system as claim 14 recites, wherein a first picture corresponding to the first GUI and a second picture corresponding to the second GUI are configured as selectable controls, selection of which results in a representation of the first GUI or a representation of the second GUI being presented on the display.

16. One or more computer-readable media storing instructions executable by one or more processors, wherein the instructions, when executed by the one or more processors, cause the one or more processors to perform acts comprising:

determining that a first customer-facing device coupled to a merchant-facing device has transitioned from a customer state to a merchant state, the first customer-facing device presenting a first graphical user interface (GUI); and based at least in part on determining that the first customer-facing device has transitioned from the customer state to the merchant state, displaying at least a portion of the first GUI that is presented via the first customer-facing device on a display integrated with the merchant-facing device.

17. The one or more computer-readable media as claim 16 recites, the acts further comprising, based at least in part on determining that the first customer-facing device has transitioned from the customer state to the merchant state, controlling the first GUI via a model-view-controller framework.

18. The one or more computer-readable media as claim 16 recites, the acts further comprising:

receiving, from an instance of a merchant application executable by the first customer-facing device, an indication of an interaction with the first GUI; and updating at least the portion of the first GUI based at least in part on the indication.

19. The one or more computer-readable media as claim 16 recites, the acts further comprising:

determining, by an instance of a merchant application, that a second customer-facing device coupled to the merchant-facing device has transitioned from the customer state to the merchant state, the second customer-facing device presenting a second GUI; and based at least in part on determining that the second customer-facing device has transitioned from the customer state to the merchant state, displaying at least a portion of the second GUI on the display.

20. The one or more computer-readable media as claim 19 recites, wherein displaying at least the portion of the first GUI on the display comprises (i) displaying at least the portion of the first GUI in a picture-in-picture (PIP) presentation or (ii) displaying a substantial replication of the first GUI.

* * * * *